US012030762B2

(12) United States Patent
Picha

(10) Patent No.: US 12,030,762 B2
(45) Date of Patent: Jul. 9, 2024

(54) PALLET SHELFING APPARATUS

(71) Applicant: SOFTENLIFT LTD., Kfar Yona (IL)

(72) Inventor: Guy Picha, Givat Shmuel (IL)

(73) Assignee: SOFTENLIFT LTD., Kfar Yona (IL)

( * ) Notice: Subject to any disclaimer, the term of this patent is extended or adjusted under 35 U.S.C. 154(b) by 691 days.

(21) Appl. No.: 16/767,387

(22) PCT Filed: Nov. 29, 2018

(86) PCT No.: PCT/IL2018/051304
§ 371 (c)(1),
(2) Date: May 27, 2020

(87) PCT Pub. No.: WO2019/106669
PCT Pub. Date: Jun. 6, 2019

(65) Prior Publication Data

US 2020/0391986 A1 Dec. 17, 2020

Related U.S. Application Data

(60) Provisional application No. 62/727,001, filed on Sep. 5, 2018.

(30) Foreign Application Priority Data

Nov. 30, 2017 (IL) ........................................ 256019

(51) Int. Cl.
*B66F 9/075* (2006.01)
*B66F 7/28* (2006.01)
(Continued)

(52) U.S. Cl.
CPC .................. *B66F 9/12* (2013.01); *B66F 7/28* (2013.01); *B65D 2519/00273* (2013.01);
(Continued)

(58) Field of Classification Search
CPC .................................................. B66F 9/07559
See application file for complete search history.

(56) References Cited

U.S. PATENT DOCUMENTS 4,460,064 A * 7/1984 Lutz .......................... B66F 9/06 180/209
7,001,131 B2 2/2006 O'Keeffe
(Continued)

FOREIGN PATENT DOCUMENTS

EP 1457456 A1 9/2004
FR 2755681 A1 * 5/1998 .......... B66F 9/07559
(Continued)

OTHER PUBLICATIONS

Machine translation of FR2755681 from espacenet. (Year: 1998).*
(Continued)

*Primary Examiner* — Mark C Hageman
(74) *Attorney, Agent, or Firm* — Charles C. Achkar; Ostrolenk Faber LLP.

(57) ABSTRACT

A pallet shelfing apparatus for shelf racking of a pallet in a shelf structure, configured to operate in loading, unloading, and hibernate/transport modes. A transporter thereof transports and positions the platform. On a platform configured for loading and unloading the pallet from a selected shelf of the shelf structure, at least one deployable pallet carrying structure is mounted and configured for carrying, reaching and engaging the pallet. At least one deployable anchor, for temporarily stabilizing the pallet shelfing apparatus against at least one hold is deployed in the loading or unloading mode, to engage the at least one hold for stabilizing, and features the at least one hold located off ground, off ceiling, or inside the volume confined by the convex hull of the shelf structure. This volume may be disposed between the platform and at least one of the at least one hold, while in the loading or unloading mode, at least before changing mode
(Continued)

into the hibernate/transport mode. The at least one deployable anchor is configured to change the elevation of the at least one deployable pallet carrying structure, after the carrying structure initially engages the pallet.

18 Claims, 20 Drawing Sheets

(51) Int. Cl.
*B66F 9/12* (2006.01)
*B66F 7/06* (2006.01)
*B66F 9/10* (2006.01)

(52) U.S. Cl.
CPC ........... *B66F 7/0666* (2013.01); *B66F 9/0755* (2013.01); *B66F 9/07559* (2013.01); *B66F 9/10* (2013.01); *B66F 9/122* (2013.01)

(56) References Cited

U.S. PATENT DOCUMENTS 7,632,054 B2 * 12/2009 McGrane ............ B66F 9/07559 414/661
8,376,089 B2 * 2/2013 Stone ........................ B66F 9/06 280/43.12
9,156,614 B2 * 10/2015 Ono ......................... H02B 3/00
9,598,272 B2 * 3/2017 Ivanchenko ............ B66F 9/122
9,815,672 B2 11/2017 Baudermann
2005/0042068 A1 * 2/2005 Ehmen ...................... B66F 9/10 414/661
2012/0068664 A1 3/2012 Frazen

FOREIGN PATENT DOCUMENTS

| | | | |
|---|---|---|---|
| GB | 1431948 | A | 4/1976 |
| JP | S504948 | B1 | 2/1975 |
| JP | S5063646 | A | 5/1975 |
| JP | H039397 | U | 1/1991 |
| JP | 2001171807 | A | 6/2001 |

OTHER PUBLICATIONS

International Search Report issued in International Application No. PCT/IL2018/051304, mailed Feb. 26, 2019.
Written Opinion of the International Searching Authority issued in International Application No. PCT/IL2018/051304, mailed Feb. 26, 2019.
Communication pursuant to Article 94(3) EPC issued in counterpart EP Application No. 18883244.8, mailed Nov. 24, 2023.
Extended European Search Report issued in counterpart EP Application No. 18883244.8, mailed Apr. 21, 2022.

* cited by examiner

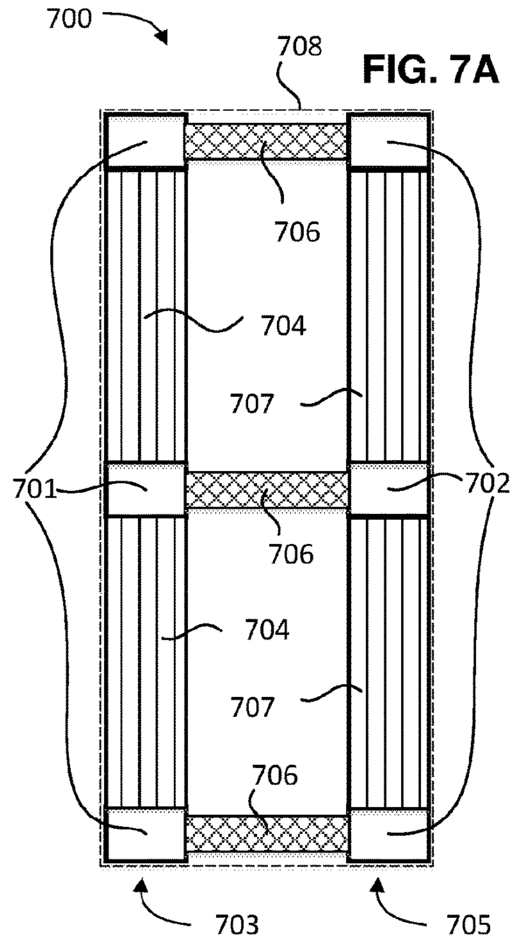
FIG. 7A
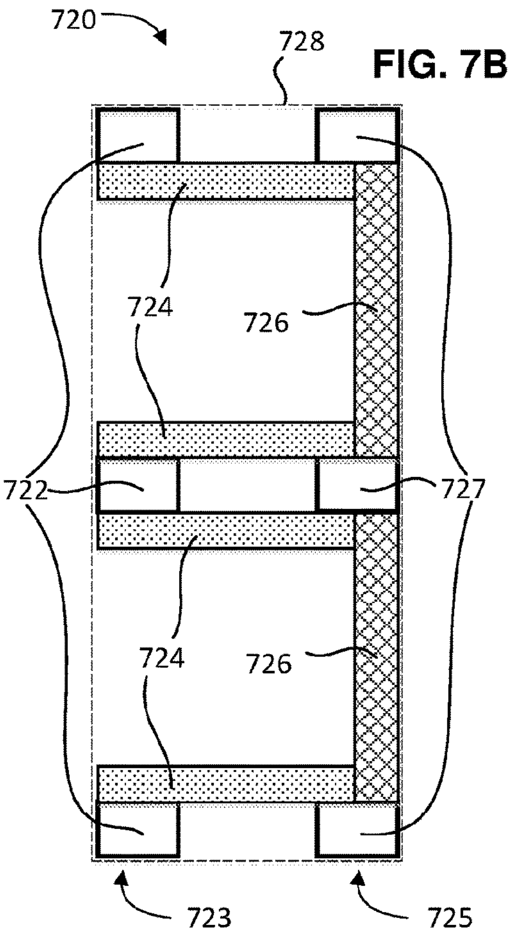
FIG. 7B
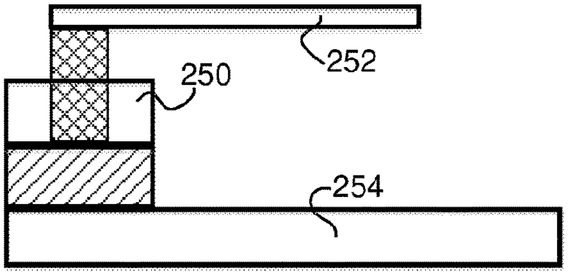
FIG. 8A
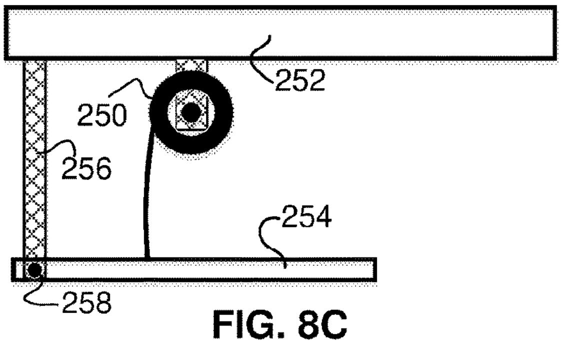
FIG. 8C
FIG. 8B
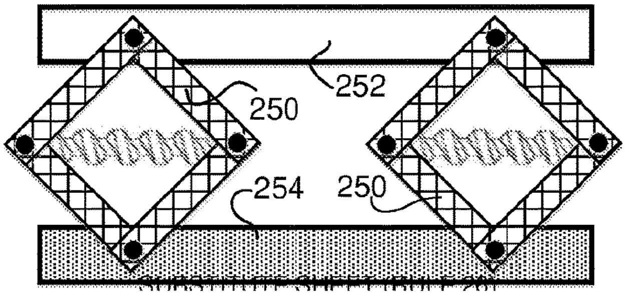

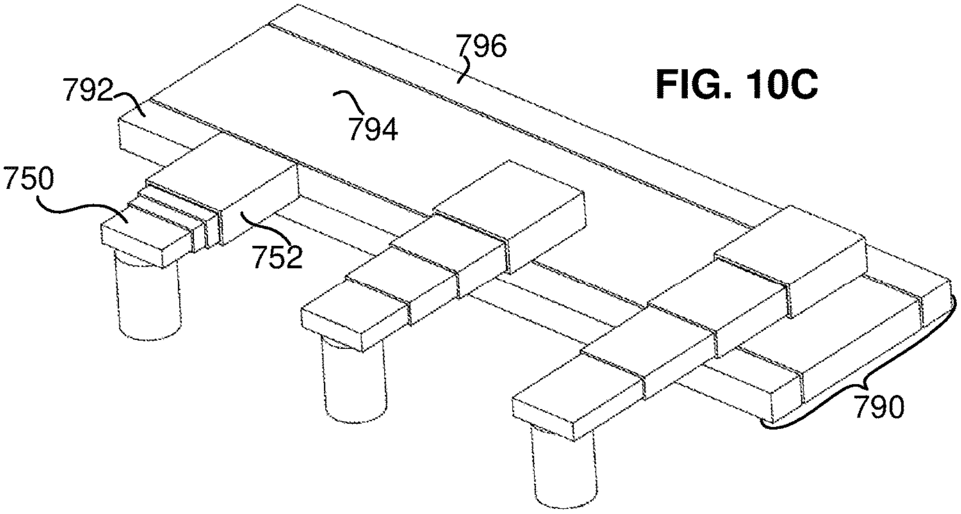
FIG. 10C
FIG. 10D
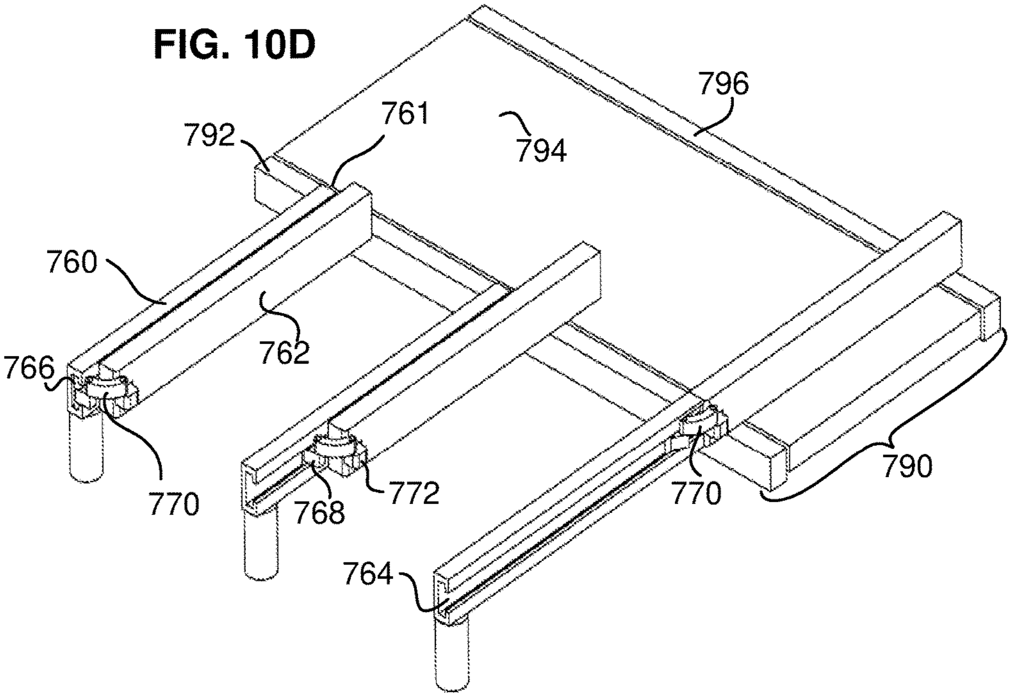

FIG. 18A
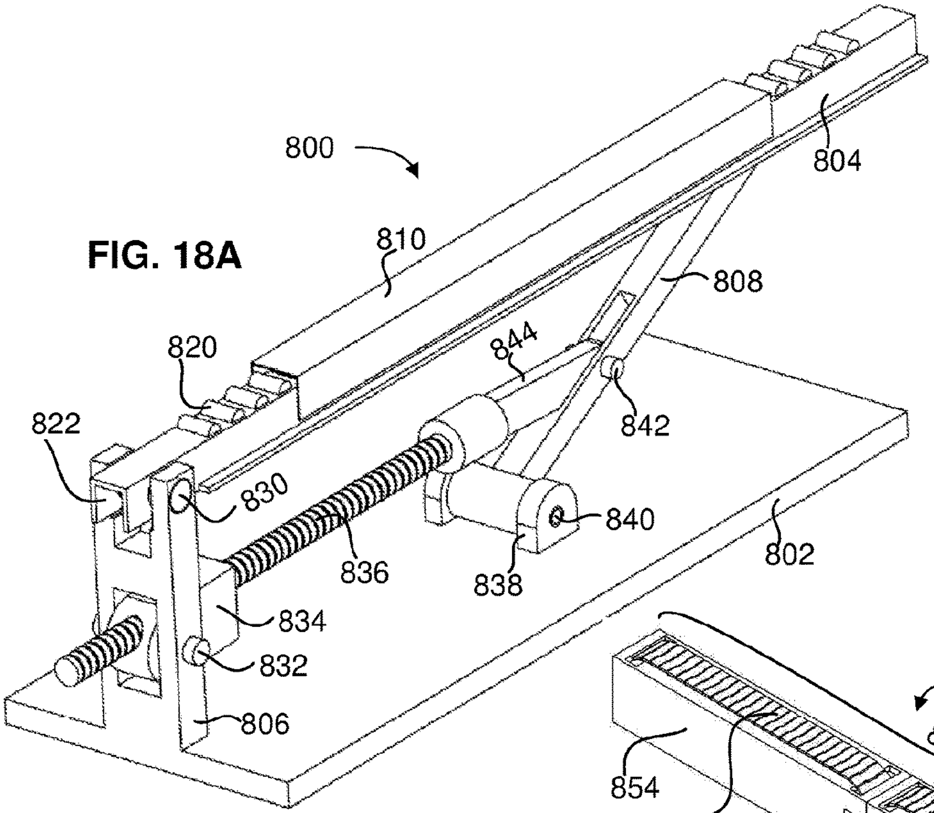
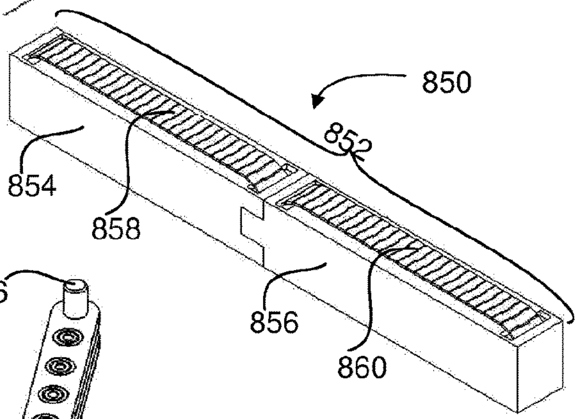
FIG. 18B
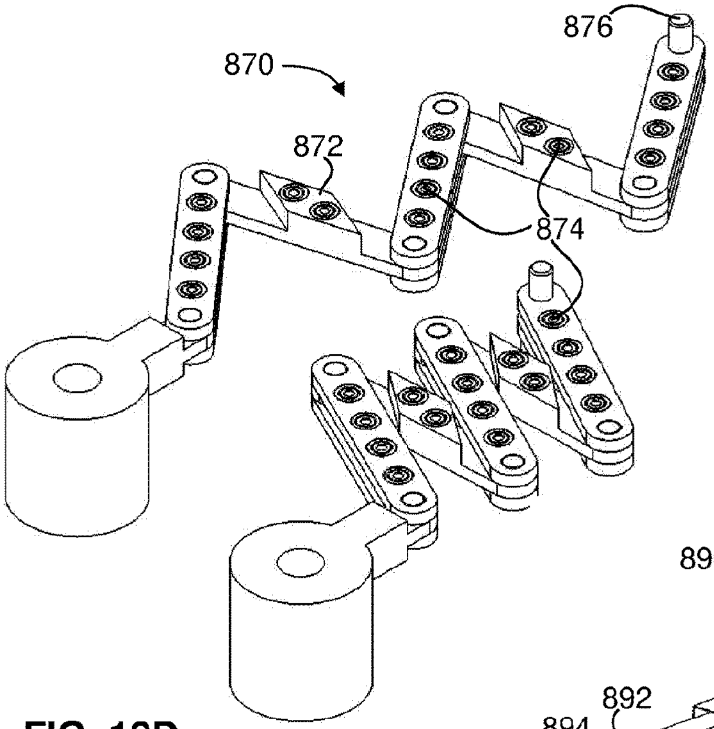
FIG. 18D
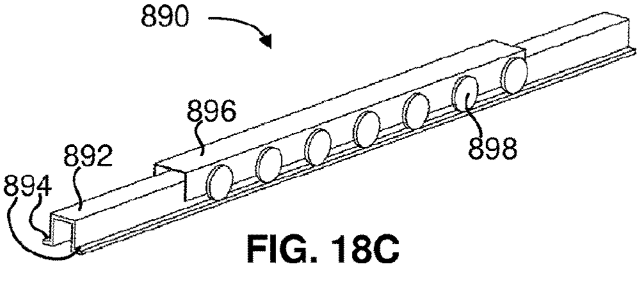
FIG. 18C

PALLET SHELFING APPARATUS

CROSS REFERENCE TO RELATED APPLICATIONS

The present application is a § 371 National Phase application based on PCT/IL2018/051304 filed Nov. 29, 2018, which claims the benefit of IL Application No. 256019, filed Nov. 30, 2017 and U.S. Provisional Application No. 62/727,001 filed Sep. 5, 2018 the subject matter of each of which is incorporated by reference in their entirety.

FIELD OF THE INVENTION

The present invention generally relates to jacks and lifts for pallet and skid racking and shelfing and in particular to lift trucks and jacks articulated for narrow aisles in storage compounds.

SUMMARY OF THE INVENTION

In accordance with one aspect of the present invention, there is thus provided a pallet shelfing apparatus for shelf racking of a pallet in a shelf structure. The pallet may be empty or a part of a pallet unit load. The pallet shelfing apparatus is configured to operate in a loading mode, an unloading mode and a hibernate/transport mode. The pallet shelfing apparatus includes a platform, a transporter for transporting and positioning the platform, at least one deployable pallet carrying structure, and at least one deployable anchor for temporarily stabilizing the pallet shelfing apparatus against at least one hold. The platform, enabled for mobility, is configured, when in the loading mode, to be positioned for enabling loading of the pallet from at least one selected shelf of the shelf structure, and is configured, when in the unloading mode, to be positioned for enabling unloading of the pallet to the at least one selected shelf. The at least one deployable pallet carrying structure, mounted to the platform at least when in the hibernate/transport mode, is deployed when in at least one of the loading mode and the unloading mode, and is configured for carrying, reaching and engaging the pallet. The at least one deployable anchor is deployed in at least one of the loading mode and the unloading mode, to engage the at least one hold, for the stabilizing, wherein the at least one deployable anchor features at least one of: (i) at least one of the at least one hold is located off ground and off ceiling; (ii) at least one of the at least one hold is located inside the volume confined by the convex hull of the shelf structure ("the volume"); (iii) the volume is disposed between the platform and at least one of the at least one hold, while in the loading mode or in the unloading mode, at least before changing mode into the hibernate/transport mode; and (iv) at least one of the at least one deployable anchor is configured to change the elevation of at least one selected pallet carrying structure of the at least one deployable pallet carrying structure, during at least one of the loading mode and the unloading mode, after the at least one selected pallet carrying structure initially engages the pallet.

The bottom of the volume may be disposed off ground below the lowest shelf of the shelf structure.

While in the hibernate/transport mode, the pallet shelfing apparatus may further feature at least one of: (i) the platform is disposed outside a restricting volume confined by the hull of the shelf structure; (ii) the at least one deployable pallet carrying structure is not deployed and is disposed outside the restricting volume; and (iii) the at least one deployable anchor is not deployed and is disposed outside the restricting volume.

The pallet shelfing apparatus may further include a mount for mounting at least one selected pallet carrying structure of the at least one deployable pallet carrying structure to the platform. The mount may include at least one of: (i) a vertical tilt joint for enabling vertical pivoting of the at least one selected pallet carrying structure with respect to the platform; and (ii) a mount height adjustment mechanism for enabling adjustment of the vertical position of the at least one selected pallet carrying structure with respect to the platform. At least the proximal side of the at least one selected pallet carrying structure may be mounted by the mount to the platform, wherein horizontal movement of the mount is constricted, respective to the platform, towards and away from the shelf structure.

The pallet shelfing apparatus may further include an auxiliary platform and a platform height adjustment mechanism for adjusting the relative vertical position between the auxiliary platform and the platform.

At least one of: (i) a mount height adjustment mechanism for enabling adjustment of the vertical position of at least one of the at least one deployable pallet carrying structure with respect to the platform; and (ii) a platform height adjustment mechanism for adjusting the relative vertical position between an auxiliary platform and the platform, may feature a piston jack, a bottle jack, a trolley jack, a telescopic jack, a jackscrew, a billet jack, a diamond type jack, a scissors jack, and/or a winch jack.

The pallet shelfing apparatus may further include a pallet carrying structure side shifter for selectively adjusting the lateral width between at least two pallet carrying structures of the at least one deployable pallet carrying structure. The side shifter may include a mechanism for laterally side shifting of one of the at least two pallet carrying structures.

The pallet shelfing apparatus may further include a loading/unloading direction altering mechanism for changing the deployment direction of the at least one deployable pallet carrying structure. The direction altering mechanism may feature at least one of the at least one deployable pallet carrying structure includes an opposite directions extension mechanism, a mount for mounting at least one of the at least one deployable pallet carrying structure to the platform having a laterally pivotable joint, a mount for mounting at least one of the at least one deployable pallet carrying structure to the platform having a vertically pivotable joint, the platform having a laterally pivotable plate, and/or an auxiliary platform having a platform height adjustment mechanism for adjusting the relative vertical position between the auxiliary platform and the platform wherein the auxiliary platform includes a laterally pivotable mechanism.

The at least one deployable anchor may include a carry jack which is attached to at least one selected pallet carrying structure of the at least one deployable pallet carrying structure, wherein the carry jack is configured to deploy for engaging the at least one hold, which serves as a supporting base for vertical expansion of the carry jack, when the at least one selected pallet carrying structure is deployed. The carry jack may be nested for storage, when not deployed, in a cavity of the at least one selected pallet carrying structure.

The at least one deployable anchor may be deployed by (i) movement of the at least one deployable anchor; (ii) the transporter; (iii) the at least one deployable pallet carrying structure; (iv) a vertical tilt joint which is included in a mount for mounting at least one selected pallet carrying structure of the at least one deployable pallet carrying structure to the platform, for enabling vertical pivoting of at least one selected pallet carrying structure with respect to the platform; (v) a mount height adjustment mechanism which is included in a mount for mounting at least one selected pallet carrying structure of the at least one deployable pallet carrying structure to the platform, for enabling adjustment of the vertical position of at least one selected pallet carrying structure with respect to the platform; and/or (vi) a platform height adjustment mechanism for adjusting the relative vertical position between an auxiliary platform and the platform;

The at least one deployable anchor may include a leaning stave which is set, when deployed, between a leaning location in the pallet shelfing apparatus and the at least one hold for stabilizing the pallet shelfing apparatus against the at least one hold. The leaning location may be disposed on the transporter, the platform, a mount for mounting at least one of the at least one deployable pallet carrying structure to the platform, and/or an auxiliary platform, including a platform height adjustment mechanism for adjusting the relative vertical position between the auxiliary platform and the platform. The leaning stave may include a hold support jack which is configured to deploy for engaging the at least one hold, and may further include a cavity in which the hold support jack is nested when the hold support jack is not deployed. The leaning stave may include a retractably extendable spar, configured to extract, when deployed, for stabilizing the pallet shelfing apparatus, and to retract when not deployed.

The pallet shelfing apparatus may further include a load support jack which is configured to deploy between a load supporting base and at least one selected pallet carrying structure of the at least one deployable pallet carrying structure, for vertically supporting the at least one selected pallet carrying structure. The load support jack may be nested when not deployed in a cavity of the pallet shelfing apparatus.

The carry jack and/or the load support jack may be further configured for vertically lifting and lowering the at least one selected pallet carrying structure.

The load supporting base may be is disposed on: (i) the platform; (ii) the transporter; (ii) a mount for mounting at least one of the at least one deployable pallet carrying structure to the platform; (iii) an auxiliary platform, including a platform height adjustment mechanism for adjusting the relative vertical position between the auxiliary platform and the platform; and/or (iv) the at least one deployable anchor, including a leaning stave, the leaning stave, when deployed, is set between a leaning location in the pallet shelfing apparatus and the at least one hold, when stabilizing the pallet shelfing apparatus against the at least one hold.

The carry jack, the hold support jack of a leaning stave of the at least one deployable anchor, and/or the load support jack, may include a diamond-type jack, a billet jack, a trolley jack, a telescopic jack, a jackscrew, a hinged jack, a bottle jack, a winch jack, a fluid stream jack, and/or an electromagnetic jack.

The at least one deployable anchor may include an anchor base element, which may be mobile, and at least one anchor stabilizing element, wherein the anchor base element is physically detached from the pallet shelfing apparatus excluding the at least one deployable anchor, when the deployable anchor is not deployed, and the anchor base element is engaged by the pallet shelfing apparatus excluding the at least one deployable anchor by at least one of the at least one anchor stabilizing element, when the deployable anchor is deployed for stabilizing the pallet shelfing apparatus. The anchor stabilizing element may be attached, when the at least one deployable anchor is not deployed, to either the anchor base element or the pallet shelfing apparatus excluding the at least one deployable anchor.

A selected hold of the at least one hold may feature: (i) the selected hold being located on a shelf of the shelf structure; (ii) the selected hold being located on the vertical upright columns of the shelf structure; (iii) the selected hold being located on the ground; (iv) the selected hold being located on the ceiling; (v) the selected hold being located below a shelf of another shelf structure, such that the pallet shelfing apparatus is disposed in between the shelf structure and the another shelf structure; (vi) the selected hold being located on a surface of construction that is supported by any of the aforementioned; (vii) a magnetic field that applies a dragging/repelling force on a magnetic portion of the at least one deployable anchor; and/or (viii) a fluid stream that applies a repelling force on the at least one deployable anchor.

The deployment of the at least one deployable pallet carrying structure may include horizontal movement of the at least one deployable pallet carrying structure towards the shelf structure.

The pallet shelfing apparatus may further include a pallet carrying structure lift mechanism for exerting a vertical movement of the distal side of the at least one deployable pallet carrying structure, and/or the proximal side of the at least one deployable pallet carrying structure.

The at least one deployable pallet carrying structure may include a beam wherein deployment of the beam for the carrying, reaching and engaging the pallet is maneuvered by maneuvering: (i) the transporter; (ii) a mount for mounting the beam to the platform; (iii) a vertical tilt joint of a mount for mounting the beam to the platform; (iv) a mount height adjustment mechanism of a mount for mounting the beam to the platform; (v) a platform height adjustment mechanism for adjusting the relative vertical position between an auxiliary platform and the platform; and/or (vi) the beam beaing retractably extendable; The at least one deployable pallet carrying structure which includes a retractably extendable beam, and/or the at least one deployable anchor which includes a retractably extendable spar, may include a foldable segmented beam, a scissors beam, an accordion beam, a vertical parallelogram beam, a horizontal parallelogram beam, an n-bar horizontal parallelogram beam, a side rail and lock beam, a telescopic beam, and/or a drawer beam.

The pallet shelfing apparatus may further include a pallet conveyor configured to carry the pallet about at least one of the at least one deployable pallet carrying structure at a path extending between a location above the selected shelf and a location above or below the platform, for facilitating movement of the pallet at the loading mode and the unloading mode. The pallet conveyor may be an active pallet conveyor including a conveyor mobility element for moving the active pallet conveyor about the at least one deployable pallet carrying structure. The conveyor mobility element may include wheels, caterpillar tracks, and/or wheels for railway tracks. The active pallet conveyor may be detachable from the at least one deployable pallet carrying structure for detachably conveying the pallet to and from a remotely located shelf, and wherein the active pallet conveyor further includes mobility means for reaching the remotely located shelf. The mobility means may include the conveyor mobility element. The pallet conveyor may include: (i) a trolley running over a beam of the at least one deployable pallet carrying structure; (ii) a hanging trolley running under a beam of the at least one deployable pallet carrying structure; (iii) a conveyor belt; (iv) rolling elements set over the at least one deployable pallet carrying structure; (v) a foldable segmented beam; (vi) a foldable scissors beam; (vii) a foldable accordion beam; (viii) a foldable horizontal parallelogram beam; (ix) a foldable n-bar horizontal parallelogram beam; (x) a retractably extendable drawer beam; (xi) a retractably extendable telescopic beam; and/or (xii) a retractably extendable side rail and lock beam.

The pallet shelfing apparatus may further include a gravitational movement pallet conveyor, wherein a vertical pivoting of at least one selected pallet carrying structure of the at least one deployable pallet carrying structure with respect to the platform is activated, at the loading mode and the unloading mode, for inducing gravitational slide of the pallet about the at least one selected pallet carrying structure, at a path extending between a location above the selected shelf and a location above or below the platform. The vertical pivoting may be activated by (i) a designated pivot drive, (ii) a carry jack of the at least one deployable anchor, wherein the carry jack is attached to the at least one selected pallet carrying structure, the carry jack is configured to deploy for engaging the at least one hold which serves as a supporting base for vertical expansion of the carry jack when the at least one selected pallet carrying structure is deployed, and/or (iii) a load support jack configured to deploy between a load supporting base and the at least one selected pallet carrying structure, for vertically supporting the at least one selected pallet carrying structure. Activation, deactivation, velocity, acceleration and direction of the gravitational slide may be controlled by a controller which is operational for changing the vertical pivoting, and thereby controlling pallet movement.

The transporter may include a pallet lift for lifting the platform to a desired height, which may feature (i) a scissors lift mechanism, (ii) a jackscrew lift mechanism, (iii) a telescopic lift mechanism, (iv) a crane configured to hoist the platform from above, (v) a mast and a vertical carriage running there along, for lowering and lifting the platform along the mast, (vi) a roped carriage for lowering and lifting the platform along a mast, and/or (vii) a roped carriage elevator structure including a mast, a carriage and a counter balance, wherein the carriage runs along and within the mast, the counter balance is movable along the mast and roped to the carriage via an overhead pulley.

The transporter may include a ground locomotion, which may feature wheels for ground engagement, continuous caterpillar tracks, and/or wheels for railway tracks. The ground locomotion may include two perpendicular sets of wheels, wherein each perpendicular set is aligned for movement in a direction perpendicular to the alignment of the other set, and wherein one of the perpendicular sets is activated and interfacing the ground while the other set being raised above ground to avoid friction. The ground locomotion may include steering by wheel speed direction changing mechanism, including a set of four rectangularly deployed wheels and differential steering, configured for activating a first pair of two oppositely disposed wheels of the set, by (i) driving the wheels of the first pair in the same directions at the same speed for straight progression; (ii) driving the wheels of the first pair in opposite directions at the same speed for spinning in place; and/or (iii) driving the wheels of the first pair at different speeds for a turn, wherein the second pair of the two oppositely disposed wheels is allowed to skid, allowed to steer passively, an/or is driven in a manner that emulates the steering induced by the first pair.

BRIEF DESCRIPTION OF THE DRAWINGS

The present invention will be understood and appreciated more fully from the following detailed description taken in conjunction with the drawings in which:

FIG. 2A is a side view schematic illustration of the pallet shelfing apparatus in the transport mode;

FIG. 2B is a side view schematic illustration of the pallet shelfing apparatus of FIG. 2A with its beams in an extended state and its carry jacks deployed;

FIG. 2C is a side view schematic illustration of the pallet shelfing apparatus of FIG. 2A with its beams extracted, its carry jacks deployed and the pallet overpassed over beams;

FIG. 2D is a side view schematic illustration of the pallet shelfing apparatus of FIG. 2A with its beams extracted, its carry jacks deployed and the pallet is rested on the selected shelf;

FIG. 2E is a side view schematic illustration of a pallet shelfing apparatus of FIG. 2A in the hibernate mode;

FIG. 3A is a side view schematic illustration of the pallet shelfing apparatus in the hibernate mode;

FIG. 3B is a side view schematic illustration of the pallet shelfing apparatus of FIG. 3A with its beams extracted and its spar deployed to engage a lower shelf;

FIG. 3C is a side view schematic illustration of the pallet shelfing apparatus of FIG. 3A with its mount height adjustment mechanism lifting its extracted beams and subsequently detaching the pallet from the shelf structure;

FIG. 3D is a side view illustration of the pallet shelfing apparatus of FIG. 3A with the pallet conveyed over its extracted beams;

FIG. 3E is a side view schematic illustration of a pallet shelfing apparatus of FIG. 3A in the transport mode;

FIGS. 7A and 7B, are top view schematic illustrations of shelves structures, constructed and operative in accordance with another embodiment of the present invention. FIG. 7A is a top view schematic illustration of a shelf structure for pallets, featuring back and front bars;

FIG. 7B is a top view schematic illustration of a shelf structure for pallets, featuring two side bars;

FIGS. 8A, 8B, and 8C, are exemplary side view schematic illustrations of various types of a jack that may be utilized for a mount height adjustment mechanism and/or for a platform height adjustment mechanism, of a pallet shelfing apparatus constructed and operative in accordance with further embodiments of the present invention. FIG. 8A is a side view schematic illustration of a piston jack height adjustment mechanism;

FIG. 8B is a side view schematic illustration of a diamond structured height adjustment mechanism;

FIG. 8C is a side view schematic illustration of a winch-based height adjustment mechanism;

FIG. 9A is a perspective view schematic illustration of a deployable pallet carrying structure in the form of two beams, of the pallet shelfing apparatus, extended in two opposed directions;

FIG. 9B is a side view schematic illustration of a deployable pallet carrying structure in the form of a vertically rotatable beam;

FIG. 9C is a top view schematic illustration of deployable pallet carrying structure in the form of two horizontally rotatable beams;

FIG. 9D is a top view schematic illustration of a horizontally rotatable platform;

FIGS. 10A, 10B, 10C, 10D, and 10E, are exemplary perspective view schematic illustrations of retractably extendable beams or spars, constructed and operative in accordance with further embodiments of the present invention. FIG. 10A is a perspective view schematic illustration of a foldable accordion-type beam/spar;

FIG. 10B is a perspective view schematic illustration of a foldable scissor-type beam/spar;

FIG. 10C is a perspective view schematic illustration of a telescopic beam/spar;

FIG. 10D is a perspective view schematic illustration of a side rail and lock beam/spar;

FIG. 10E is a schematic illustration of a two-linked segmented horizontal parallelogram beam/spar;

FIG. 13A is a side view schematic illustration of an extracted beam with a retracted jackscrew carry jack;

FIG. 13B is a side view schematic illustration of an extracted beam with a deployed jackscrew carry jack;

FIG. 14A is a side view schematic illustration of an embodiment featuring an extracted beam with a motorized tilting joint and a retracted spar with a retracted jackscrew hold support jack;

FIG. 14B is a side view schematic illustration of an embodiment featuring an extracted beam with a motorized tilting joint and an extracted spar with a retracted jackscrew hold support jack;

FIG. 14C is a side view schematic illustration of an embodiment featuring an extracted beam with a motorized tilting joint and an extracted spar with a deployed jackscrew hold support jack;

FIG. 14D is a side view schematic illustration of an embodiment featuring an extracted beam tilted by its motorized tilting joint and an extracted spar with a deployed jackscrew hold support jack;

FIG. 15A is a side view schematic illustration of an embodiment featuring an extracted beam, a retracted spar, and a spooled winch type load support jack;

FIG. 15B is a side view schematic illustration of an embodiment featuring an extracted beam, an extracted spar, and a spooled winch type load support jack;

FIG. 15C is a side view schematic illustration of an embodiment featuring an extracted beam, an extracted spar, and a winch type load support jack, whose rope is hooked to the distal side of the beam;

FIG. 15D is a side view schematic illustration of an embodiment featuring a tilted extracted beam, an extracted spar, and a winch load support jack, whose rope pulls the distal side of the beam;

FIG. 16A is a side view schematic illustration of an embodiment featuring an extracted beam, a lowered platform, and a retracted spar;

FIG. 16B is a side view schematic illustration of an embodiment featuring an extracted beam, a lowered platform, and an extracted spar;

FIG. 16C is a side view schematic illustration of an embodiment featuring an extracted beam lifted by pushed upwards platform, and an extracted spar;

FIG. 17A is a side view schematic illustration of an embodiment featuring an extracted beam and a retracted spar with a nested hinged load support jack which has a retracted jackscrew at its tip;

FIG. 17B is a side view schematic illustration of an embodiment featuring an extracted beam and an extracted spar with a nested hinged load support jack which has a retracted jackscrew at its tip;

FIG. 17C is a side view schematic illustration of an embodiment featuring an extracted beam and an extracted spar with an upright hinged load support jack which has a retracted jackscrew at its tip, placed just below the beam;

FIG. 17D is a side view schematic illustration of an embodiment featuring a tilted extracted beam and an extracted spar with an upright hinged load support jack with a deployed jackscrew at its tip, which pushes against a medial point of the beam;

FIGS. 18A, 18B, 18C, and 18D, are perspective view schematic illustrations of simplified exemplary pallet conveyors, constructed and operative in accordance with further embodiments of the present invention.

FIG. 18A is a perspective view schematic illustration of a pallet conveyor arrangement featuring simplified version of a passive gravitational movement pallet conveyor;

FIG. 18B is a perspective view schematic illustration of a simplified version of an active pallet belt conveyor;

FIG. 18C is a perspective view schematic illustration of a simplified version of an active pallet conveyor of a motorized trolley type;

FIG. 18D is a perspective view schematic illustration of an active pallet conveyor of a foldable segment beam type;

FIG. 19A is a simplified side view schematic illustration of a crane type transporter of a pallet shelfing apparatus with a winched pallet lift;

FIG. 19B is a simplified side view schematic illustration of a transporter of a pallet shelfing apparatus with a telescopic pallet lift;

FIG. 19C is a simplified side view schematic illustration of a transporter of a pallet shelfing apparatus with a jackscrew lift mechanism;

FIG. 22A is a perspective view schematic illustration of endless caterpillar tracks for ground locomotion; and FIG. 22B is a perspective view schematic illustration of rail track wheels for ground locomotion.

DETAILED DESCRIPTION OF THE EMBODIMENTS

Figure 1A:
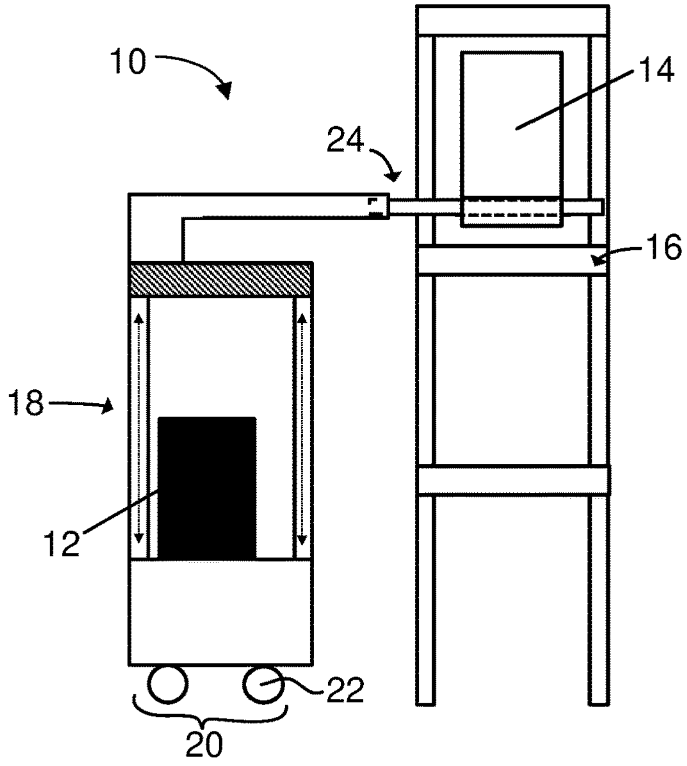
FIG. 1A is a side view schematic illustration of a prior art pallet shelfing apparatus, with a counterweight, and a pallet on extracted beam.
Figure 1B:
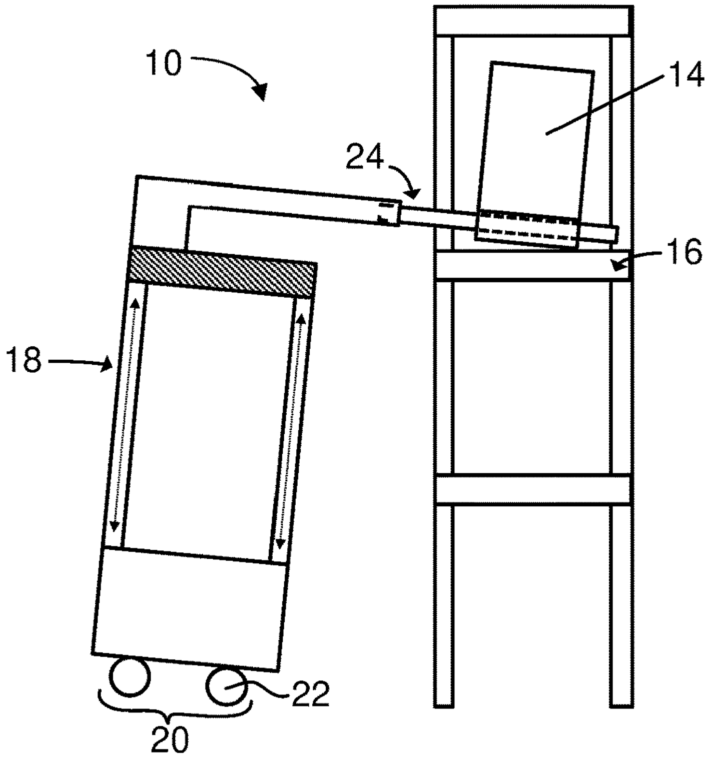
FIG. 1B is a side view schematic illustration of the prior art pallet shelfing apparatus of FIG. 1A, without a counterweight.

The present invention features a novel apparatus and method for pallet shelfing. With reference to FIGS. 1A and 1B, FIG. 1A is a schematic illustration of prior art pallet shelfing apparatus 10 having counterweight 12 for preventing topple down when unloading/loading pallet unit load 14 to/from shelf 16. FIG. 1B is a side view schematic illustration of shelfing apparatus 10 of FIG. 1A illustrating an apparatus topple down, if lacking counterweight 12 when unloading/loading pallet unit load 14 to/from shelf 16. Apparatus 10 includes a tower body 18, which is designed to reach shelves typically disposed at heights of 3 to 20 meters, and transportation means represented by wheels 20. Apparatus 10 often incorporates a light structure which cannot remain stable when shelfing the heavy weights of a typical pallet unit load 14, without counterweight balancing. Unless incorporating counterweight 12 with sufficient significant weight, apparatus 10 is prone to toppling by the weight of pallet unit load 14, when its center of gravity is placed beyond the vertical contour of tower body 18 of apparatus 10, or more precisely—beyond the vertical contour around wheels 20 which support tower body 18. When equilibrium is breached, wheels 22, which are the wheels most proximate to pallet unit load 14, become the fulcrum of toppling apparatus 10. Upon distancing of pallet unit load 14 from tower body 18 by extension mechanism 24 toward shelf 16, the balance of apparatus 10 may be breached, as demonstrated in FIG. 1B. The use of counterweight 12 to counterbalance pallet unit load 14, inflicts substantial horizontal bending stress forces on tower body 18, as well as vertical bearing stress forces. These horizontal stress forces are greater—the taller tower body 18 is, the heavier pallet unit load 14 is, and the further pallet unit load 14 is distanced from tower body 18 by extension mechanism 24. Thus, use of counterweight 12 requires the design of a sturdy, heavy and expensive apparatus 10, including massive locomotion means. Counterweight 12 is placed at the bottom of apparatus 10 for maximal effect and is usually required to be much heavier than pallet unit load 14, for reaching the required moment (torque), due to its proximity to the fulcrum in comparison to pallet unit load 14 which, at typical operation, is sometimes positioned much farther from the fulcrum. In some instances, counterweight 12 is disposed at a laterally distanced location at the rear of tower body 18, allowing a reduced weight thereof while maintaining a sufficiently balancing moment, but such structure consumes further lateral ground space that substantially limits the maneuverability of apparatus 10. The present invention dramatically alleviates the requirement of using a counterweight and enables the use of much simpler and lightweight tower body that is required to substantially withstand vertical stress forces only.

In its broadest aspects the present invention features a pallet shelfing apparatus for shelf racking of a pallet in a shelf structure, the pallet being empty or a part of a pallet unit load. The pallet shelfing apparatus is configured to operate in four major modes, a loading mode, an unloading mode, a hibernate mode, and a transport mode (the latter two sometimes referred to herein as a unified 'hibernate/transport mode'). The pallet shelfing apparatus includes a platform, a transporter, at least one deployable pallet carrying structure, and at least one deployable anchor (usually as an attachment). The platform, enabled for mobility, is configured, when in the loading mode, to be positioned in a desired position for enabling loading of the pallet from a selected shelf within the shelf structure and is configured, when in the unloading mode, to be positioned in a desired position for enabling unloading of the pallet to the selected shelf. The transporter is operational for transporting and positioning the platform in the desired position. The at least one deployable pallet carrying structure is mounted to the platform, at least when in the hibernate/transport mode, is deployed when in at least one of the loading mode and the unloading mode, and is configured for carrying, reaching and engaging the pallet. The at least one deployable anchor is operational for temporarily stabilizing the pallet shelfing apparatus against at least one hold. The at least one deployable anchor is deployed in at least one of the loading mode and the unloading mode, to engage the at least one hold, for the stabilizing. The at least one deployable anchor further features: (a) At least one of the at least one hold is located off ground and off ceiling; (b) At least one of the at least one hold is located inside the volume confined by the convex hull of the shelf structure; (c) While in the loading mode or in the unloading, at least before changing mode into the hibernate/transport mode, the volume is disposed between the at least one selected hold and the platform; and/or (d) At least one of the at least one deployable anchor configured to change the elevation of at least one selected pallet carrying structure of the at least one deployable pallet carrying structure, during at least one of the loading mode and the unloading mode, after the at least one selected pallet carrying structure initially engages the pallet.

In accordance with embodiments of the pallet shelfing apparatus, the pallet shelfing apparatus may include a mount for mounting at least one selected pallet carrying structure of the at least one deployable pallet carrying structure to the platform. The mount may include a vertical tilt joint for enabling vertical pivoting of the at least one selected pallet carrying structure with respect to the platform.

In accordance with embodiments of the pallet shelfing apparatus, the at least one deployable pallet carrying structure may include a beam. The beam may be retractably extendable, configured to extend when deployed and to retract when not deployed and the deployment of the beam for carrying, reaching and engaging the pallet, is maneuvered by extracting the beam. As noted above, the beam may be mounted to platform by a mount and the mount may include a vertical tilt joint. In accordance with embodiments of the pallet shelfing apparatus, the deployment of the beam for carrying, reaching and engaging the pallet, may be maneuvered by maneuvering the vertical tilt joint of a mount, mounting the beam to the platform.

As noted above, the at least one deployable pallet carrying structure may be mounted to the platform by a mount. In accordance with embodiments of the pallet shelfing apparatus, the horizontal movement of the mount is constricted, respective to the platform, towards and away from the shelf structure.

In accordance with embodiments of the pallet shelfing apparatus, the deployment of the at least one deployable pallet carrying structure includes a horizontal movement of the at least one deployable pallet carrying structure towards the shelf structure.

In accordance with embodiments of the pallet shelfing apparatus, the pallet shelfing apparatus may further include a pallet carrying structure distal side lift mechanism for exerting a vertical movement of the distal side of the at least one deployable pallet carrying structure.

In the context of the shelf structure, the "hull" of the shelf structure is the minimal volume enclosing the shelf structure, and the "convex hull" of the shelf structure is the minimal convex volume enclosing the shelf structure.

In accordance with embodiments of the pallet shelfing apparatus, the platform, the at least one deployable pallet carrying structure and/or the at least one deployable anchor are disposed outside a restricting volume confined by the hull of the shelf structure, when in the hibernate/transport mode.

In accordance with embodiments of the pallet shelfing apparatus, the at least one deployable pallet carrying structure and/or the at least one deployable anchor are not deployed when in the hibernate/transport mode.

In accordance with embodiments of the pallet shelfing apparatus, the at least one deployable anchor may be deployed by self-movement, by movement of the at least one deployable pallet carrying structure, and/or by movement of the vertical tilt joint.

In accordance with embodiments of the pallet shelfing apparatus, the at least one deployable anchor may include a carry jack attached to at least one selected pallet carrying structure of the at least one deployable pallet carrying structure, wherein the carry jack is configured to deploy for engaging the at least one hold which serves as a supporting base for vertical expansion of the carry jack when the at least one selected pallet carrying structure is deployed. In accordance with embodiments of the pallet shelfing apparatus, the carry jack may be configured to vertically lifting and lowering the at least one selected pallet carrying structure, and the at least one selected pallet carrying structure may further include a cavity in which the carry jack is nested for storage, when not deployed.

In accordance with embodiments of the pallet shelfing apparatus, the at least one hold is located on a shelf within the shelf structure, which is located off ground, located off ceiling and resides within the volume confined by the convex hull of the shelf structure.

In accordance with embodiments of the pallet shelfing apparatus, the transporter may include a pallet lift for lifting the platform to a desired height, and may further include a ground locomotion which may include wheels for ground engagement.

Reference is now made to FIGS. 2A, 2B, 2C, 2D, and 2E, which are side view schematic illustrations of a pallet shelf racking (also termed "shelfing") apparatus, generally referenced 100, for shelf racking of a pallet unit load in a shelf structure, constructed and operative in accordance with an embodiment of the present invention. It is noted that the term "pallet" in this context refers to either an empty pallet or to a pallet unit load, schematically illustrated as a large package in the drawings. Throughout the description and the drawings, like-numbers designate like-part for the sake of simplicity.

Figure 2A:
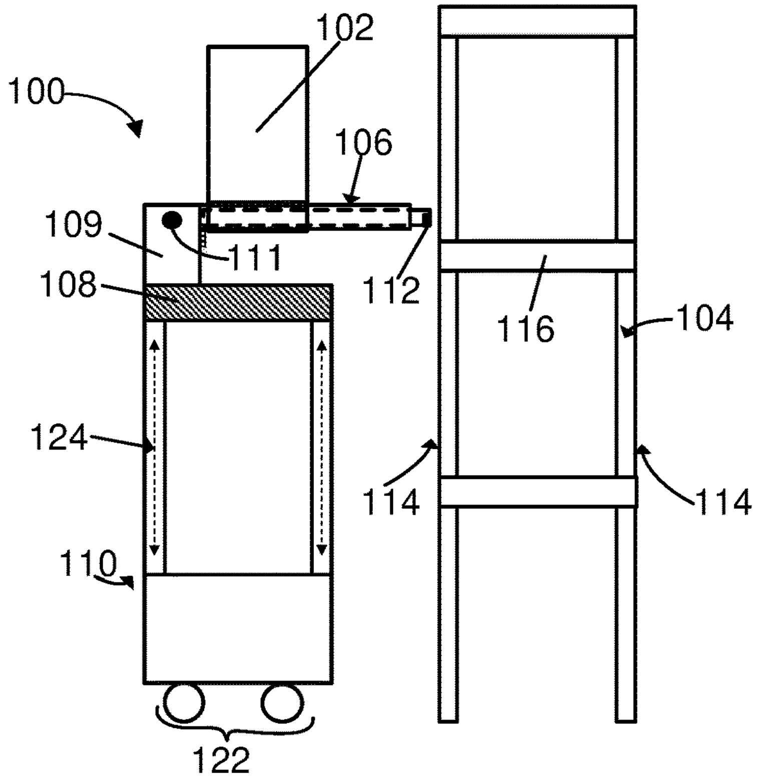
FIGS. 2A, 2B, 2C, 2D, and 2E, are side view schematic illustrations of a pallet shelfing apparatus for shelf racking of a pallet unit load in a shelf structure, constructed and operative in accordance with an embodiment of the present invention.
Figure 2B:
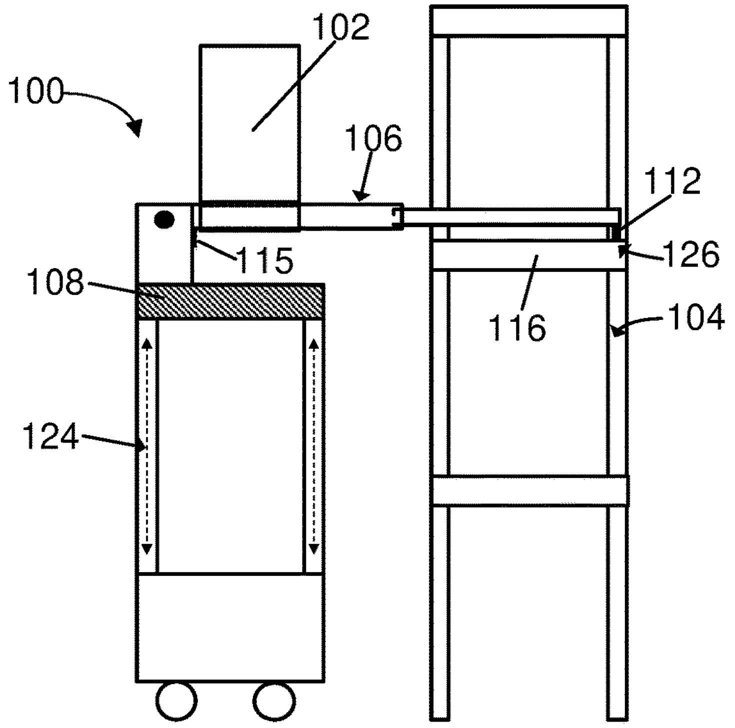
Figure 2C:
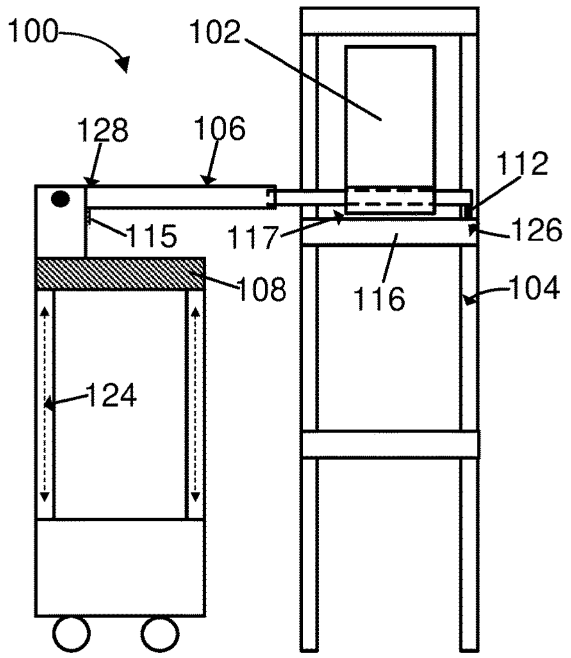
Figure 2D:
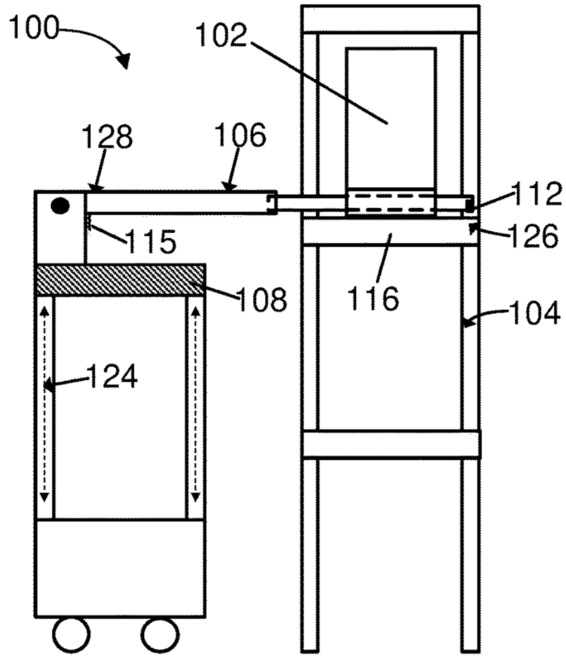
Figure 2E:
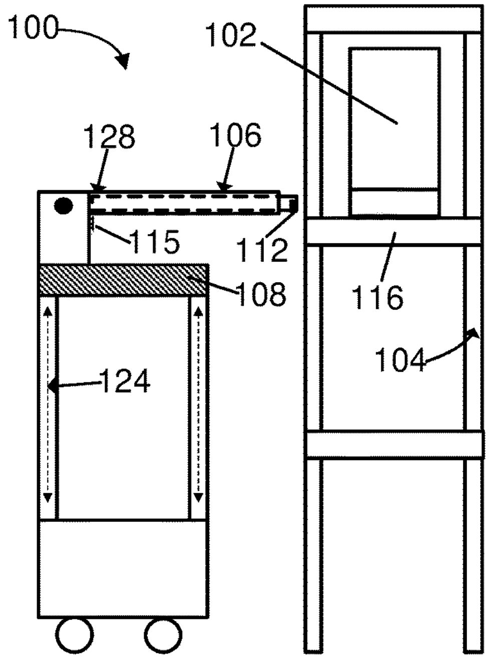

FIG. 2A is a side view schematic illustration of pallet shelfing apparatus 100 in the transport mode, carrying a pallet, depicted 102, and positioned in proximity to a shelf structure, depicted 104. Pallet shelfing apparatus 100 features a deployable pallet carrying structure in the form of two retractably extendable beams 106 in a retracted state (i.e., not deployed) with deployable anchors in the type of carry jacks 112, which are nested within beams 106 (when not deployed). FIG. 2B is a side view schematic illustration of pallet shelfing apparatus 100 of FIG. 2A in the unloading mode with its beams 106 in an extended state (i.e., deployed) and engaging shelf structure 104 by jacks 112 which are deployed to lean against far side 126 of shelf 116. FIG. 2C is a side view schematic illustration of pallet shelfing apparatus 100 of FIG. 2A in the unloading mode with beams 106 extracted, jacks 112 deployed and pallet 102 overpassed over beams 106, by an active pallet conveyor (not shown) into shelf structure 104 to be positioned above shelf 116 for placement. Examples of active pallet conveyor that are not of foldable beam type, are further described in reference with FIGS. 18B and 18C. FIG. 2D is a side view schematic illustration of pallet shelfing apparatus 100 of FIG. 2A in the unloading mode wherein pallet lift 124 lowers beams 106 while jacks 112 retract simultaneously for resting pallet 102 on shelf 116. FIG. 2E is a side view schematic illustration of pallet shelfing apparatus 100 of FIG. 2A in the hibernate mode without a pallet, wherein jacks 112 are nested in retracted beams 106.

Apparatus 100 is configured to operate in a loading mode, in an unloading mode (FIGS. 2B to 2D), in a transport mode (FIG. 2A) and in a hibernate mode (FIG. 2E). For the sake of simplicity, the unloading of a pallet is described herein below in further detail with reference to the embodiment of FIGS. 2A to 2E, while the loading of a pallet is described in further detail with reference to the embodiment of FIGS. 3A to 3E, however both embodiments are obviously configured for both loading and unloading.

Apparatus 100 includes at least one deployable pallet carrying structure such as beams 106, platform 108, transporter 110 which is constructed from locomotion means 122 and lifting means 124, and at least one deployable anchor such as jacks 112. Beams 106 are mounted to platform 108 by mount 109. Mount 109 features vertical tilt joint 111 with stopper 115. Vertical tilt joint 111 is operational for enabling vertical pivoting of beams 106 with respect to platform 108, down to stopper 115 imposed limitation. The vertical pivoting is required for compensating for non-synchronized movements between pallet lift 124 and jacks 112 and thus to facilitate stable resting of pallet 102 on shelf 116, as seen in FIG. 2D. Further explanation and examples of mounts are elaborated herein below with respect to FIGS. 4, 6, 8A to 8C, 11, 12, 18A, 19B, 20, and 21. Platform 108 is disposed outside restricting volume 114, which is confined by the hull of shelf structure 104, when in the hibernate/transport mode, as seen in FIGS. 2A and 2E, and thereby allow free movement of apparatus 100 along the aisles disposed between neighboring shelf structures. It is noted that reference is sometimes made herein to a unified "hibernate/transport" mode, instead of referencing in particular to each of the hibernate mode and the transport mode because the only major distinguishing between the two modes in the context of the invention lies in the placement of pallet 102 on apparatus 100 in the transport mode and the absence of pallet 102 in the hibernate mode. In the hibernate/transport mode, beams 106 are retracted and jacks 112 are nested therein. Platform 108 is configured, when in the loading mode, to be positioned in a desired position for enabling loading of pallet 102 from a selected shelf, such as shelf 116 within shelf structure 104, and is configured, when in the unloading mode as seen in FIGS. 2B to 2D, to be positioned in a desired position for enabling unloading pallet 102 to selected shelf 116 within shelf structure 104. It is noted that in some embodiments of the invention such as seen in FIGS. 8C and 15A to 15D, "selected shelf" may also refer to the ground portion at the bottom of shelf structure 104. It is further noted that apparatus 100 is also operative for loading/unloading pallet 102 from/to any other adequate surface.

In FIGS. 2B and 2C, platform 108 is positioned in proximity to shelf 116 and at an adequate position with respect to shelf 116, such that pallet 102 can be unloaded to or loaded from shelf 116. Transporter 110 is configured to provide this objective, and is operational for positioning the platform, by means of transportation and height adjustment, in the desired position. Transporter 110 includes locomotion means, represented by wheels 122, that can transport apparatus 100 to the desired ground location, and pallet lift 124 that can lift or lower platform 108, to the desired height for shelf racking of shelf 116, or for loading/unloading from/to any other adequate surface.

Once platform 108 is adequately positioned for unloading pallet 102 to shelf 116, as in FIG. 2A, beams 106 are extracted into an extended state and engage shelf structure 104 by jacks 112 which are deployed from beams 106 to lean against far side 126 of shelf 116, as in FIG. 2B. At this phase, jacks 112 support extracted beams 106 and thereby stabilize apparatus 100 in its entirety, while leaving a gap 117 between pallet 102 and shelf 116 for allowing free movement of pallet 102 over shelf 116.

Thereafter, pallet 102 is conveyed along beams 106 right above shelf 116, as in FIG. 2C. The conveying of pallet 102 is further described with reference to FIGS. 18B and 18C which present examples of active pallet conveyors that are not foldable beam types. At this phase, jacks 112 support extracted beams 106, which further serve to stabilize apparatus 100, irrespective of the movement and position of pallet 102 along extracted beams 106, and thereby achieving two main features of the pallet shelfing apparatus, namely—rendering the need of placing a balancing counterweight redundant, and essentially eliminating horizontal stress forces exerted on pallet lift 124, leaving pallet lift 124 with the modest structural requirement of essentially withstanding mere vertical forces.

Deployable anchors, such as jacks 112, are employed to temporarily stabilize apparatus 100 against at least one hold, which is disposed at far side 126 of shelf 116, as in FIGS. 2B and 2C. Jacks 112 are deployed for temporarily stabilizing apparatus 100, in both the loading mode and the unloading mode, by engaging far side 126 of shelf 116, which demonstrates the at least one hold. It is noted that jacks 112 are disposed outside volume 114 when in the hibernate/transport mode. Jacks 112 may be stored in or installed on apparatus 100 and transported therewith without obstructing the free movement of apparatus 100 in the aisles between neighboring shelf structures, except when deployed for the loading/unloading of the pallet. It is further noted that far side 126 of shelf 116, that serves as the at least one hold, is located off ground, located off ceiling and is disposed within volume 114.

Beams 106 are mounted, by mount 109, at its proximal side 128 to platform 108, and are operative for carrying, reaching and engaging pallet 102. Beams 106 are retractably extendable from a retracted state, as in FIGS. 2A and 2E, when in the hibernate/transport mode, for hibernating or for transporting of pallet 102 for positioning by platform 108. In their retracted state, beams 106 are disposed outside volume 114, for allowing free movement of apparatus 100 in the aisles between neighboring shelf structures, when in the hibernate/transport mode as in FIGS. 2A and 2E. Beams 106 are retractably extendable into an extended state, as in FIGS. 2B-2D, when in the loading mode or the unloading mode, while intruding volume 114 for enabling loading or enabling unloading of pallet 102.

Carry jacks 112 also serve as distal side lift mechanism of beams 106 for exerting a vertical movement to the distal side of beams 106. Further examples of beam distal side lift mechanism are described herein below with reference to FIGS. 4, 6, 8A to 8C, 11, 12, 13A, 13B, 14A to 14D, 15A to 15D, 16A to 16C, 17A to 17D, 18A, 19A to 19C, 20, and 21. With reference to FIG. 2D, once pallet 102 is positioned right above shelf 116 in place for lowering for resting, pallet lift 124 lowers beams 106 while jacks 112 retract simultaneously for resting pallet 102 on shelf 116, and nesting of jacks 112 in extracted beams 106. Thereafter, beams 106 may be retracted for their release from pallet 102 and apparatus 100 assumes the hibernate mode without a pallet, wherein carry jacks 112 are nested in retracted beams 106.

The sequence of unloading can be easily tracked along FIGS. 2A through 2E. The loading process is close to a reverse sequence, subject to adjustments that will be clarified below with reference to FIGS. 3A to 3E.

As noted above, the pallet shelfing apparatus may include a mount for mounting at least one selected pallet carrying structure of the at least one deployable pallet carrying structure to the platform. In accordance with embodiments of the pallet shelfing apparatus, the mount includes a mount height adjustment mechanism for enabling adjustment of the vertical position of the at least one selected pallet carrying structure with respect to the platform.

In accordance with embodiments of the pallet shelfing apparatus, the pallet shelfing apparatus may include a pallet carrying structure proximal side lift mechanism and/or a pallet carrying structure distal side lift mechanism for exerting a vertical movement on the proximal side and/or on the distal side of the at least one deployable pallet carrying structure.

As noted above, the at least one deployable anchor may be deployed by self-movement. In accordance with embodiments of the pallet shelfing apparatus, the at least one deployable anchor may be deployed by movement of the mount height adjustment mechanism, and/or by movement of the platform height adjustment mechanism.

As noted above, the at least one deployable pallet carrying structure may include a retractably extendable beam, that is configured to extend when deployed and to retract when not deployed, and the deployment of the beam for carrying, reaching and engaging the pallet is maneuvered by extracting the beam. As noted above, the beam may be mounted to the platform by a mount, the mount may include a mount height adjustment mechanism and the pallet shelfing apparatus may include a platform height adjustment mechanism. In accordance with embodiments of the pallet shelfing apparatus, the deployment of the beam for carrying, reaching and engaging the pallet, may be maneuvered by maneuvering the height adjustment mechanism and/or by maneuvering the platform height adjustment mechanism.

In accordance with embodiments of the pallet shelfing apparatus, the pallet shelfing apparatus may further include an auxiliary platform and a platform height adjustment mechanism for adjusting the relative vertical position between the auxiliary platform and the platform.

In accordance with embodiments of the pallet shelfing apparatus, the at least one deployable anchor includes a leaning stave which is set, when deployed, between a leaning location in the pallet shelfing apparatus and the at least one hold for stabilizing the pallet shelfing apparatus against the at least one hold. In accordance with embodiments of the pallet shelfing apparatus, the leaning stave may include a retractably extendable spar, configured to extract, when deployed, for stabilizing the pallet shelfing apparatus, and to retract when not deployed. As noted above, the pallet shelfing apparatus may include an auxiliary platform. In accordance with embodiments of the pallet shelfing apparatus, the leaning location may be located on the auxiliary platform.

Reference is now made to FIGS. 3A, 3B, 3C, 3D, and 3E, which are side view schematic illustrations of a pallet shelfing apparatus, generally referenced 200, for shelf racking of pallet unit load 102 in shelf structure 104, wherein the deployable anchor features retractably extendable spar 212, constructed and operative in accordance with another embodiment of the present invention. Pallet shelfing apparatus 200 is a modification of apparatus 100, wherein the exemplary deployable anchor, in the form of retractably extendable spar 212 of apparatus 200, functionally substitutes carry jacks 112 of apparatus 100 of FIG. 2A, as the stabilizing element of apparatus 200.

Figure 3A:
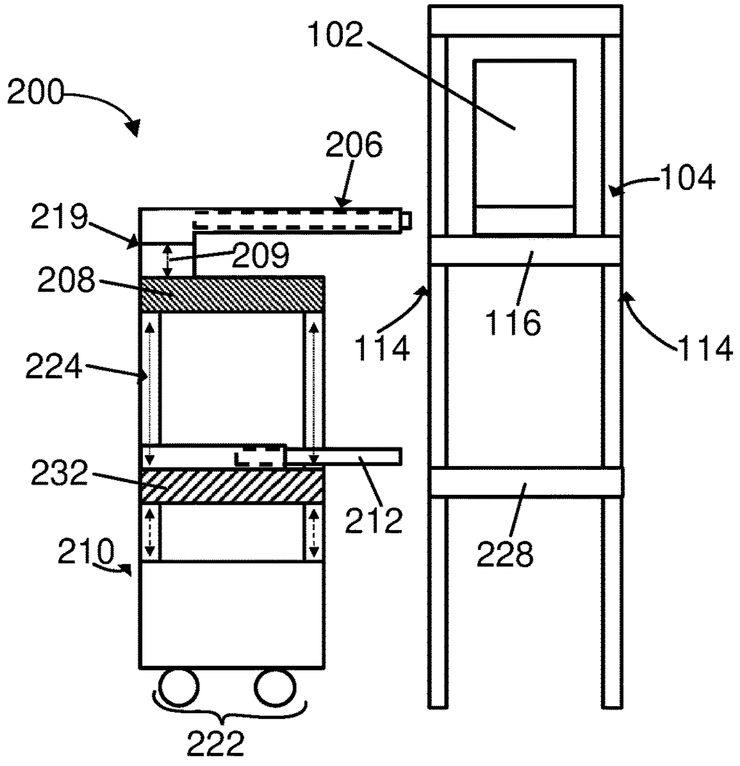
FIGS. 3A, 3B, 3C, 3D and 3E, are side view schematic illustrations of a pallet shelfing apparatus for shelf racking of a pallet unit load in shelf structure, wherein the deployable anchor features a retractably extendable spar, constructed and operative in accordance with another embodiment of the present invention.
Figure 3B:
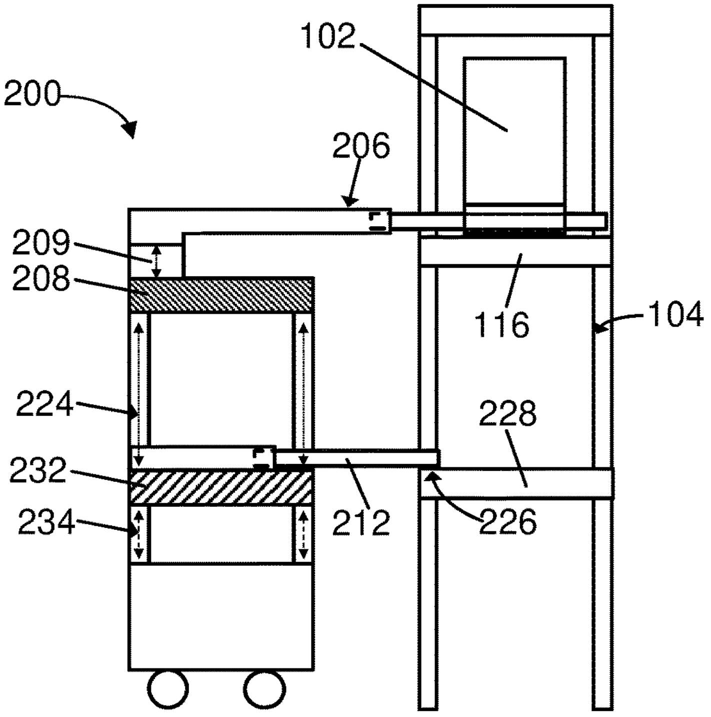
Figure 3C:
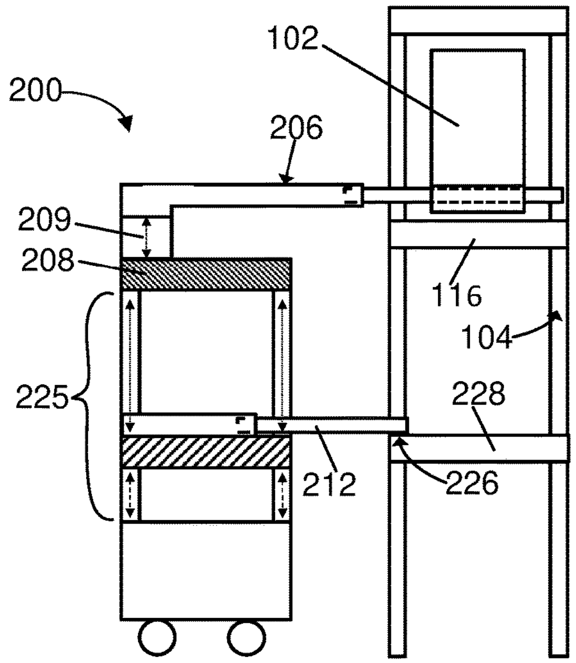
Figure 3D:
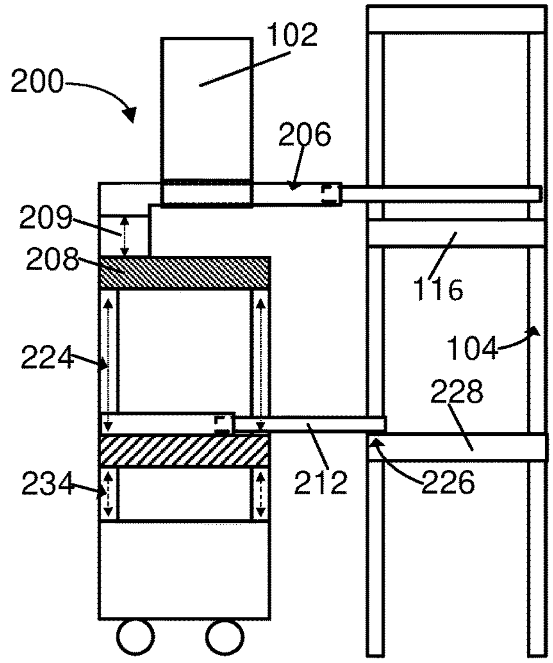
Figure 3E:
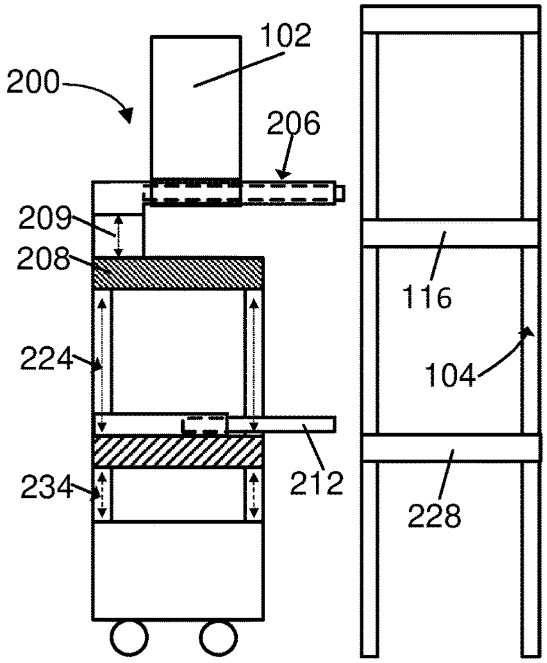

FIG. 3A is a side view schematic illustration of pallet shelfing apparatus 200 in the hibernate mode positioned in proximity to shelf structure 104, ready for loading pallet 102 which rests on shelf 116 of shelf structure 104, to apparatus 200, featuring a deployable pallet carrying structure in the form of two retractably extendable beams 206 in a retracted state (i.e., not deployed), and deployable anchor of type retractably extendable spar 206 in a retracted state (i.e., not deployed). FIG. 3B is a side view schematic illustration of pallet shelfing apparatus 200 of FIG. 3A in the loading mode with beams 206 extracted (i.e., deployed) to engage pallet 102 and spar 212 extracted (i.e., deployed) to lean on lower shelf 228 within shelf structure 104. FIG. 3C is a side view schematic illustration of pallet shelfing apparatus 200 of FIG. 3A in the loading mode wherein mount height adjustment mechanism 209 lifts extracted beams 206 and subsequently detaches pallet 102 from shelf 116, while resting on beams 206 and while spar 212 is deployed and leans on lower shelf 228. It is noted that lifting platform height adjustment mechanism 224 would have achieved the same result. FIG. 3D is a side view schematic illustration of pallet shelfing apparatus 200 of FIG. 3A in the loading mode wherein pallet 102 is conveyed by an active conveyor (not shown) over beams 206, while spar 212 remains deployed to lean on lower shelf 228 and stabilize apparatus 200, until pallet 102 is placed over platform 208. Conveying pallet 102 is further described with reference to FIGS. 18B and 18C which present examples of active pallet conveyors that are not foldable beam type. FIG. 3E is a side view schematic illustration of pallet shelfing apparatus 200 of FIG. 3A in the transport mode wherein pallet 102 is placed to rest on retracted beams 206 above platform 208 and spar 212 is also retracted. It is noted that mount height adjustment mechanism 209 can also be lowered so as to place pallet 102 to rest on platform 208.

Apparatus 200 includes at least one deployable pallet carrying structure, such as beams 206, platform 208, transporter 210, auxiliary platform 232, at least one deployable anchor in the form of retractably extendable spar 212, and mount 219 for mounting beams 206 to platform 208. Mount 219 incorporates mount height adjustment mechanism 209 for adjusting the vertical position of beams 206 with respect to platform 208. Transporter 210 includes locomotion means, depicted 222, for adjusting the ground position of apparatus 200 (and as a consequence of platform 208) and pallet lift 225. Pallet lift 225 includes two lifting mechanisms: elevator mechanism 234 for lifting auxiliary platform 232, and platform height adjustment mechanism 224 for adjusting the relative vertical position between auxiliary platform 232 and platform 208. Thereby pallet lift 225 is used to adjust the height of platform 208. Several height adjustment mechanisms are further discussed with respect to FIGS. 4, 6, 8A to 8C, 15A to 15D, 16A to 16C, 17A to 17D, and 19A to 19C.

Platform 208 is disposed outside the restricting volume 114, which is confined by the hull of shelf structure 104 when in the hibernate/transport mode, as seen in FIGS. 3A and 3E, allowing free movement of apparatus 200 in the aisles between neighboring shelf structures. Platform 208 is configured, when in the loading mode, as seen in FIGS. 3B to 3D, to be positioned in a desired position for enabling loading pallet 102 from selected shelf 116 within shelf structure 104, and is configured, when in the unloading mode, to be positioned in a desired position for enabling unloading pallet 102 to selected shelf, such as shelf 116 within shelf structure 104, as well as any other adequate loading/unloading surface. In FIGS. 3B and 3C platform 208 is positioned in proximity to shelf 116, and at an adequate height with respect to shelf 116, such that pallet 102 can be loaded from or unloaded to shelf 116.

In the hibernate mode (FIG. 3A), apparatus 200 is without a pallet and positioned in proximity to shelf structure 104, in preparation for loading pallet 102 which rests on shelf 116. Beams 206, which are mounted to platform 208, and spar 212, which is mounted to auxiliary platform 232, are all retracted and disposed outside volume 114. It is noted that proximal side 226 of shelf 228, that serves as the at least one hold, is located off ground, located off ceiling and is disposed within volume 114.

Thereafter (FIG. 3B), beams 206 are extracted into an extended state for engaging pallet 102, slightly above the upper surface of shelf 116. Spar 212 is deployed to lean on lower shelf 228 within shelf structure 104 to stabilize apparatus 200, prevent possible topple thereof, and annul most horizontal stress forces on elevator mechanism 234. Spar 212 intrudes volume 114 to engage proximal side 226 of shelf 228, which demonstrates the at least one hold. Adjustment of the particular height difference between beams 206 and spar 212, if required, is provided by platform height adjustment mechanism 224 which can adjust the relative vertical position between platform 208 and auxiliary platform 232. Mount height adjustment mechanism 209 is incorporated in mount 219, which mounts beams 206 to platform 208. Mount height adjustment mechanism 209 can be applied for adjusting the vertical distance between beams 206 and platform 208.

Thereafter, by raising mount height adjustment mechanism 209, beams 206 are lifted for detaching pallet 102 from shelf 116 while resting on beams 206 (FIG. 3C). Pallet 102 is then conveyed along beams 206, while Spar 212 continues to provide the support which serves to stabilize apparatus 200, irrespective of the movement and position of pallet 102 along extracted beams 206, and therefore achieves two main features of the pallet shelfing apparatus, namely, rendering redundant the need of placing a balancing counterweight, and essentially eliminating horizontal stress forces exerted on elevator mechanism 234, leaving most of apparatus 200 with the modest structural requirement of essentially withstanding mere vertical forces.

With reference to FIG. 3D, pallet shelfing apparatus 200 is still in the loading mode wherein spar 212 remains deployed to lean on lower shelf 228 and stabilize apparatus 200 until pallet 102 is placed above platform 208, and wherein beams 206 may remain extracted as seen, and may be withdrawn to retract gradually according to the placement of pallet 102.

With reference to FIG. 3E, once pallet 102 is positioned above platform 208, in place for lowering for resting, beams 206 and spar 212 are all retracted for transforming apparatus 200 into the transport mode. It is noted that in the transport mode, pallet 102 can be further rested directly on platform 208 by lowering mount height adjustment mechanism 209, in order to further reduce horizontal stress forces, especially on mount height adjustment mechanism 209 and platform height adjustment mechanism 224. When transporting pallet 102, it is preferable to place it as low as possible for lowering center of gravity of apparatus 200, and to that end, pallet lift 225 and consequently pallet 102, may be further lowered.

The sequence of unloading can be easily tracked along FIGS. 2A through 2E. In FIG. 2A pallet shelfing apparatus 100 is in the transport mode, carrying pallet 102, is positioned in proximity to shelf structure 104, and features retracted beams 106 with nested carry jacks 112. In FIG. 2B pallet shelfing apparatus 100 is in the initial stage of the unloading mode with its beams 106 extracted and supported on shelf 116 within shelf structure 104 by jacks 112 which are deployed to lean against far side 126 of shelf 116. In FIG. 2C pallet shelfing apparatus 100 is in the course of the unloading mode with beams 106 extracted and pallet 102 overpassed over beams 106 into shelf structure 104, above shelf 116 for placement thereon. In FIG. 2D pallet shelfing apparatus 100 is still in the unloading mode wherein pallet lift 124 lowers beams 106 while jacks 112 retract simultaneously for resting pallet 102 on shelf 116. In FIG. 2E pallet shelfing apparatus 100 of FIG. 2A is in the hibernate mode without a pallet, wherein jacks 112 are nested in retracted beams 106. Beams 106 have been retracted after resting pallet 102 on shelf 116, enabling the detachment of beams 106 from pallet 102. The loading process is close to a reverse sequence, subject to adjustments that are apparent in reference to FIGS. 3A-3E.

The sequence of loading can be easily tracked along FIGS. 3A through 3E. In FIG. 3A pallet shelfing apparatus 200 is in the hibernate mode without a pallet, positioned in proximity to shelf structure 104, and is ready for loading pallet 102 which rests on shelf 116, with retracted beams 206 and retracted spar 212. In FIG. 3B pallet shelfing apparatus 200 is in an initial stage of the loading mode with spar 212 deployed to lean on lower shelf 228 within shelf structure 104, after lifting auxiliary platform 232 with elevator mechanism 234, and with beams 206 extracted to engage pallet 102, after lifting beams 206 by mount height adjustment mechanism 209. In FIG. 3C pallet shelfing apparatus 200 is in the course of the loading mode, applying mount height adjustment mechanism 209, for lifting beams 206 for detaching pallet 102 from shelf 116 while resting on beams 206, and while spar 212 remains deployed to lean on lower shelf 228. In FIG. 3D pallet shelfing apparatus 200 is still in the loading mode wherein spar 212 remains deployed to lean on lower shelf 228 and stabilize apparatus 200 until pallet 102 is placed above platform 208, wherein beams 206 are extracted. In FIG. 3E pallet shelfing apparatus 200 is in the transport mode wherein pallet 102 is placed above platform 208, and beams 206 and spar 212 are both retracted. The unloading process is close to a reverse sequence, subject to adjustments that are apparent in reference to FIGS. 2A-2E.

As noted above, the at least one deployable pallet carrying structure may include a retractably extendable beam, that is configured to extend when deployed and to retract when not deployed. In accordance with embodiments of the pallet shelfing apparatus, the deployment of the beam for carrying, reaching and engaging the pallet may be maneuvered by the transporter. In accordance with embodiments of the pallet shelfing apparatus, the retractably extendable beam may be a drawer type beam.

In accordance with embodiments of the pallet shelfing apparatus, the pallet shelfing apparatus may further include a pallet carrying structure side shifter for selectively adjusting the lateral width between at least two pallet carrying structures of the at least one deployable pallet carrying structure, and optionally, the pallet carrying structure side shifter includes a mechanism for laterally side shifting only one of the at least two pallet carrying structures.

In accordance with embodiments of the pallet shelfing apparatus, the pallet shelfing apparatus may further include a load support jack, configured to deploy between a load supporting base and at least one selected pallet carrying structure of the at least one deployable pallet carrying structure, for vertically supporting the at least one selected pallet carrying structure. In accordance with embodiments of the pallet shelfing apparatus, the load supporting base may be located on the platform, on the transporter or on a mount for mounting the at least one selected pallet carrying structure to the platform.

In accordance with embodiments of the pallet shelfing apparatus, the at least one deployable anchor may be deployed by movement of the transporter.

In accordance with embodiments of the pallet shelfing apparatus, the pallet shelfing apparatus may include a pallet conveyor configured to carry the pallet about at least one of the at least one deployable pallet carrying structure, at a path extending between a location above the selected shelf and a location above or below the platform, for facilitating movement of the pallet at the loading mode and the unloading mode. In accordance with embodiments of the pallet shelfing apparatus, the pallet conveyor may be of a retractably extendable drawer beam type.

As mentioned above, the transporter may include ground locomotion, which may include wheels for ground engagement. In accordance with embodiments of the pallet shelfing apparatus, the ground locomotion may include a steering by wheel speed direction changing mechanism. The mechanism may include a set of four rectangularly deployed wheels, differential steering configured for activating a first pair of two oppositely disposed wheels of the set in a manner such as: (a) driving the wheels of the first pair in the same direction at the same speed for straight progression; (b) driving the wheels of the first pair in opposite directions at the same speed for spinning in place; or (c) driving the wheels of the first pair at different speeds for a turn, wherein the second pair of the two oppositely disposed wheels is allowed to skid, to steer passively and/or to be driven in a manner that emulates the steering induced by the first pair.

As noted above, the transporter may include a pallet lift for lifting the platform to a desired height. In accordance with embodiments of the pallet shelfing apparatus, a mast and a vertical carriage running there along, for lowering and lifting the platform along the mast.

Figure 4:
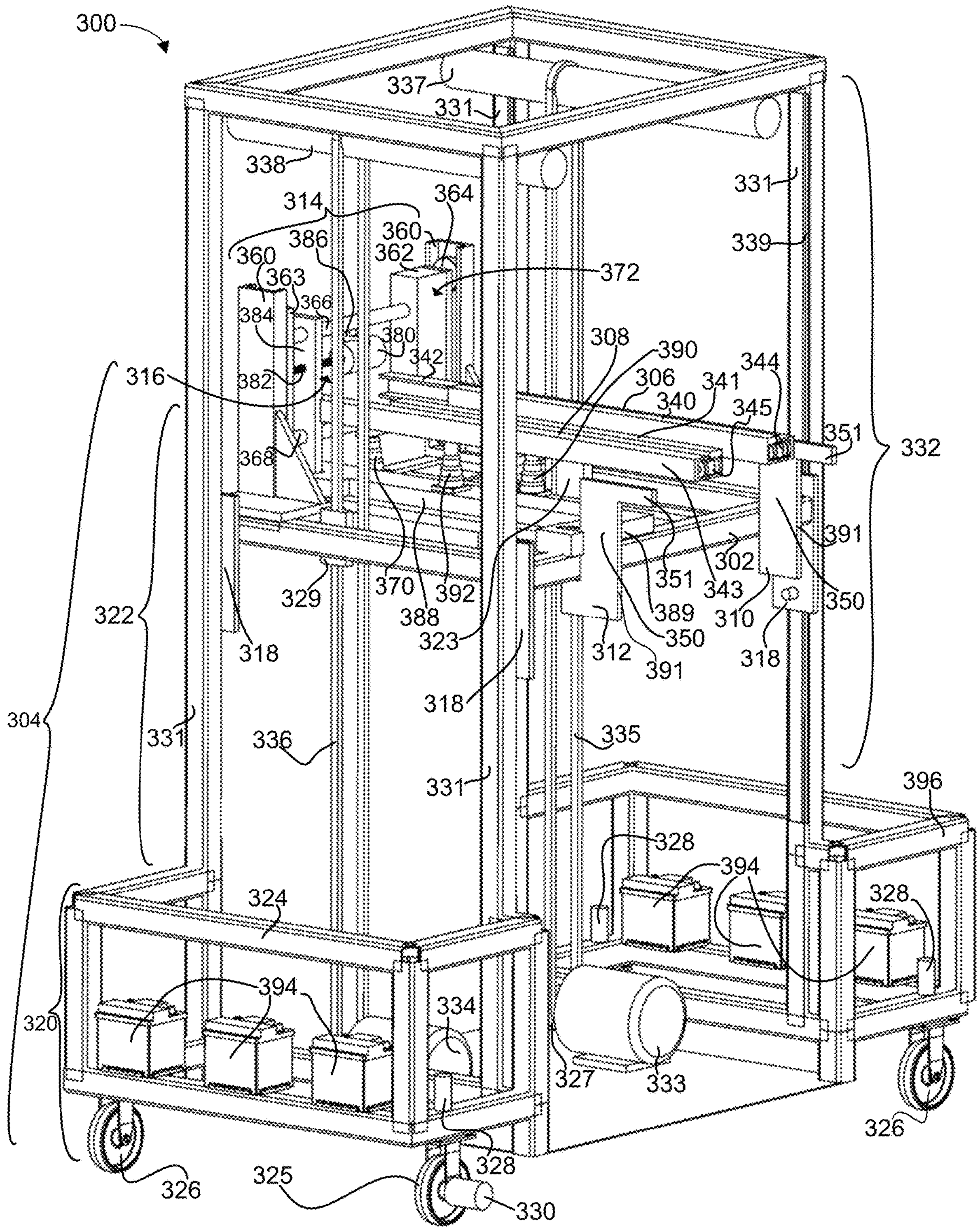
FIG. 4 is a perspective view schematic illustration of a pallet shelfing apparatus, constructed and operative in accordance with an embodiment of the present invention.

Reference is now made to FIG. 4, which is a perspective view schematic illustration of a pallet shelfing apparatus 300, constructed and operative in accordance with another embodiment of the present invention. Apparatus 300 incorporates platform 302, transporter 304, which features ground locomotion 320 and elevator 322, at least one deployable pallet carrying structure in the form of two retractably extendable drawer beams 306 and 308, which are mounted by mount 314 to platform 302, and two deployable anchors 310 and 312.

Ground locomotion 320 sets the ground position of apparatus 300 and thus of platform 302. Ground locomotion 320 incorporates locomotion chassis 324, which is located at the bottom of apparatus 300, and is set on four swivel wheels 325, 326, and 327, that are disposed at the four corners of locomotion chassis 324. The diagonally placed swivel wheels 325 and 327 are driven by two locomotion motors 330, respectively (one of locomotion motors 330, which is attached to wheel 327, is hidden behind wheel 327). Locomotion motors 330 are utilized for the ground advancement and steering of apparatus 300. Wheels 326, which are not equipped with locomotion motors, are passively steered. It is noted that wheels 326 may also be equipped with locomotion motors. It is further noted that the diagonally placed wheels 326 may serve as driven wheels in addition to or instead of wheels 325 and 327.

For advancing apparatus 300 in a straight direction at a given speed, locomotion motors 330 are set to drive their respective wheels 325 and 327 at the same speed, which translates to straight advancement with the desired ground speed. Steering of apparatus 300 can be achieved by driving wheels 325 and 327 at different respective speeds. For example, in order for apparatus 300 to steer to the right, wheel 325 is driven at a speed higher than that of wheel 327.

Swivel wheels 325, 326, and 327 are further equipped with turn motors 328. Turn motors 328 are disposed above wheels 325, 326, and 327 and are set to turn wheels 325, 326, and 327 into two orthogonal directions which are referred to as "normal" and "perpendicular". At the change from "normal" direction to "perpendicular" direction, turn motors 328 will turn in place all four swivel wheels 325, 326 and 327 at 90 degrees angle clockwise to the right (or counterclockwise to the left). At the change from "perpendicular" direction to "normal" direction, turn motors 328 will reverse the turn of wheels 325, 326, and 327. It is noted that for proper operation, after each switch between "perpendicular" direction and "normal" direction, turn motors 328, which are disposed above wheels 325 and 327, will lock wheels 325 and 327 into their new directions, while turn motors 328, which are disposed above wheels 326, will let wheels 326 swivel freely. It is further noted that such operation may be required when apparatus 300 changes from the hibernate/transport mode into load/unload mode, because it enables apparatus 300 to approach a selected shelf in a direction which is perpendicular to the initial "normal" direction of locomotion. It is further noted that the minimal number of turn motors 328 corresponds to the number of locomotion motors 330, in which case all motors 328 and 330 drive the same wheels, i.e., turn motors 328 and locomotion 330 motors are installed to turn wheels 325 and 327, while turn motors 328 which are installed to turn wheels 326, may be omitted. According to an alternative steering maneuver, turn motors 328 turn wheels 325 and 327 at 45 degrees in one rotational direction, e.g., clockwise, and turn wheels 326 at 45 degrees in the opposite rotational direction, e.g., counterclockwise, to thereby substantially arrange all four wheels along a virtual circle, wherein driving wheel 325 in one direction and wheel 327 in the opposite direction, spins apparatus 300 in place. Such maneuver is more effective when wheels 326 are also driven by locomotion motors so that all four wheels 325, 326, and 327 are driven along the virtual circle.

Elevator 322 sets the height of platform 302 as desired. Elevator 322 incorporates tower body 332 featuring four corner masts 331. Masts 331 are featured with guide slits 339 grooved along masts 331, ordered in pairs facing each other, and all facing beams 306 and 308. Four platform bearings plates 318 have bearings which are guided through slits 339, respectively. The right side of platform 302 is connected to one side of motor strap 335 by right attachment of strap attachments 329 and the left side of platform 302 is connected to one side of motor strap 336 by left attachment of strap attachments 329. Motor straps 335 and 336 are endless loop straps driven by lift motors 333 and 334, respectively, which are installed to locomotion chassis 324. Straps 335 and 336 are driven by adequate drums of motors 333 and 334. Running pulleys 337 and 338, which may incorporate sheaves, are installed to the top of tower body 332. Motor straps 335 and 336 are tautly stretched along tower body 332 between running pulleys 337 and 338 and the drums of lift motors 333 and 334, respectively, for allowing platform 302 to be lifted along tower body 332. Consequently, controlling the operation of lift motors 333 and 334, sets the height of platform 302. It is noted that for proper lifting operation, lift motors 333 and 334 are synchronized.

Mount masts 360 of mount 314 feature U-shaped cross-section profiles with central niches, whose open sides face each other. Mount masts 360 are fixedly mounted on platform 302, which in turn is mounted to platform bearings plates 318. Mount height adjustment mechanism in the form of telescopic jack 370 is operative to lift and lower mount carriage 372, along mount masts 360. Mount carriage 372 includes horizontal upper and lower carriage rods 366 and 368 that connect right and left carriage uprights 362 and 363. Mount carriage 372 is guided for moving along mount masts 360 by carriage bearings 364 of carriage uprights 362 and 363 that run along the niches of masts 360. Lower carriage rod 368 is mounted on jack 370 and any change in height of jack 370 changes the height of mount carriage 372, which is guided by mount masts 360.

Warm type pallet carrying structure side shifter in the form of beam side shifter 316 is operative to laterally slide sliding plate 384 to the sideways, along upper and lower carriage rods 366 and 368, which are inserted through adequate holes in sliding plate 384. Consequently, the sideways movement of sliding plate 384 changes the spread between beam 308, which is installed to sliding plate 384, and beam 306, which is installed to right carriage upright 362. Sliding motor 380 is connected by motor connector 386 to upper carriage rod 366, and is operational to rotate screw threaded shaft 382, which is inserted in a meshing screw threaded hole of sliding plate 384. Rotation of screw threaded shaft 382 changes the sideways lateral position of sliding plate 384, relative to sliding motor 380 along upper and lower carriage rods 366 and 368 and as a consequence changes the spread between beams 306 and 308.

Beams 306 and 308 include static beam portions 342 and 343, dynamic beam portions 340 and 341 and beam leads 344 and 345, which are inserted through the open sides of static beam portions 342 and 343 and dynamic beam portions 340 and 341, respectively. This structure of beams 306 and 308 is of a drawer type beam that can be extended by sliding dynamic beam portions 340 and 341 along beam leads 344 and 345, respectively, as well as by sliding beam leads 344 and 345 along static beam portions 342 and 343, respectively. The proximal side of static beam portion 342 is installed on right carriage upright 362 and the proximal side of static beam portion 343 is installed on sliding plate 384, which enables beam side shifter 316 to change the spread between beams 306 and 308. It is noted that the mechanism used for extraction and retraction of beams 306 and 308 is not shown and can for example be similar to the mechanism described herein below with reference to FIG. 5. It is further noted that the upper wall of dynamic beam portions 340 and 341 is designed to be higher than that of static beam portions 342 and 343, to thereby let any pallet carried by beams 306 and 308 to rest merely on dynamic beam portions 340 and 341, and to subsequently move together with dynamic beam portions 340 and 341. It is further noted that beams 306 and 308 are retractably extendable beams and are designed to also serve as the active pallet conveyor of apparatus 300. Examples of retractably extendable beams that can also serve as active pallet conveyor are described herein below with reference to FIGS. 10A to 10E, and 18D.

Deployable anchors 310 and 312 feature ears 350 that are configured for leaning on a selected shelf of a shelf structure for stabilizing apparatus 300 against the selected shelf, when loading/unloading a pallet from/to the selected shelf. Anchor 310 is fixedly installed on platform 302 to the right of beam 306. Anchor 312 is movably mounted to platform 302, and can move laterally sideways. The lateral sideways movement of anchor 312 is controlled by mechanic coupler 388 that mechanically couples between anchor 312 and sliding plate 384, thus anchor 312 moves laterally sideways (but not up and down) together with sliding plate 384. As beam 308 is installed on sliding plate 384, mechanic coupler 388, featuring coupler articulation 389 on which anchor 312 is installed, keeps anchor 312 at a constant displacement to the left of beam 308 (defined by the length of coupler articulation 389), which is essentially identical to the sideway lateral displacement between anchor 310 and beam 306. Deployment of anchors 310 and 312 is conducted by the movement of platform 302, as controlled by transporter 304, in the course of the pallet loading/unloading process from/to the target shelf. It is noted that the sideway lateral spacing between anchors 310 and 312, and beams 306 and 308, respectively, is set at a width which is adequate to allow the sideway containment of beams 306 and 308 at the hollow apertures of the pallet, while anchors 310 and 312 are sideways placed outside the pallet.

A loading/unloading process starts when apparatus 300 is initially at the hibernate/transport mode. Thereafter, transporter 304 positions platform 302 at a position appropriate for the loading/unloading mode. For the loading mode, ears 350 are positioned slightly above the selected shelf and are laterally spaced to contain in between them the pallet to be loaded (Ears 350 will be later lowered by elevator 322 to engagingly lean on the selected shelf). Anchor 310 is fixedly disposed to the right of the pallet and anchor 312 is shifted by beam side shifter 316 through mechanic coupler 388, for disposition to the left of the pallet. The spread between beams 306 and 308 is set by beam side shifter 316. The height of beams 306 and 308 is further set by mount height adjustment mechanism 370, so that beams 306 and 308 are directed to adjacently face the hollow inner apertures of the pallet. For the unloading mode, ears 350 are positioned by transporter 304 slightly above the selected shelf (ready to be lowered later by elevator 322 to engagingly lean on the selected shelf). The height of beams 306 and 308 is further set by mount height adjustment mechanism 370, so as to enable the pallet, which rests on beams 306 and 308, to move freely above the selected shelf, when beams 306 and 308 are extracted.

Once platform 302 is positioned at the appropriate position and the adjustments set by mount height adjustment mechanism 370 and by beam side shifter 316 are completed, before the actual loading/unloading initiated, anchors 310 and 312 are deployed. Turn motors 328 are changed to "perpendicular" direction and wheels 325, 326 and 327, are set to face the shelf structure. Drive wheels 325 and 327 are driven straight toward the selected shelf, until ears vertical inner parts 391 of anchors 310 and 312 engage the selected shelf. Thereafter, elevator 322 slightly lowers platform 302 until anchors 310 and 312 lean, by resting upper forwardly bulging abutments 351 of ears 350, against the proximal side of the selected shelf, stabilizing apparatus 300. It is noted that at this phase beams 306 and 308 may already be intruding the restricting volume confined by the hull of the shelf structure that contains the selected shelf.

Bulging abutments 351 protrudes forwardly, toward the front of platform 302, at a distance corresponding to the extent static beam portions 342 and 343 protrude forwardly, respective of tower body 332. Locomotion chassis 324 also protrudes forwardly, at a protrusion-extent respective of tower body 332, depicted 396, which is smaller than the protrusion-extent of ears vertical inner parts 391. Such structure is compatible with common practice in warehouses utilizing a shelf structure designed to accommodate heavy pallets, wherein the margins of the rested pallets protrude outside the volume confined by the convex hull of the shelf structure. If tower body 332 were designed at the same contour as of deployable anchors 310 and 312, tower body would collide with other pallets which are placed on other shelves (above or below the selected shelf) in the shelf structure during the phase of anchors deployment in the loading mode or the unloading mode. Typically, pallets can be rested on the ground with greater placement accuracy in comparison to those racked on shelves and accordingly require less tolerance for their proximal projection with respect to the shelf structure. This may be advantageous for increasing apparatus stability by designing locomotion chassis 324 with the widest forwardly protruding dimension, with respect to tower body 332 (below the first shelf).

In the loading mode, once anchors 310 and 312 are deployed to stabilize apparatus 300, beams 306 and 308 are then extracted over the selected shelf to be inserted into the hollow apertures of the pallet. Once extraction of beams 306 and 308 is complete, mount height adjustment mechanism 370 then lifts beams 306 and 308 to engage the pallet, until the pallet is detached from the selected shelf, while anchors 310 and 312 are still leaning against selected shelf for preventing topple down of apparatus 300. Once pallet is detached from selected shelf, beams 306 and 308 are then retracted back, conveying the pallet to a position above platform 302. The weight of pallet resting on retracted beams 306 and 308 above platform 302 still imposes an encumbrance on beams 306 and 308, which is substantially dissipated by load support jacks in the form of telescopic jacks 390 and 392, that serve as load stabilizers, and are activated to support beams 306 and 308, respectively. At this phase, apparatus 300 is essentially stable, thus elevator 322 can lift platform 302 slightly higher, to thereby detach anchors 310 and 312 from the selected shelf, and render apparatus 300 ready for the transport mode.

In the unloading mode, once anchors 310 and 312 are deployed to stabilize apparatus 300, jacks 390 and 392 are then retracted to be released from beams 306 and 308, respectively, beams 306 and 308 are then extracted, and thereby convey the pallet resting thereon, over the selected shelf until the pallet is placed at the appropriate position above the selected shelf, while anchors 310 and 312 are still leaning against the selected shelf for preventing topple down of apparatus 300. Once placement of the pallet above the selected shelf is complete, mount height adjustment mechanism 370 then lowers beams 306 and 308 until the pallet rests on the selected shelf, and then beams 306 and 308 are lowered slightly further for their disengagement from the pallet, leaving a small gap between beams 306 and 308 and the pallet. At this phase, beams 306 and 308 can be retracted to pull back into apparatus 300. Thereafter elevator 322 lifts platform 302 slightly higher, for detaching anchors 310 and 312 from the selected shelf, rendering apparatus 300 ready for the hibernate mode.

Any of the jacks and motors of apparatus 300 (e.g., 328, 330, 333, 370, 380, 390, and 392) can be electric, hydraulic, and the like, and may be powered by electric batteries 394, which are placed on locomotion chassis 324, wherein their weight also increases stability. Any of the jacks and motors of apparatus 300 may be locally, remotely, or systematically controlled by a suitable controller (not shown) which may feature an interface for operating by a human operator or controlled by an autonomous control equipment or controlled by a remote monitoring and control equipment.

Figure 5:
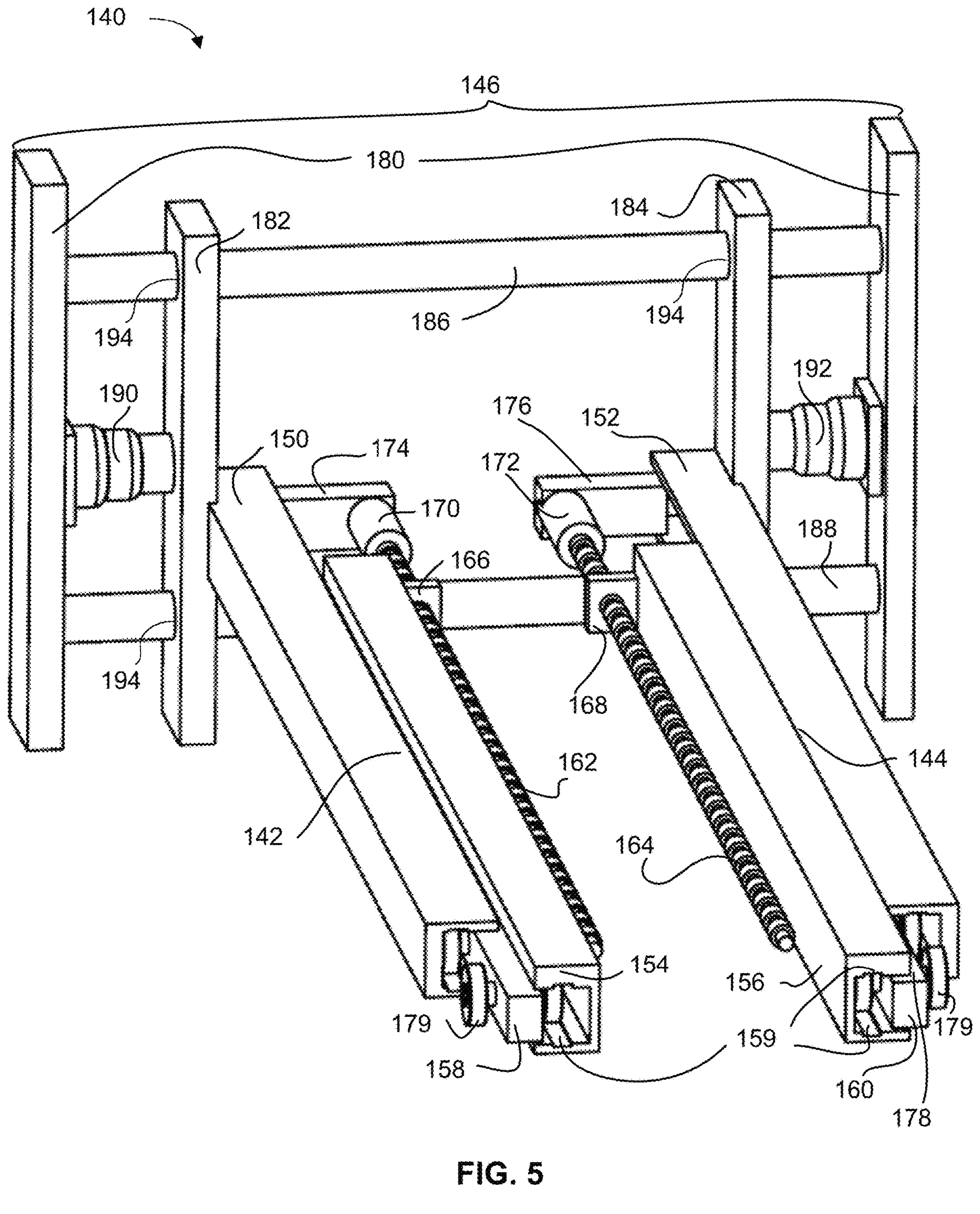
FIG. 5 is an enlarged perspective view schematic illustration of an arrangement featuring a mount with a beam side shifter, constructed and operative in accordance with another embodiment of the present invention.

Reference is now made to FIG. 5, which is an enlarged perspective view schematic illustration of an arrangement 140 featuring a mount with a pallet carrying structure side shifter in the form of a beam side shifter, constructed and operative in accordance with an embodiment of the present invention. Mount and beam arrangement 140 features two retractably extendable drawer type beams 142 and 144 which are mounted on mount 146 that incorporates a dual-sided beam side shifter having side telescopic jacks 190 and 192, and is operative to separately adjust the laterally sideway position of beams 142 and 144 and consequently also adjust the spread between beams 142 and 144 of a pallet shelfing apparatus.

Mount 146 includes mount masts 180, upper and lower mount rods 186 and 188, and left and right sliding plates 182 and 184. Mount masts 180 are horizontally connected by upper and lower mount rods 186 and 188. Mount rods 186 and 188 are inserted through adequate holes 194 within sliding plates 182 and 184 to enable the lateral sideways movement of sliding plates 182 and 184, along mount rods 186 and 188. Jack 190 is connected between left mount mast 180 and sliding plate 182, and jack 192 is connected between right mount mast 180 and sliding plate 184. Mount 146 is configured to be installed on a platform (not shown) by mount masts 180. Jacks 190 and 192 are operative to retract and extend and thereby to slide respective sliding plates 182 and 184 over mount rods 186 and 188. Beams 142 and 144 are respectively installed to sliding plates 182 and 184, and thereby the lateral sideway positions of beams 142 and 144 are changed according to the extent jacks 190 and 192 extract or contract, respectively.

Beams 142 and 144 include static beam portions 150 and 152, dynamic beam portions 154 and 156, beam leads 158 and 160, beam nuts 166 and 168, screw threaded beam shafts 162 and 164, beam expansion motors 170 and 172 and beam motor suspenders 174 and 176. Beam portions 150, 152, 154, and 156 have an elongated profile with a U-shaped cross section and are featured with guide grooves, such as guide grooves 159, running along upper and lower walls of beam portions 150, 152, 154, and 156. Beam leads 158 and 160 feature elongated bars, such as bar 178, and include equally spaced rolling elements, such as rollers 179, which are disposed all along both of their sides. The height dimension of bar 178 is slightly smaller than the vertical gap between the upper and lower walls of beam portions 150, 152, 154, and 156. Rollers 179 are contained between upper and lower grooves 159. For beam 142 (and for beam 144, respectively), static beam portion 150 (152 for beam 144) and dynamic beam portion 154 (156 for beam 144) are adjacently disposed in parallel with their open sides facing each other to create a cavity in between and the width of beam leads 158 (160 for beam 144) is slightly smaller than the width of this cavity.

Static beam portions 150 and 152 are respectively installed to sliding plates 182 and 184. Dynamic beam portions 154 and 156 are respectively placed in parallel to static beam portions 150 and 152 with their open side respectively facing static beam portions 150 and 152. Beam leads 158 and 160 are respectively inserted to static beam portions 150 and 152 and to dynamic beam portions 154 and 156, wherein guide grooves 159 of all beam portions 150, 152, 154, and 156 guide rollers 179 of beam leads 158 and 160, rendering dynamic beam portions 154 and 156 suspended on beam leads 158 and 160, respectively. When beams 142 and 144 are retracted, beam leads 158 and 160 are placed fully inside beam portions 150 and 154, 152, and 156, respectively. When beams 142 and 144 are extracted, the proximal portion of beam leads 158 and 160 is overlappingly disposed along the distal portion of static beam portions 150 and 152, respectively, and the distal portion of beam leads 158 and 160 is overlappingly disposed along the proximal portion of dynamic beam portions 154 and 156, wherein dynamic beam portions 154 and 156 are disposed distally of static beam portions 150 and 152, and thereby extend beams 142 and 144.

The mechanisms for activating extraction and retraction of beams 142 and 144 include beam nuts 166 and 168, beam shafts 162 and 164, beam expansion motors 170 and 172, and motor suspenders 174 and 176. Beam nuts 166 and 168 are screw threaded nuts, respectively fixed to the back proximal side of dynamic beam portions 154 and 156. Beam expansion motors 170 and 172 are mounted to the front proximal side of static beam portions 150 and 152 by motor suspenders 174 and 176, respectively. Beam expansion motors 170 and 172 are operative to respectively rotate beam shafts 162 and 164. Screw threaded beam shafts 162 and 164 extend along static beam portions 150 and 152 and are respectively inserted into screw threaded beam nuts 166 and 168.

Rotating beam motors 170 and 172, respectively rotate beam shafts 162 and 164, which, depending on rotation direction, pull or push beam nuts 166 and 168 towards or away from beam expansion motors 170 and 172. Dynamic beam portions 154 and 156, which are respectively attached to beam nuts 166 and 168, are thereby forced to move there along, in parallel to respective static beam portions 150 and 152, wherein dynamic beam portions 154 and 156 are suspended on beam leads 158 and 160, which are also forced by the roll of rollers 179, to move there along, but only along a fraction of the way (e.g., about halfway when expansion brings the proximal side of dynamic beam portions 154 and 156, in proximity to the distal side of static beam portions 150 and 152).

As noted above, the pallet shelfing apparatus may include an auxiliary platform and a platform height adjustment mechanism for adjusting the relative vertical position between the auxiliary platform and the platform.

In accordance with embodiments of the pallet shelfing apparatus, the platform height adjustment mechanism may be of a piston type jack, a bottle type jack, a trolley type jack, a telescopic type jack, a jackscrew type, a billet type jack, a scissors type jack, a winch type jack, and the like.

As noted above, the pallet shelfing apparatus may include a load support jack, configured to deploy between a load supporting base and at least one selected pallet carrying structure of the at least one deployable pallet carrying structure, for vertically supporting the at least one selected pallet carrying structure. In accordance with embodiments of the pallet shelfing apparatus, the load support jack may be configured to vertically lifting and lowering the at least one selected pallet carrying structure.

As noted above, the at least one deployable anchor may include a leaning stave, which is set, when deployed, between a leaning location in the pallet shelfing apparatus and the at least one hold for stabilizing the pallet shelling apparatus against the at least one hold. In accordance with embodiments of the pallet shelfing apparatus, the load supporting base may be located on the leaning stave or on the auxiliary platform. In accordance with embodiments of the pallet shelfing apparatus, the pallet shelling apparatus may further include a cavity in which the load support jack is nested when not deployed.

As noted above, the pallet shelfing apparatus may further include a carry jack attached to at least one selected pallet carrying structure of the at least one deployable pallet carrying structure, wherein the carry jack is configured to deploy for engaging the at least one hold which serves as a supporting base for vertical expansion of the carry jack when the at least one selected pallet carrying structure is deployed. In accordance with embodiments of the pallet shelfing apparatus, both the carry jack and the load support jack may be of a diamond-type jack, a billet type jack, a trolley type jack, a telescopic type jack, a jackscrew type, a hinged type jack, a winch type jack, a bottle type jack, a fluid stream type jack, an electromagnetic type jack, and the like.

As noted above, the at least one deployable anchor may include a retractably extendable spar, configured to extract, when deployed, for stabilizing the pallet shelfing apparatus, and to retract when not deployed. In accordance with embodiments of the pallet shelfing apparatus, the retractably extendable spar may be of a telescopic type spar.

In accordance with embodiments of the pallet shelling apparatus, the pallet shelfing apparatus may further include a loading/unloading direction altering mechanism for changing the deployment direction of the at least one deployable pallet carrying structure and the loading/unloading direction altering mechanism may include a laterally pivotable mechanism within the auxiliary platform.

As noted above, the pallet shelfing apparatus may further include a pallet conveyor configured to carry the pallet about at least one selected pallet carrying structure of the at least one deployable pallet carrying structure at a path extending between a location above the selected shelf and a location above or below the platform, for facilitating movement of the pallet at the loading mode and the unloading mode. In accordance with embodiments of the pallet shelfing apparatus, the pallet conveyor may be a gravitational movement pallet conveyor, wherein a vertical pivoting of the at least one selected pallet carrying structure, with respect to the platform, is activated, at the loading mode and/or the unloading mode, for inducing gravitational slide of the pallet about the at least one selected pallet carrying structure, at a path extending between a location above the selected shelf and a location above or below the platform. In accordance with embodiments of the pallet shelfing apparatus, the vertical pivoting may be activated by a designated pivot drive and/or by a carry jack of the at least one deployable anchor, wherein the carry jack is attached to at least one selected pallet carrying structure, and the carry jack is configured to deploy for engaging the at least one hold which serves as a supporting base for vertical expansion of the carry jack when the at least one selected pallet carrying structure is deployed. In accordance with embodiments of the pallet shelfing apparatus, activation, deactivation, velocity, acceleration and direction of the gravitational slide may be controlled by a controller operational for changing the tilt of the vertical pivoting, and thereby controlling pallet movement.

As noted above, the at least one deployable pallet carrying structure may include a beam. In accordance with embodiments of the pallet shelfing apparatus, the pallet conveyor may be a trolley running over the beam.

As noted above, the transporter may include a pallet lift for lifting the platform to a desired height, and may further include ground locomotion, which may include wheels for ground engagement. In accordance with embodiments of the pallet shelfing apparatus, the pallet lift can be of scissors type lift mechanism. In accordance with embodiments of the pallet shelfing apparatus, the wheels include two perpendicular sets of wheels, wherein each perpendicular set is aligned for movement in a direction perpendicular to the alignment of the other set, and wherein one of the perpendicular sets is activated and interfacing the ground while the other set being raised above ground to avoid friction.

Figure 6:
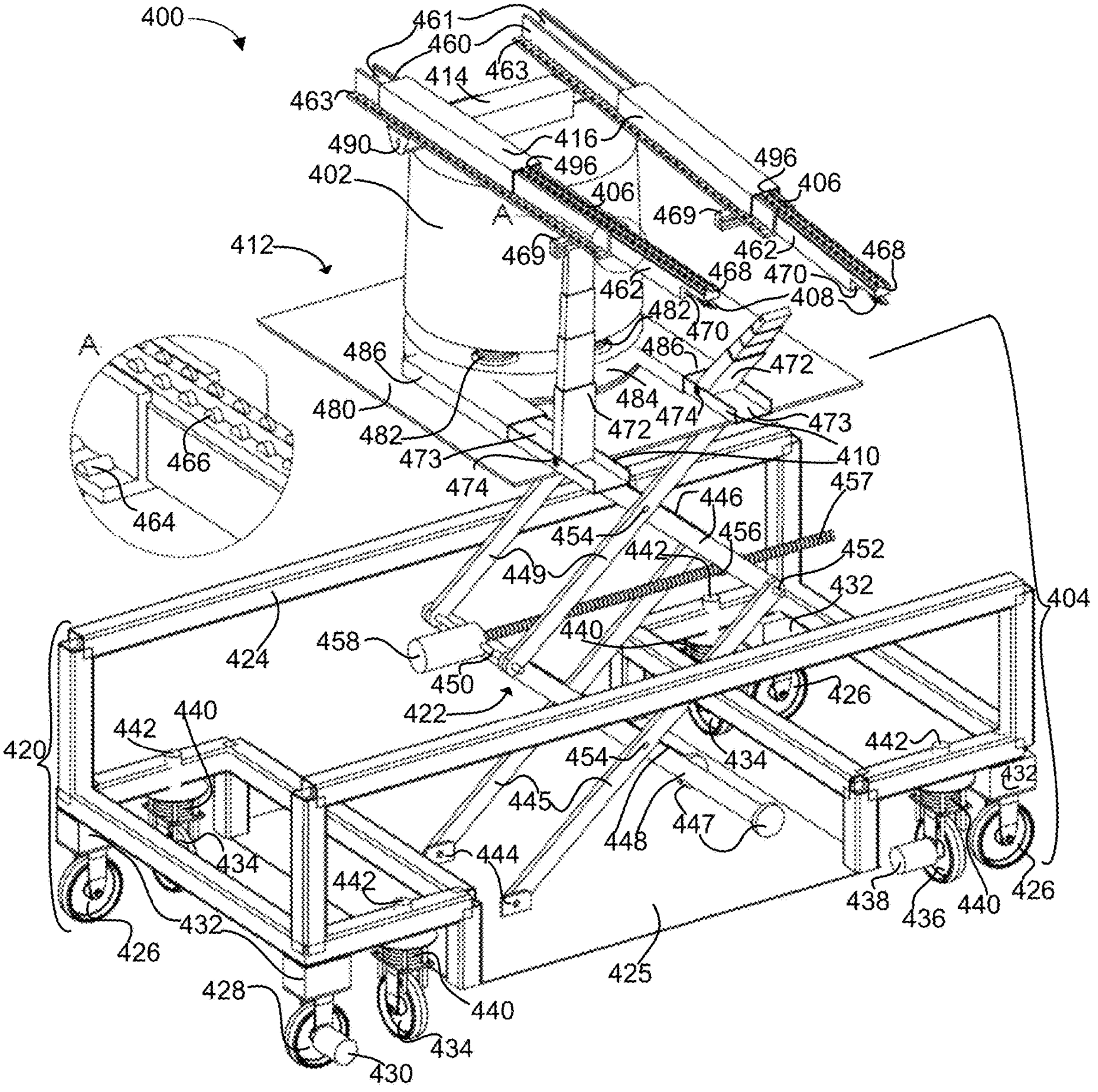
FIG. 6 is a perspective view schematic illustration of a pallet shelfing apparatus, constructed and operative in accordance with another embodiment of the present invention.

Reference is now made to FIG. 6, which is a perspective view schematic illustration of a pallet shelfing apparatus 400, constructed and operative in accordance with another embodiment of the present invention. Apparatus 400 incorporates platform 402, transporter 404 which features ground locomotion 420 and scissors lift 422, a deployable pallet carrying structure in the form of two telescopic retractably extendable beams 406, which are mounted by mount 414 to platform 402, two deployable anchors in the form of diamond-type carry jacks 408, two deployable anchors in the form of retractably extendable spars 410, auxiliary platform 412, platform height adjustment mechanism in the form of screw jacks 482, two pallet conveyors in the form of trolleys 416, and two load support jacks in the form of telescopic hinged jacks 472.

Ground locomotion 420 sets the ground position of apparatus 400 and thus of platform 402. Ground locomotion 420 includes locomotion chassis 424, two sets of four wheels, wherein the first set of locomotion wheels includes wheels 426 and 428, and the second set of locomotion wheels includes wheels 434 and 436, drive motors 430 and 438, and direction changing mechanism that includes knuckle jackscrews 440, driven by direction motors 442. Locomotion chassis 424 is located at the bottom of apparatus 400, and is set on the first set of locomotion wheels 426 and 428, which are disposed at the four corners of locomotion chassis 424, through fixed height wheel knuckles 432, and are pointing in the direction to which apparatus 400 moves when advancing in an aisle between neighboring shelf structures. Wheels 434 and 436 of the second set of locomotion wheels are placed next to wheels 426 and 428 of the first set of locomotion wheels, pointing in a direction which is perpendicular to the direction of the first set of locomotion wheels 426 and 428. The second set of locomotion wheels 434 and 436 is connected to locomotion chassis 424 through four knuckle jackscrews 440, which are operated by four direction motors 442. Knuckle jackscrews 440 control the rotation direction of wheels 434 and 436. Direction motors 442 are operative to pull knuckle jackscrews 440 until, at minimal expansion, render knuckle jackscrews 440 to be shorter than wheel knuckles 432, and to push knuckle jackscrews 440 until, at maximal expansion, render knuckle jackscrews 440 to be taller than wheel knuckles 432. Accordingly, the push or pull of knuckle jackscrews 440 defines which set engages the ground and thereby the direction of transport of apparatus 400. Wheels 428 and 436 are respectively driven by locomotion motors 430 and 438. Locomotion motors 430 and 438 are responsible for the ground advancement of apparatus 400. Wheels 426 and 434 which are not equipped with locomotion motors are passively steered. It is noted that wheels 426 and 434 may also be equipped with locomotion motors, but such locomotion motors will have to be respectively synchronized with locomotion motors 430 and 438 for proper operation. It is further noted that any of wheels 426 and 434 can be equipped with locomotion motors instead of wheels 428 and 436, respectively.

Both sets of locomotion wheels are installed for rolling and carrying apparatus 400 at a particular direction, in perpendicular to the direction of the other set. In other words, the directions of the first set of locomotion wheels 426 and 428 and the second set of locomotion wheels 434 and 436 are mutually orthogonal, for suiting common warehouses that are usually arranged in rectangular configuration leaving strait aisles arranged in two perpendicular directions. The advancement direction is selected by activating the appropriate set of locomotion wheels. When knuckle jackscrews 440 are fully expanded, locomotion chassis 424 rises together with the first set of locomotion wheels 426 and 428, that disengage the ground, leaving only the second set of locomotion wheels 434 and 436 to transport apparatus 400 in the direction set thereby. When knuckle jackscrews 440 are retracting, chassis 424 descends until the first set of locomotion wheels 426 and 428 engages the ground, and as knuckle jackscrews 440 continue to retract, the second set of locomotion wheels 434 and 436 is pulled upwards until it is fully disengaged from the ground leaving only the first set of locomotion wheels 426 and 428 to transport apparatus 400 in the direction set thereby. Knuckle jackscrews 440 may be operated to partially retract such that all eight wheels engage the ground for locking apparatus 400 in its position and providing extra stabilization which may be suitable for loading/unloading.

Scissors lift 422 sets the height of platform 402 as desired. Scissors lift 422 includes four lock lift bars 445 and 446, four roll lift bars 448 and 449 and lift drive mechanism that includes lift motor 458, lift shaft 457, and lift nut 456. Lock lift bars 445 are mounted on the left side of lift base 425, which is a part of locomotion chassis 424, by bar shoes 444. Lock lift bars 446 are mounted to the bottom of auxiliary platform 412 at its left side by bar shoes (not shown). Lock lift bars 445 and 446 are all hinged by lift nut axle 452. Roll lift bars 448 are equipped at their bottom ends with bar wheels 447, which engage and roll over lift base 425. Roll lift bars 449 are equipped at their top ends with similar upper bar wheels which engage and roll below the bottom of auxiliary plate 480 (upper bar wheels are not seen as they are concealed below auxiliary plate 480). The wheeled ends of roll lift bars 448 are placed on the right side of lift base 425, the wheeled ends of roll lift bars 449 are placed on the bottom right side of auxiliary platform 412 and the other ends of roll lift bars 448 and 449 are hinged by lift drive axle 450. Lift axle 450 and nut axle 452 are of the same length and placed approximately in parallel, such that the middle points of lock lift bars 445 and 446 and roll lift bars 448 and 449 intersect, respectively, and are hinged at the intersection points by hinge pins 454. Bar shoes 444, lift axle 450, nut axle 452 and hinge pins 454, are all passively hinged which for enabling lift bars 445, 446, 448, and 449 to rotate freely about their hinges, clockwise and counterclockwise.

Lift motor 458 is mounted on the middle of lift axle 450 and lift nut 456 is mounted on the middle of nut axle 452. Lift shaft 457 is a screw threaded shaft, which is inserted into lift nut 456, and is connected to lift motor 458. Lift motor 458 is operative to rotate lift shaft 457. Rotating lift motor 458 in one direction pulls lift nut 456 to reduce the gap between lift motor 458 and lift nut 456, pulls closer lift bars 445, 446, 448, and 449, forces bar wheels 447 to roll left wise and consequently raise auxiliary platform 412 (and platform 402 there with). Rotating lift motor 458 in the other direction pushes lift nut 456 to increase the gap between lift motor 458 and lift nut 456, pushes farther lift bars 445, 446, 448, 449, forces bar wheels 447 to roll right wise and consequently lower auxiliary platform 412. It is noted that the movement of auxiliary platform 412 is not merely vertical and additionally involves a sideways movement which can be compensated by ground locomotion 420.

Auxiliary platform 412 includes auxiliary plate 480, jackscrew type platform height adjustment mechanism 482, base turret 484, and spar shells 486. Auxiliary plate 480 is set on lift bars 446, 449 and its height is changed according to their movement. Base turret 484, mounted on auxiliary plate 480, is a rotating turret that can alter the operation direction of apparatus 400, e.g., by rotating 180 degrees. Functional elements of apparatus 400, which are required for loading/ unloading a pallet (i.e., platform 402, retractably extendable beams 406 with their carry jacks 408, deployable spars 410, mount 414, trolleys 416 and load support jacks 472), rotate together with turret 484 at 180 degrees. Spar shells 486 serve as shells for spars 410 from which spars 410 deploy to engage designated holds and retract to be stored when not in use. Platform height adjustment mechanism 482, placed between base turret 484 and platform 402, is operative to change the relative height between auxiliary platform 412 (and thus spars 410) and platform 402 by changing the expansion of jackscrew type platform height adjustment mechanism 482. Platform height adjustment mechanism 482 is required when apparatus 400 needs to lean on a surface placed below the selected shelf intended for loading/unloading, for stabilizing apparatus 400 when loading/unloading a pallet.

Spars 410 are disposed within spar shells 486 and are operative to retract and be fully or partially contained within spar shells 486, when not in use, and to deploy outside of spar shells 486 to engage a hold placed on the proximal side of a lower shelf, which is lower than the selected shelf within the shelf structure, in order to stabilize apparatus 400. Deploying spars 410 to engage a lower shelf, when the pallet is resting on extracted beams 406 (through trolleys 416), almost nulls the horizontal stress forces imposed by the pallet on scissors lift 422, without affecting the stress forces applied to platform 402 and platform height adjustment mechanism 482.

Telescopic load support jacks 472 are pivotally mounted on mid front of spars 410 by hinges 474. Jacks 472 are operative in three different ways, according to the operation mode of apparatus 400. In the loading/unloading mode, jacks 472 are operative to raise or lower distal side of beams 406, by collapsing and expanding, applying pressure to beams 406 through engaging jack grippers 469, in order to control beams 406 tilt angle with reference to platform 402 and thus control the movement parameters of trolleys 416, which slide on beams 406 by gravitational force. In the transport mode, jacks 472 are operative to serve as load stabilizers and support beams 406 through engaging grippers 469, when the pallet rests on trolleys 416, which are located above platform 402, ready to be transported. In the hibernate mode, jacks 472 are not in use and can be fully collapsed into spar cavities 473. It is noted that at different modes jacks 472 engage grippers 469 in different angles, depending on the state of spars 410 and to that end, hinges 474 have drivers with a suitable locking mechanism (not shown) to prevent possible slippage of jacks 472, that controls the support angle and locking of jacks 472.

Beams 406 are telescopically retractably extendable, and include static beam portions 460 and dynamic beam portions 462. Static beam portions 460 features upward facing static beam conduits 461 disposed there along, and lateral beam steps 463 extending there along at the bottom. Rollers, such as step rollers 464 are disposed over beam steps 463, and are operative to roll in the expansion and retraction directions of beams 406. Dynamic beam portions 462 feature lead grooves 468 there along and beam cavities 470 at their distal side. Dynamic beam portions 462 include deployable anchors in the form of diamond-type carry jack 408 that are mounted at beam cavities 470. Rollers, such as beam rollers 466, are disposed over the top of dynamic beam portions 463 on both sides of lead grooves 468, and are operative to roll in the expansion and retraction directions of beams 406.

Dynamic beam portions 462 are operative to expand and retract within static beam portions 460 forming together retractably extendable beams 406 which are operational for use in the loading/unloading process.

Diamond-type carry jacks 408 are operative to deploy for supporting beams 406 against the far side of the selected shelf during loading/unloading of the pallet and thereby stabilize apparatus 400 as well as function as a beam distal side lift mechanism to control beams 406 tilt angle for controlling the movement parameters of trolleys 416, which freely slide on beams 406 by gravitational force. Carry jacks 408, when not deployed, are retracted and contained within beam cavities 470. While spars 410 stabilize apparatus 400 in the loading/unloading mode, jacks 408 add to this stabilization. If load support jacks 472 are not in use for stabilization, the use of carry jacks 408 can still be applied to essentially null the horizontal stress forces imposed on platform 402 and platform height adjustment mechanism 482 (which might be a phase in the loading/unloading mode, at some work profiles). Further description of diamond-type jack operation is given hereafter with reference to FIG. 11.

Trolleys 416 feature an inverted U-shaped cross-section profile disposed with their open side covering beams 406. Trolleys 416 feature elongated V-shaped lead protrusions 496, bulging downwardly along the middle of the upper inner wall of trolleys 416. Trolleys 416, when placed over beams 406, rest by their sidewall bottom brim on the rolls of beam steps 463, and are slightly taller than static beam portions 460, such that their lead protrusions 496 are fitted to be contained from above within lead grooves 468. Thereby, trolleys 416 can freely slide over beams 406—when placed above static beam portions 460, by means of the rollers of beam steps 463, and are further guided by static beam portions 460 placed there below, and when placed above dynamic beam portions 462, by means of rollers disposed over the top of dynamic beam portions 462, and are further guided by lead grooves 468 that guide lead protrusions 496. It is noted that trolleys 416 together with beam steps 463 and the top of dynamic beam portions 462 form a gravitational-movement pallet conveyor.

Beams 406 are mounted to mount 414 at the bottom proximal side of static beam portions 460, by vertically tiltable mount tilt joint 490. Mount 414 is fixedly installed on platform 402, which in turn is installed on base turret 484 of auxiliary platform 412 by jackscrew type platform height adjustment mechanism 482. Platform height adjustment mechanism 482 is operative to raise and lower platform 402 together with beams 406, as required during the loading/unloading process.

Use of spars 410 with load support jacks 472 and of carry jacks 408 as two sets of deployable anchors and beam distal side lift mechanisms is practical in some instances, wherein each set can be deployed only part of the time, when conveying a pallet, during the loading/unloading process. For example, if the pallet to be conveyed features a bottom plate, carry jacks 408 cannot be deployed when the pallet is placed over the selected shelf, and load support jacks 472 cannot be deployed when the pallet is placed above jack grippers 469. The loading/unloading process described hereafter refers to such a pallet.

A loading/unloading process starts when apparatus 400 is initially in the hibernate/transport mode. Thereafter, transporter 404, platform height adjustment mechanism 482 and base turret 484 position auxiliary platform 412 and platform 402 at a position appropriate for the loading/unloading mode. For both the loading mode and the unloading mode the sequence starts when ground locomotion 420, places apparatus 400 at an appropriate ground location, base turret 484 sets apparatus 400 at an appropriate operation direction and scissors lift 422 appropriately sets the height of deployable spars 410 slightly above a support shelf, which is located below the selected shelf within the shelf structure. For the loading mode, thereafter, the height and ground location of beams 406 is further set by ground locomotion 420 and by platform height adjustment mechanism 482, such that beams 406 are directed to adjacently face the hollow inner apertures of the pallet. For the unloading mode, thereafter, the height and ground location of beams 406 is further set by ground locomotion 420 and by platform height adjustment mechanism 482, so as to enable the pallet, resting on beams 406, to move freely above the selected shelf, when trolleys 416 carry the pallet to the selected shelf, right after extraction of beams 406. For the sake of simplicity, the description herein above is made under the assumption that in both the hibernate mode and the transport mode, load support jacks 472 support beams 406 in horizontal balance, through jack grippers 469. Further, for the sake of simplicity, the description herein above is made under the assumption that in both the hibernate mode and the transport mode, trolleys 416 are initially placed at the rear proximate side of beams 406, whether in the transport mode with a pallet thereon, or in the hibernate mode without a pallet.

Once auxiliary platform 412 and platform 402 are positioned at the appropriate position, before the actual loading/unloading is initiated, deployable spars 410 are extracted so that their distal side is positioned just above the proximal side of the support shelf. Spars 410 are extracted, and the drivers, lock mechanism and controls of load support jacks 472 (not shown) set the tilt angle and expansion of load support jacks 472, which engage beams 406 through jack grippers 469, so as to keep beams 406 horizontally balanced. Thereafter, scissors lift 422 slightly lowers auxiliary platform 412 until spars 410 lean against the proximal side of the support shelf, for stabilizing apparatus 400. Thereafter beams 406 are extracted by extracting dynamic beam portions 462 from static beam portions 460 until carry jacks 408 are placed above the distal side of the selected shelf.

In the loading mode, once carry jacks 408 are placed above the distal side of the selected shelf, load support jacks 472 are slightly retracted and/or platform height adjustment mechanism 482 is slightly raised to propel empty trolleys 416 toward the distal side of beams 406, by sliding initially on rollers 464 of beam steps 463 while being guided by static beam portions 460, when disposed thereover, and thereafter by sliding on rollers 466 disposed on top of dynamic beam portions 462 while being guided by lead grooves 468, when disposed over dynamic beam portions 462. While trolleys 416 are moving along beams 406, controller of apparatus 400 (not shown) changes the state of load support jacks 472 and/or platform height adjustment mechanism 482 for controlling the tilting angle of beams 406 and thereby controlling the movement of trolleys 416. Trolleys 416 are brought to a stop, just before reaching the distal end of dynamic beam portions 462, which resides within the hollow inner apertures of the pallet. It is noted that trolleys 416 must be horizontally balanced, upon stopping. Load support jacks 472 and platform height adjustment mechanism 482 are simultaneously raised for detaching the pallet from the selected shelf, and for resting the pallet on trolleys 416, while spars 410 still lean on the support shelf, stabilizing apparatus 400. Thereafter load support jacks 472 are slightly extracted and/or platform height adjustment mechanism 482 is slightly lowered to propel pallet loaded trolleys 416 to slide toward the proximal side of beams 406, while controller of apparatus 400 changes the state of load support jacks 472 and/or platform height adjustment mechanism 482, in order to control the tilt angle of beams 406 and thereby the movement of trolleys 416, and bring them to a stop just before reaching load support jacks 472. At this phase the pallet bottom plate is disposed below static beam portions 460 and 462 and any further proximal advancement would be blocked by erect load support jacks 472 that are gripped by beams 406 at grippers 469. Also, at this phase the pallet has already cleared away the distal side of the selected shelf and the pallet bottom plate is no longer blocking the gap between carry jacks 408 and the distal side of the selected shelf. Thereafter carry jacks 408 are deployed against the distal side of the selected shelf and load support jacks 472 are collapsed into spars 410. It is noted that the bottom plate of the pallet cannot pass load support jacks 472 unless they are detached from beams 406. Once load support jacks 472 are detached from grippers 469 and are collapsed, controller of apparatus 400 resumes movement of pallet loaded trolleys 416 toward the proximal side of beams 406, by controlling the state of carry jacks 408 and/or platform height adjustment mechanism 482 and bring trolleys 416 to a stop just before reaching the proximal end of static beam portions 460. At this phase the pallet had already cleared away the location of grippers 469. Thereafter, load support jacks 472 are deployed again to engage grippers 469, in order to serve as load stabilizers and keep beams 406 horizontally balanced, carry jacks 408 are retracted and disengage the selected shelf, dynamic beam portions 462 are retracted to fold into static beam portions 460, scissors lift 422 slightly raises auxiliary platform 412 to disengage spars 410 from the support shelf, and spars 410 are retracted, while load support jacks 472, through grippers 469, keep supporting beams 406 horizontally balanced, to render apparatus 400 ready for the transport mode.

In the unloading mode, once carry jacks 408 are placed above the distal side of the selected shelf, carry jacks 408 are deployed against the distal side of selected shelf and load support jacks 472 are collapsed into spars 410. Thereafter, a controller of apparatus 400 (not shown) propels pallet loaded trolleys 416 toward the distal side of beams 406, by controlling the state of carry jacks 408 and/or platform height adjustment mechanism 482 and brings trolleys 416 to a stop just before reaching deployed carry jacks 408.

At this phase the bottom plate of the pallet cannot pass deployed carry jacks 408 and the pallet is already cleared away from the location of grippers 469. Thereafter, load support jacks 472 are extracted to engage grippers 469 and carry jacks 408 are retracted into beam cavities 470, clearing the way for the pallet. Thereafter, the controller of apparatus 400 resumes movement of pallet loaded trolleys 416 toward the distal side of beams 406, by controlling the state of load support jacks 472 and/or platform height adjustment mechanism 482 and brings trolleys 416 to a stop just before reaching the distal end of dynamic beam portions 462. Thereafter, load support jacks 472 and platform height adjustment mechanism 482 are simultaneously lowered for resting the pallet on the selected shelf and then are further slightly lowered for allowing disengagement of beams 406 and thus trolleys 416 from the pallet. At this phase, the controller of apparatus 400 propels trolleys 416 toward the proximal side of beams 406, by controlling the state of load support jacks 472 and/or platform height adjustment mechanism 482 and brings trolleys 416 to a stop just before reaching the proximal end of static beam portions 460. Dynamic beam portions 462 are then retracted to fold into static beam portions 460, scissors lift 422 slightly raises auxiliary platform 412 to disengage spars 410 from the support shelf, and spars 410 are retracted, while load support jacks 472, through grippers 469, keep supporting beams 406 horizontally balanced, to render apparatus 400 ready for the hibernate mode.

Any of the jacks and motors of apparatus 400 (e.g., 430, 438, 442, 458, and 482) can be electric, hydraulic, and the like, and may be powered by electric batteries, which are placed on locomotion chassis 424, wherein their weight also increases stability. Any of the jacks and motors of apparatus 400 may be locally, remotely, or systematically controlled by a suitable controller (not shown) which may feature an interface for operating by a human operator or controlled by an autonomous control equipment or controlled by a remote monitoring and control equipment.

In accordance with embodiments of the pallet shelfing apparatus, the volume confined by the convex hull of a shelf structure or the volume confined by the hull of a shelf structure includes the lowest shelf of the shelf structure, and its bottom can include the ground or can be disposed off ground.

Reference is now made to FIGS. 7A and 7B, which are top view schematic illustrations of shelf structures, constructed and operative in accordance with further embodiments of the present invention.

FIG. 7A is a top view schematic illustration of a common two back and front bars shelf structure for pallets, depicted 700, featuring upright shelf columns 701 and 702, shelf bars 704 and 707, and shelf support poles 706. Upright shelf columns 701 and 702 are respectively arranged in two evenly spaced rows 703 and 705, such that each of upright shelf columns 701 adjacents a parallel upright column of upright shelf columns 702. Shelf bars 704 are fitted between two adjacent upright columns of upright shelf columns 701. Shelf bars 707 are fitted between two adjacent upright columns of upright shelf columns 702. Each of shelf bars 704 is paired with a parallel bar of shelf bars 707 at the same height to thereby form together a shelf. At least one of shelf support poles 706 is fitted across rows 703 and 705, between one of upright shelf columns 701 and an adjacently parallel column of upright shelf columns 702, to connect rows 703 and 705 thereon (not necessarily for all parallel columns or shelves), and thus to keep rows 703 and 705 equidistantly connected and stabilized. The convex hull (surface) of shelf structure 700 is depicted 708. Pallets, when racked, are rested on the shelves (formed by parallel bars of shelf bars 704 and 707) by embodiments of the present invention.

FIG. 7B is a top view schematic illustration of a two side bars shelf structure for pallets, depicted 720, featuring upright shelf columns 722 and 727, shelf side bars 724, and shelf support poles 726. Upright shelf columns 722 and 727 are respectively arranged in two evenly spaced rows, 723 and 725, such that each upright column of upright shelf columns 722 adjacents a parallel upright column of upright shelf columns 727. Two bars of shelf side bars 724 are fitted at the same height across rows 723 and 725 to the side of four adjacent upright columns of upright shelf columns 722 and 727, wherein each of these two bars connects one of upright shelf columns 722 with another of upright shelf columns 727, and wherein these two bars face each other to form a shelf between the four adjacent upright columns of upright shelf columns 722 and 727. Shelf side bars 724 also provide an equidistant mount between rows 723 and 725 along each shelf. At least one pole of shelf support poles 726 is fitted between two adjacent upright columns of upright shelf columns 727, to connect them along row 725. Shelf support poles 726 may be mounted at the same height along one shelf or eclectically mounted at different heights, as sufficient to keep upright shelf columns 722 and 727 stabilized along row 725, as required for supporting shelf structure 720. The convex hull (surface) of shelf structure 720 is depicted 728. Pallets, when racked, are rested on the shelves (formed by pairs of parallel adjacent side bars of shelf side bars 724) by embodiments of the present invention.

Figure 13A:
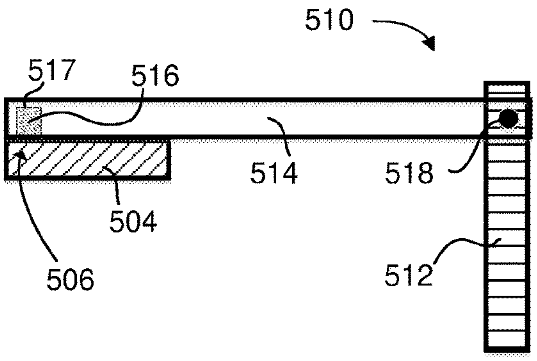
FIGS. 13A and 13B are side view schematic illustrations of an embodiment having a deployable pallet carrying structure in the form of a beam and an anchor in the form of a jackscrew carry jack, constructed and operative in accordance with another embodiment of the present invention.
Figure 13B:
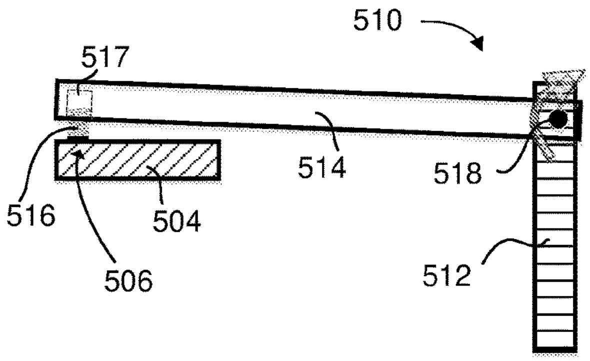

Positioning configurations of the deployable pallet carrying structure and the deployable anchor may include any relative positioning of the two. The deployable anchor may also support the deployable pallet carrying structure and/or optionally lift at least part of the deployable pallet carrying structure, from above or below. Further optionally, a hold, which may be used for supporting the deployable anchor, may include a target shelf of a shelf structure, another shelf in the same shelf structure, another shelf in another shelf structure, the ceiling, and/or the floor. For the sake of demonstrative explanation, the deployable pallet carrying structure shall be considered now in the form of a retractably extracted beam. Such exemplary positioning configurations may include, inter alias (a) The distal side of the extracted beam is pulled up from the target shelf toward the ceiling by the deployable anchor, that also functions as a beam distal side lift mechanism. The deployable anchor can engage the extracted beam at its distal side at a location posterior to the convex hull of the shelf structure and can engage the extracted beam at some medial point of the extracted beam at a location anterior to the convex hull of the shelf structure;

(b) The distal side of the extracted beam is pushed up from the target shelf by the deployable anchor, that also functions as a beam distal side lift mechanism. The deployable anchor can engage the extracted beam at the beam distal side and/or at some medial point of the extracted beam at a location within the convex hull of the shelf structure. An example of a deployable anchor in the form of a beam jack that pushes the distal side of an extracted beam against a hold located on target shelf is illustrated in FIGS. 13A and 13B;

(c) The distal side of the extracted beam is pushed up from the target shelf by the deployable anchor, that also functions as a beam distal side lift mechanism. The deployable anchor can engage the extracted beam at the beam distal side at a location posterior to the convex hull of the shelf structure and can engage the extracted beam at some medial point of the extracted beam at a location anterior to the convex hull of the shelf structure;

(d) The extracted beam is mounted to a platform of the pallet shelfing apparatus by a tilting joint at some medial point of the extracted beam. The proximal side of the extracted beam is pushed down by the deployable anchor which leans against the bottom of another shelf that resides within a different shelf structure, rearwardly located behind the platform. The deployable anchor also functions as a beam distal side lift mechanism.

Figure 16A:
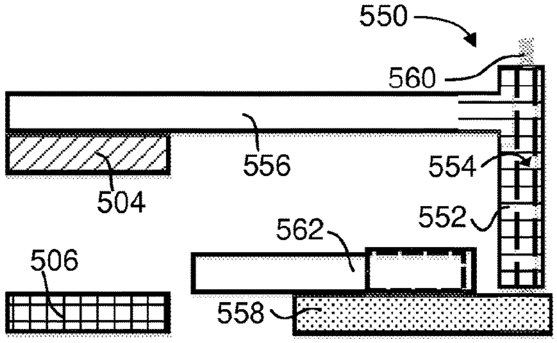
FIGS. 16A, 16B, and 16C are side view schematic illustrations of an embodiment having a platform, an anchor in the form of a retractably extendable spar, a deployable pallet carrying structure in the form of a beam, and a warm type platform height adjustment mechanism, constructed and operative in accordance with another embodiment of the present invention.
Figure 16B:
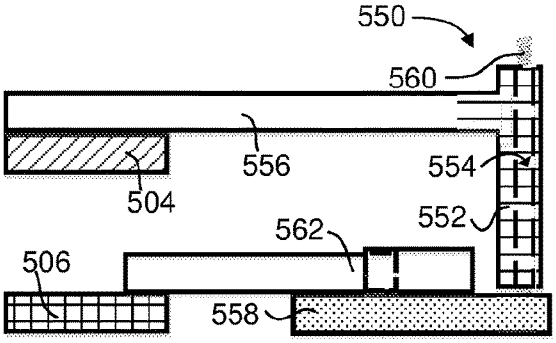
Figure 16C:
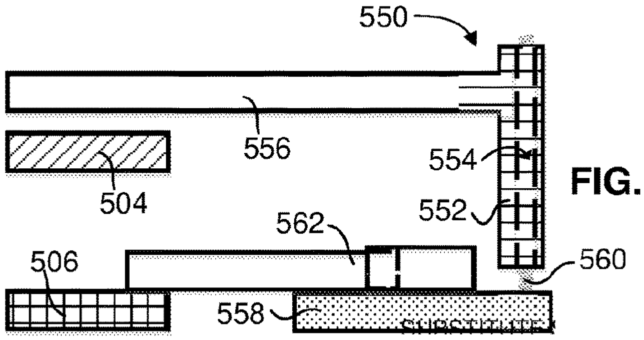

(e) A deployed anchor in the form of leaning stave, leans on a shelf, which is disposed above the target shelf. The distal side of the extracted beam is pulled up from the target shelf toward the leaning stave, by a beam distal side lift mechanism. The beam distal side lift mechanism can engage the extracted beam at its distal side at a location posterior to the convex hull of the shelf structure and can engage the extracted beam at some medial point of the extracted beam at a location anterior to the convex hull of the shelf. An example of a beam distal side lift mechanism in the form of a winch load support jack that engages the extracted beam at its distal side at a location posterior to the convex hull of the shelf structure is illustrated in FIGS. 15A to 15D;

(f) A deployed anchor in the form of a leaning stave, leans on a shelf, which is disposed below the target shelf. The distal side of the extracted beam is pushed up from the target shelf, by a beam distal side lift mechanism. The beam distal side lift mechanism leans against the leaning stave and pushes up the extracted beam either at the distal side of the extracted beam at a location posterior to the convex hull of the shelf structure, or at some medial point of the extracted beam at a location anterior to the convex hull of the shelf structure. An example of a beam distal side lift mechanism in the form of a load support jack that engage the beam at some medial point of the beam at a location anterior to the convex hull of the shelf structure is illustrated in FIGS. 17A to 17D;

(g) A deployed anchor in the form of a leaning stave is attached to the pallet shelfing apparatus for its stabilization by leaning on the proximal side of a shelf, which is disposed above the target shelf. The extracted beam is pivotally mounted to a platform of the pallet shelfing apparatus by a mount that features a tilting joint equipped with pivot drive, operational to pivot the extracted beam. The distal side of the extracted beam is lifted from the target shelf by activating the pivot drive to pivot the extracted beam. An example of a beam distal side lift mechanism in the form of an active tilting joint is illustrated in FIGS. 14A to 14D;

(h) A deployed anchor in the form of a leaning stave is attached to the pallet shelfing apparatus for its stabilization by leaning on the proximal side of a shelf, which is disposed below the target shelf. The extracted beam is mounted to a platform of the pallet apparatus by a mount that features a mount height adjustment mechanism. The extracted beam is lifted from the target shelf by activating the mount height adjustment mechanism to push the extracted beam upwards. An example of a beam lift mechanism in the form of a platform height adjustment mechanism, resembling the above example, is illustrated in FIGS. 16A to 16C;

As noted above, the pallet shelfing apparatus may include an auxiliary platform and a platform height adjustment mechanism for adjusting the relative vertical position between the auxiliary platform and the platform, and may further include a mount for mounting at least one selected pallet carrying structure of the at least one deployable pallet carrying structure to the platform and the mount may include a mount height adjustment mechanism for enabling adjustment of the vertical position of the at least one selected pallet carrying structure with respect to the platform. In accordance with embodiments of the pallet shelfing apparatus, the mount height adjustment mechanism and/or the platform height adjustment mechanism may include a piston type jack, a bottle type jack, a trolley type jack, telescopic type jack, a jackscrew type, a billet type jack, a scissors type jack, a winch type jack, and the like.

Reference is now made to FIGS. 8A, 8B, and 8C, which are exemplary side view schematic illustrations of various types of a jack that may be utilized for a mount height adjustment mechanism and/or for a platform height adjustment mechanism, of a pallet shelfing apparatus, constructed and operative in accordance with further embodiments of the present invention.

In FIGS. 8A to 8C, a height adjustment mechanism 250 is set between lower element 254 and upper element 252, whose function is determined by the application: (i) In FIG. 8A, element 252 is a retractably extendable beam and element 254 is a platform when height adjustment mechanism 250 is configured to operate as mount height adjustment mechanism; (ii) In FIG. 8B, element 252 is a platform and element 254 is an auxiliary platform, when height adjustment mechanism 250 is configured to operate as a platform height adjustment mechanism; (iii) In FIG. 8C, element 252 is a platform and element 254 is a retractably extendable beam, when height adjustment mechanism 250 is configured to operate as a mount height adjustment mechanism.

In FIG. 8A, height adjustment mechanism 250 is embodied by a piston jack.

In FIG. 8B, height adjustment mechanism is embodied by two diamond-type jacks 250, however it is noted that a single diamond-type jack can also be used.

In FIG. 8C, height adjustment mechanism 250 is embodied by a winch jack which is used for hoisting lower disposed element 254 to upper disposed element 252, wherein an upright 256, is fixedly mounted at its upper side to the proximal side of upper element 252 and is tiltably mounted at its lower side to the proximal side of lower element 254, through tilt joint 258, for allowing the tilting of lower element 254.

Figure 19A:
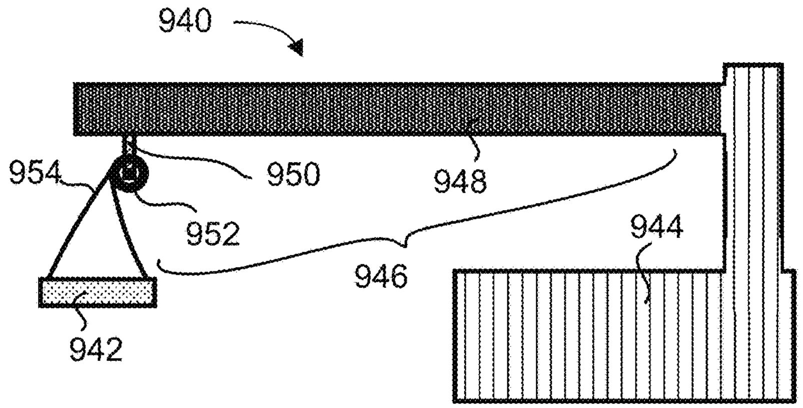
FIGS. 19A, 19B and 19C, are simplified side view schematic illustrations of several types of transporters that include several mechanisms of pallet lifts, constructed and operative in accordance with further embodiments of the present invention.

It is noted that other types of a jack can be used for height adjustment mechanisms, such as telescopic jack 370 of FIG. 4, scissors jack 422 of FIG. 6 (serving as a lift), jackscrew 482 of FIG. 6, winch jack 952 of FIG. 19A, and the like.

As noted above, the pallet shelfing apparatus may further include a loading/unloading direction altering mechanism for changing the deployment direction of at least one selected pallet carrying structure of the at least one deployable pallet carrying structure. In accordance with embodiments of the pallet shelfing apparatus, the loading/unloading direction altering mechanism may include: (a) At least one selected pallet carrying structure featuring an opposite directions extension mechanism; (b) A mount for mounting the at least one selected pallet carrying structure to the platform featuring a laterally or vertically pivotable joint; and/or (c) The platform featuring a laterally pivotable plate.

Reference is now made to FIGS. 9A, 9B, 9C, and 9D, which are schematic illustrations which demonstrate examples of loading/unloading direction altering mechanisms by changing the extension direction of the at least one deployable pallet carrying structure, constructed and operative in accordance with an embodiment of the present invention.

Figure 9A:
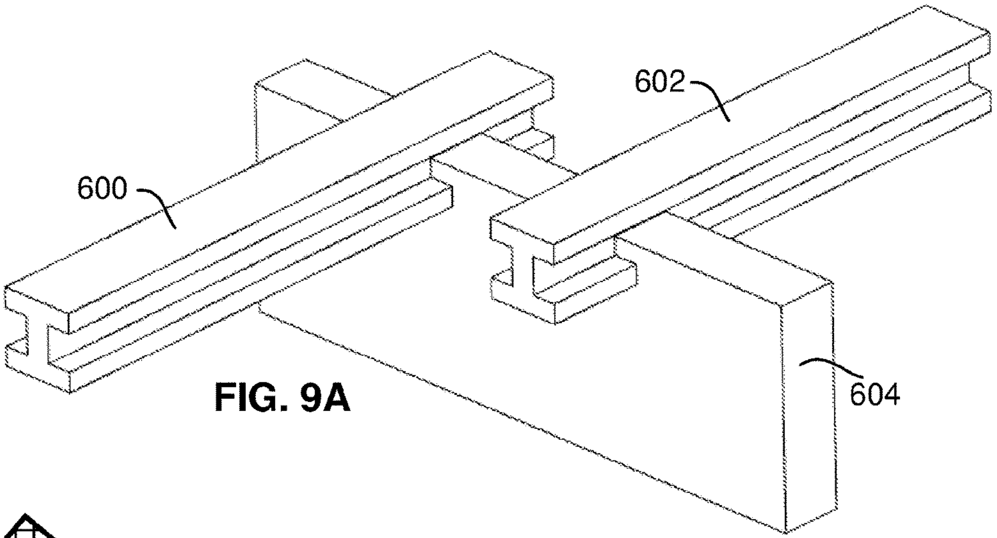
FIGS. 9A, 9B, 9C, and 9D, are schematic illustrations which demonstrate examples of loading/unloading direction altering mechanisms, constructed and operative in accordance with embodiments of the present invention.

FIG. 9A is a perspective view schematic illustration of the at least one deployable pallet carrying structure in the form of two beams, of the pallet shelfing apparatus, which can be extended (deployed) in two opposed directions. A wall like mount 604 is mounted on platform (not shown) and can move beams 600 and 602 to extend to the left (e.g., to the front side of the pallet shelfing apparatus) or to the right (e.g., to the rear side of the pallet shelfing apparatus). Practically, beams 600 and 602 are extended to the same direction.

Figure 9B:
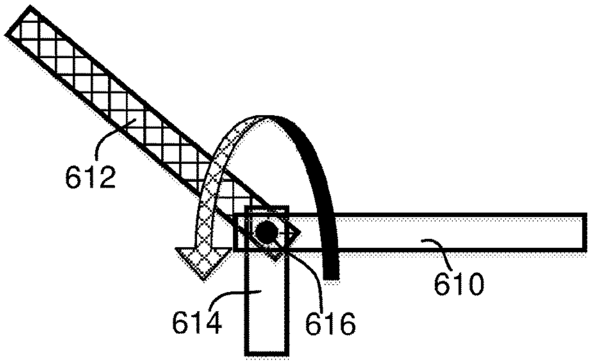

FIG. 9B is a side view schematic illustration of a deployable pallet carrying structure in the form of a vertically rotatable beam. Beam 610 is pivotally mounted to mount 614 by tilt joint 616 and can be vertically rotated to assume the opposed direction illustrated by beam depicted 612.

Figure 9D:
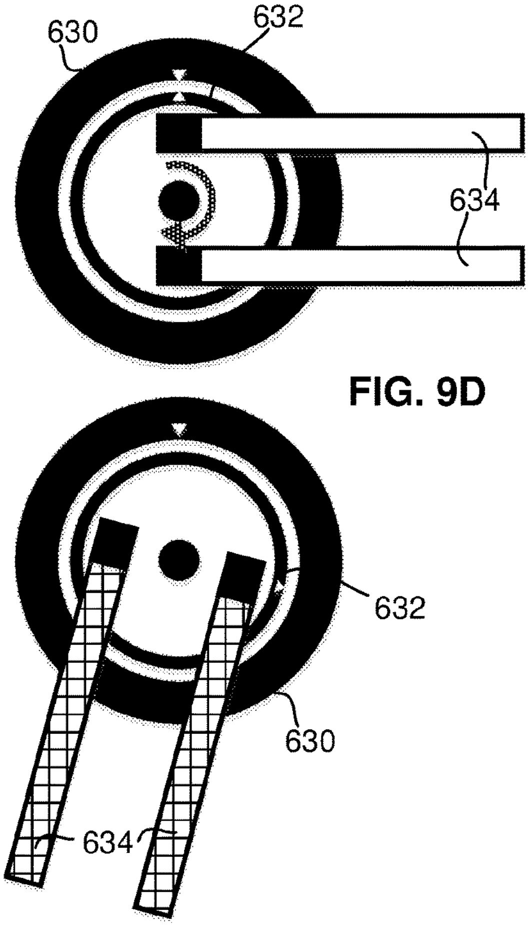
Figure 9C:
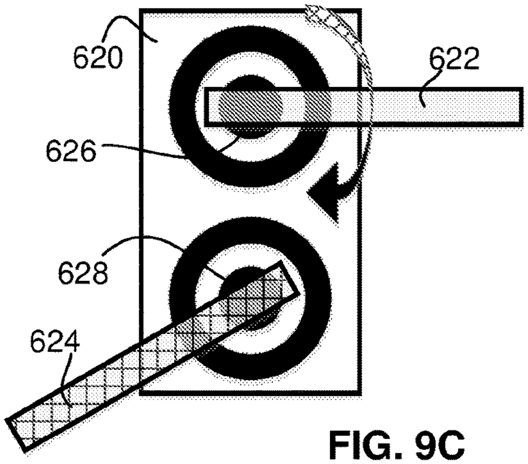

FIG. 9C is a top view schematic illustration of deployable pallet carrying structure in the form of two horizontally rotatable beams. Beams 622 and 624 are respectively installed on horizontally rotatable mounts 626 and 628, both mounted on platform 620. Mounts 626 and 628 can be horizontally rotated to set beams 622 and 624 in different directions. Practically, beams 622 and 624 are rotated to point in the same direction.

FIG. 9D is a top view schematic illustration of a horizontally rotatable platform. Platform 630 incorporates horizontally rotatable turret 632 and at least one deployable pallet carrying structure in the form of two beams 634 that are mounted on turret 632. Turret 632 can rotate and thereby render beams 634 to assume a different direction, as shown.

As noted above, the at least one deployable pallet carrying structure may be in the form of at least one retractably extendable beam, and/or the at least one deployable anchor may be in the form of at least one retractably extendable spar. In accordance with embodiments of the pallet shelfing apparatus, the at least one retractably extendable beam/spar may include a foldable segmented beam, a scissors beam, an accordion beam, a vertical parallelogram beam, a horizontal parallelogram beam, an n-bar horizontal parallelogram beam, a side rail and lock beam, a telescopic beam, a drawer beam, and the like.

As noted above, the pallet shelfing apparatus may further include a pallet conveyor configured to carry the pallet about at least one of the at least one deployable pallet carrying structure at a path extending between a location above the selected shelf and a location above or below the platform, for facilitating movement of the pallet at the loading mode and the unloading mode. In accordance with embodiments of the pallet shelfing apparatus, the pallet conveyor may be a retractably extendable telescopic beam type or a retractably extendable rail and lock beam type.

Reference is now made to FIGS. 10A, 10B, 10C, 10D, and 10E, which are exemplary perspective view schematic illustrations of retractably extendable beams or spars, constructed and operative in accordance with further embodiments of the present invention. In FIGS. 10A to 10E, shelf 790 features table 794, front proximal frame-bar 792 and rear distal frame-bar 796, for demonstrating relative positioning of the retractable beam/spar in various extraction states. Some of the beams shown, when extending or retracting, can also function as an active pallet conveyor, particularly wherein the dynamic beam portion is designed to carry the pallet.

Figure 10A:
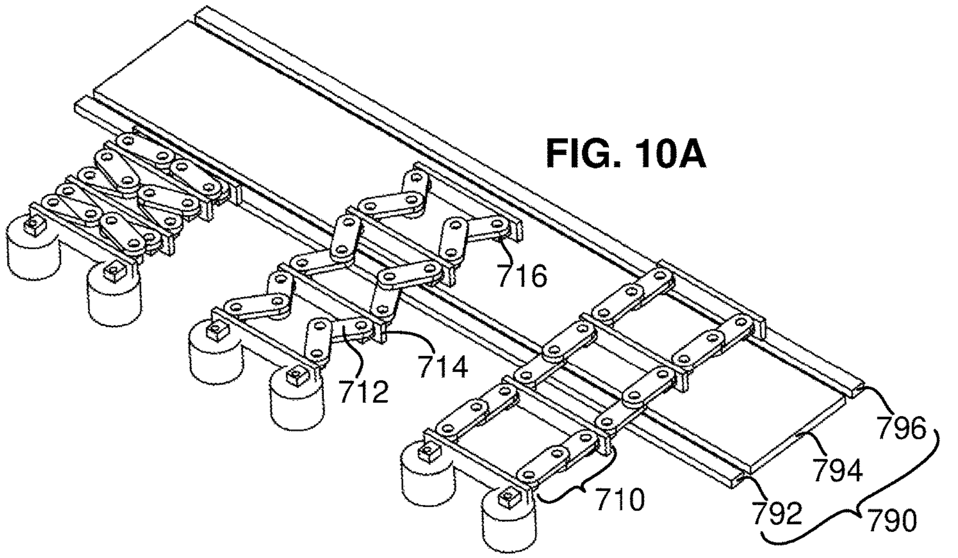

FIG. 10A is a perspective view schematic illustration of a foldable segmented beam/spar resembling accordion like folding plate links 710, which are vertically hinged in series in two rows. Links 710 feature plates 712 which are horizontally positioned and are rotatable about vertical hinges 716. Crossbars 714 are disposed between every link 710, namely—between every two plates 712 in each row, and connect the two rows. Plates 712 are horizontally disposed and are vertically hinged at their ends, at hinges 716, to an adjacent plate 712 or to a crossbar 714. Between crossbars 714 in each row, one plate 712 is disposed on top of the other plate 712, such that the top plate 712 folds over the bottom plate 712 when the beam/spar is squeezed to fold (the leftmost configuration). The beam/spar can be partially extended (middle configuration) or fully extended (rightmost configuration).

Figure 10B:
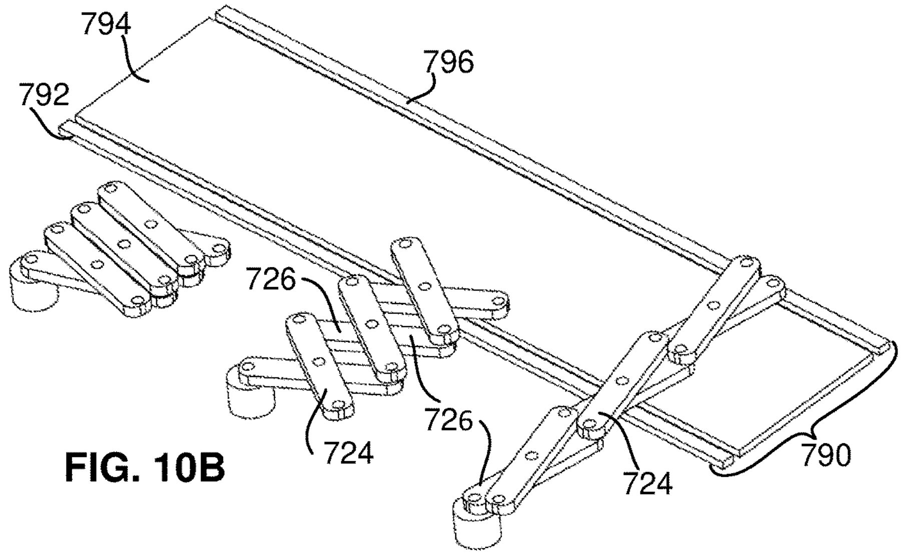

FIG. 10B is a perspective view schematic illustration of a foldable scissors type beam/spar having plate links which are vertically hinged to three other plate links. Plates 724 and 726 are horizontally positioned and are rotatable about the vertical hinges. Top plates 724 are hinged to bottom plates 726 and vice versa. Each plate of plates 724, is hinged at its ends to the ends of two plates of plates 726 and at its middle to the middle of a third plate of plates 726, so that the whole arrangement resembles two interlaced bicycle chains which form a foldable segmented beam/spar. Top plates 724 fold over the bottom plates 726 when the beam/spar is squeezed to fold (the leftmost configuration). The beam/spar can be partially extended (middle configuration) or fully extended (rightmost configuration).

FIG. 10C is a perspective view schematic illustration of a telescopic beam/spar. The links are arranged such that innermost link 750 is the static beam portion which is mounted to the pallet shelfing apparatus while outermost link 752 is the largest, suiting to function as a table on which the pallet is placed, when loaded or unloaded. Accordingly, the telescopic beam/spar may also function as an active pallet conveyor, moving from the folded configuration (leftmost configuration) to the fully extended configuration (rightmost configuration).

FIG. 10D is a perspective view schematic illustration of a side rail and lock type beam/spar featuring a static beam portion 760 and a dynamic beam portion 762. Static beam portion 760 includes a C-shaped cross-section enclosing an elongated guiding rail 764. Distal end 761 of static beam portion 760 is blocked (blocking not shown). Static beam portion 760 and dynamic beam portion 762 are disposed side by side, wherein the open side of static beam portion 760 adjacents dynamic beam portion 762, when the beam/spar is retracted (leftmost configuration). Sliding plate 766, featuring a laterally projecting arm 768, can slide along guiding rail 764 wherein blocked distal end 761 of static beam portion 760 and its profile ledges keep sliding plate 766 from falling out. Curving arm link 770 is vertically hinged at one end to projecting arm 768 and is further hinged at its other end to laterally projecting shoulder 772, installed at the proximal side of dynamic beam portion 762. When dynamic beam portion 762 is moved to the forwardmost position, sliding plate 766 is blocked at distal end 761 of static beam portion 760 and the curving arm link 770 rotates counter clockwise at its hinges to distally dispose dynamic beam portion 762 in front of static beam portion 760 and to thereby fully extend the beam/spar (rightmost configuration) .

Figure 10E:
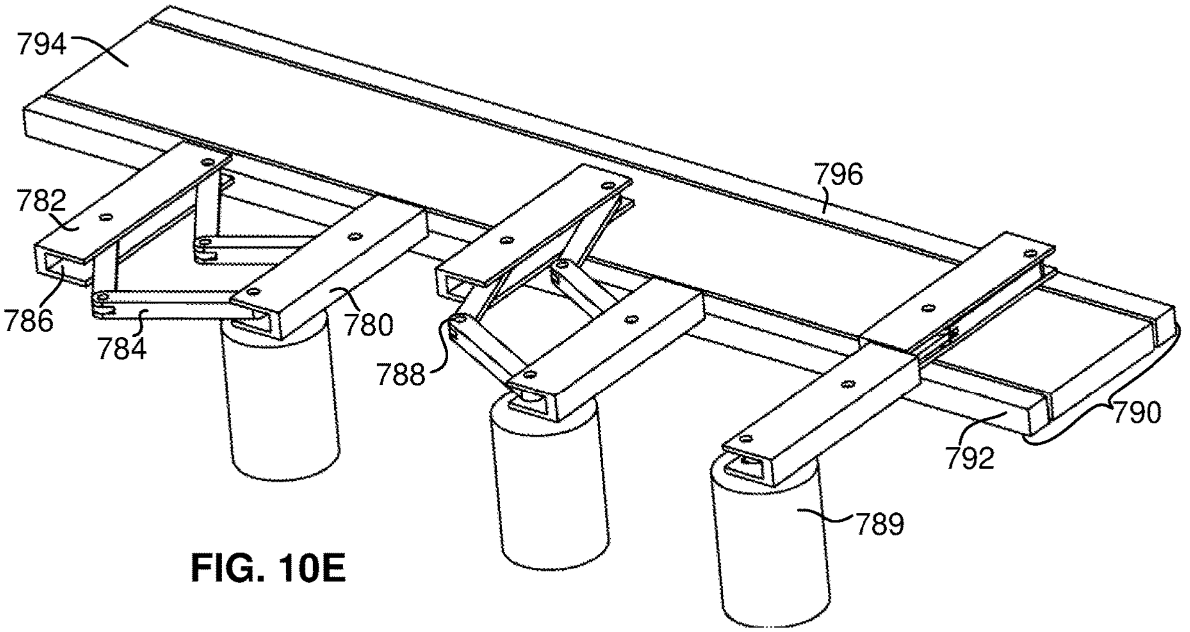

FIG. 10E is a perspective view schematic illustration of a two-linked segmented horizontal parallelogram beam/spar. The beam/spar features static beam portion 780 and dynamic beam portion 782, both featuring a U-shaped cross section defining a cavity 786, with an open side therealong. Static beam portion 780, whose open side is facing left, and dynamic beam portion 782, whose open side is facing right are horizontally leveled in parallel. Static beam portion 780 is mounted by mount 789 to the pallet shelfing apparatus. Dynamic beam portion 782 is dynamically coupled with static beam portion 780, by two foldable segmented cross girders, such as girder 784, which are vertically hinged at their ends to the ends of beam portions 780 and 782. Girders 784 are segmented into two vertically hinged links, which are foldable one within the other, or one on top of the other, such that when the beam/spar is retracted, the links of each segmented cross girder 784 fold and are contained within the cavities 786 of beam portions 780 and 782, which thereby are placed side by side (in the leftmost configuration, girders 784 are not fully folded, beam portions 780 and 782 are sided, and further folding of girders would bring portions 780 and 782 further closer). Optionally, the length of cross girders 784 is less than half of the length of cavities 786, wherein one cross girder 784 is hinged to the upper walls of beam portions 780 and 782 and the other to the lower walls of beam portions 780 and 782 (or one portion of both girders 784 is hinged to the upper wall of one of beam portions 780 or 782, and the other portion to the lower wall of the other one of beam portions 780 and 782), such that the cross girders are contained, one on top of (or beside) the other within cavities 786 when the beam/spar is partially or fully extended, wherein dynamic beam portion 782 is placed in front of static beam portion 780 (rightmost configuration).

It is noted that other types of retractably extendable beams or spars may include other types such as drawer-type beams 142 and 144 of FIG. 5 and foldable segmented beams as shown in embodiment 870 of FIG. 18D.

As noted above, the pallet shelfing apparatus may further include a mount for mounting at least one selected pallet carrying structure of the at least one deployable pallet carrying structure to the platform. The mount may include a vertical tilt joint for enabling vertical pivoting of the at least one selected pallet carrying structure with respect to the platform.

Figure 11:
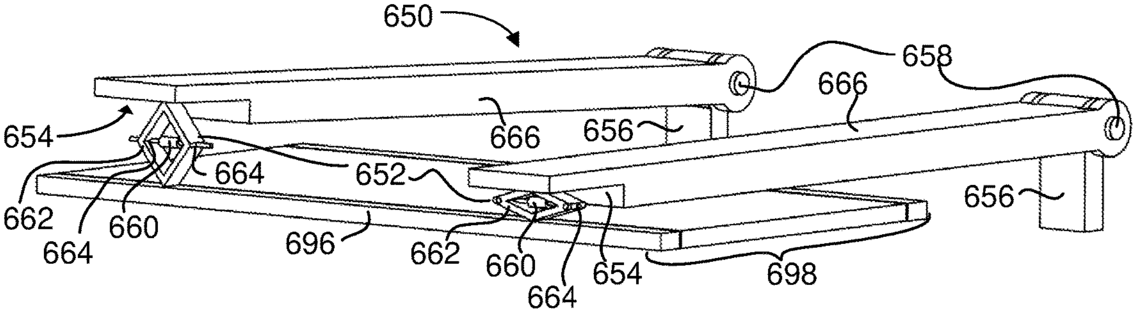
FIG. 11 is a perspective view schematic illustration of an embodiment having a diamond-type carry jack, constructed and operative in accordance with an embodiment of the present invention.

Reference is now made to FIG. 11, which is a perspective view schematic illustration of embodiment 650 having a diamond-type carry jack set in two configurations, constructed and operative in accordance with an embodiment of the present invention.

At least one deployable pallet carrying structure, in the form of extracted (deployed) beam 666 is mounted to mount 656 by vertical tilt joint 658, and features a beam cavity 654 at its distal side wherein diamond-type carry jack 652 is installed. Jack 652 is configured to deploy (extract) for engaging the at least one hold in the form of distal side 696 of shelf 698, which serves as a supporting base for vertical expansion of jack 652. Jack 652 is contained within beam cavity 654 when fully retracted (not deployed—right configuration).

Diamond-type carry jack 652 features a lateral bolt 660 which is screw threaded at its sides in two opposed directions, which are respectively screwed through meshing nuts 664 disposed at the side corners of diamond jack 652. Upon rotating threaded bolt 660, nuts 664 are either simultaneously pushed to the sides to retract diamond structure 662 and thereby lower the distal side of extracted beam 666 (right configuration) or simultaneously pulled together to extract diamond structure 662 and thereby lift the distal side of extracted beam 666 (left configuration).

As noted above, the at least one deployable anchor may include a leaning stave, which is set, when deployed, between a leaning location in the pallet shelfing apparatus and the at least one hold for stabilizing the pallet shelfing apparatus against the at least one hold. In accordance with embodiments of the pallet shelfing apparatus, the leaning stave may include a hold support jack configured to deploy for engaging the at least one hold, and may further include a cavity in which the hold support jack is nested when not deployed. In accordance with embodiments of the pallet shelfing apparatus, the hold support jack may be of a diamond-type jack, a billet type jack, a trolley type jack, a telescopic type jack, a jackscrew type, a hinged type jack, a winch type jack, a bottle type jack, a fluid stream type jack, an electromagnetic type jack, and the like.

Figure 12:
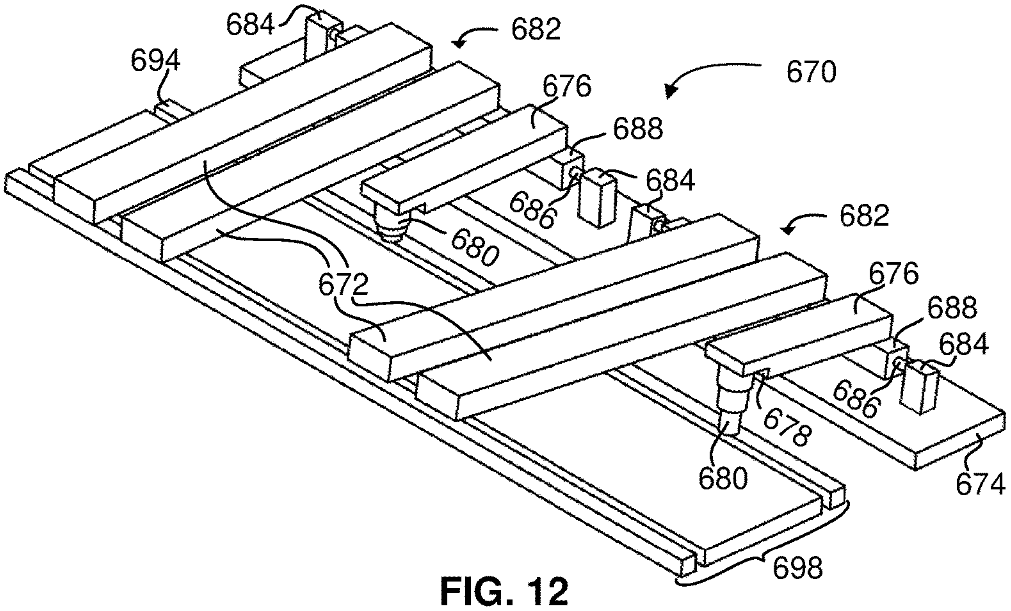
FIG. 12 is a perspective view schematic illustration of an embodiment having a telescopic hold support jack, constructed and operative in accordance with an embodiment of the present invention.

Reference is now made to FIG. 12, which is a perspective view schematic illustration of embodiment 670 having telescopic hold support jack that also serves as a distal side lift mechanism for the at least one deployable pallet carrying structure in the form of two extracted beams, set in two configurations, constructed and operative in accordance with an embodiment of the present invention.

Mount 682 includes two upright mount poles 684, which are fixedly installed on platform 674. Horizontal mount rod 686 connects mount poles 684 and mount bar 688 is hingedly mounted on mount rod 686 and tiltable there about. Two extracted beams 672 and a deployed leaning stave 676 are all fixedly mounted to mount bar 688 and tilt vertically together when mount bar 688 rotates about mount rod 686. Leaning stave 676 features a stave cavity 678 disposed at its distal end and a telescopic hold support jack 680 is installed at stave cavity 678. Hold support jack 680, when deployed, leans against the at least one hold located on proximal side 694 of shelf 698. The left configuration illustrates extracted beams 672 in their lowest posture, when telescopic jack 680 is fully collapsed and rests within stave cavity 678. The right configuration illustrates extracted beams 672 with their distal ends in a raised posture when telescopic jack 680 extends to rotate mount bar 688, which thereby tilts extracted beams 672 and raise their distal ends.

Reference is now made to FIGS. 13A and 13B, which are side view schematic illustrations of embodiment 510 having a platform 512, a deployable pallet carrying structure in the form of beam 514, and at least one deployable anchor, which also serves as a beam distal side lift mechanism, in the form of jackscrew carry jack 516, constructed and operative in accordance with another embodiment of the present invention.

Extracted beam 514 is pivotally mounted to platform 512 by pivot axis 518. In FIG. 13A, extracted beam 514 rests on target shelf 504, with jack 516 withdrawn (not deployed) within a nesting cavity 517 disposed in the bottom distal side of extracted beam 514. In FIG. 13B, the distal side of extracted beam 514 is lifted from target shelf 504 by jack 516, that may also function as a deployable anchor, which deploys downwards from nesting cavity 517 and pushes the distal side of extracted beam 514 against distal side 506 of target shelf 504.

As noted above, the at least one deployable anchor may include a leaning stave which is set, when deployed, between a leaning location in the pallet shelfing apparatus and the at least one hold for stabilizing the pallet shelfing apparatus against the at least one hold and the leaning stave may feature a retractably extendable spar, configured to extract, when deployed, for stabilizing the pallet shelfing apparatus, and to retract when not deployed spar. In accordance with embodiments of the pallet shelfing apparatus, the leaning location may be disposed on the transporter, the platform, or a mount for mounting at least one of the at least one deployable pallet carrying structure to the platform.

Reference is now made to FIGS. 14A, 14B, 14C, and 14D, which are side view schematic illustrations of embodiment 520 having a platform 522, a deployable anchor in the form of retractably extendable spar 528 equipped with jackscrew hold support jack 529, a deployable pallet carrying structure in the form of beam 524, and a beam distal side lift mechanism in the form of a motorized tilting joint 526, constructed and operative in accordance with another embodiment of the present invention.

Figure 14A:
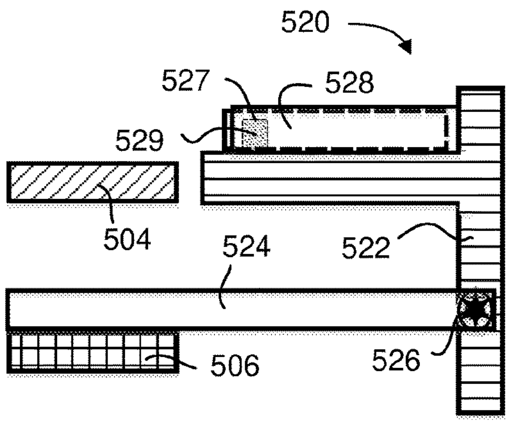
FIGS. 14A, 14B, 14C, and 14D, are side view schematic illustrations of an embodiment having an anchor in the form of a retractably extendable spar equipped with jackscrew hold support jack, a deployable pallet carrying structure in the form of a beam, and a beam distal side lift mechanism in the form of a motorized tilting joint, constructed and operative in accordance with another embodiment of the present invention.
Figure 14B:
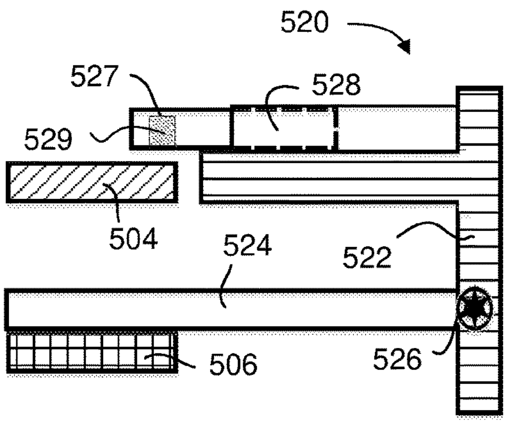
Figure 14C:
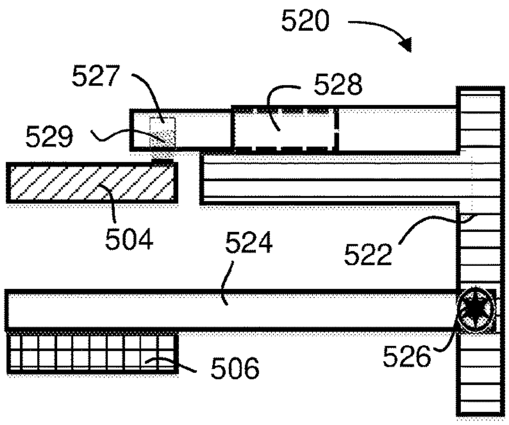
Figure 14D:
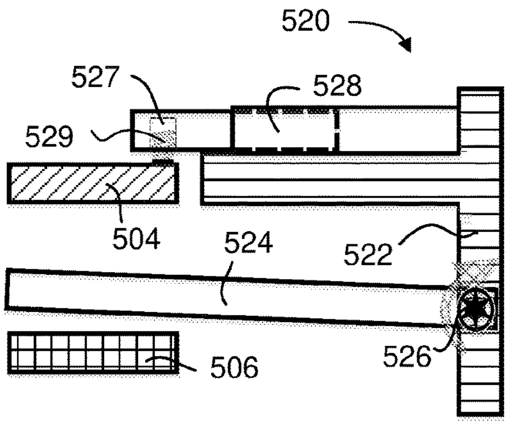

Extracted beam 524 is pivotally mounted to platform 522, by motorized tilting joint 526. Spar 528 is mounted above beam 524 to platform 522, and features hold support jack 529 which is nested in cavity 527, disposed in the bottom distal side of spar 528. In FIG. 14A, spar 528 is retracted, jack 529 is retracted and nested within cavity 527, and extracted beam 524 is disposed on target shelf 506, below shelf 504. In FIG. 14B, spar 528 is extended with its distal side disposed over the proximal side of shelf 504. In FIG. 14C, jack 529 is deployed downward from cavity 527 to support spar 528 against shelf 504. In FIG. 14D, the distal side of extracted beam 524 is lifted from target shelf 506 by activating motorized tilting joint 526 to pivot extracted beam 524 clockwise.

Reference is now made to FIGS. 15A, 15B, 15C, and 15D, which are side view schematic illustrations of embodiment 530 having a platform 532, a deployable pallet carrying structure in the form of beam 534, a telescopic platform height adjustment mechanism 542, an auxiliary platform 540, a deployable anchor in the form of retractably extendable spar 544, and a beam distal side lift mechanism in the form of winch type load support jack 546 equipped with pull rope 548, constructed and operative in accordance with another embodiment of the present invention.

Figure 15A:
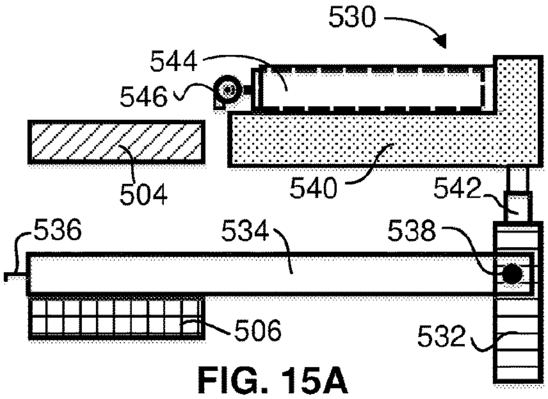
FIGS. 15A, 15B, 15C, and 15D, are side view schematic illustrations of an embodiment having an anchor in the form of a retractably extendable spar, a telescopic platform height adjustment mechanism, a deployable pallet carrying structure in the form of a beam, and a beam distal side lift mechanism in the form of a winch type load support jack, constructed and operative in accordance with another embodiment of the present invention.
Figure 15B:
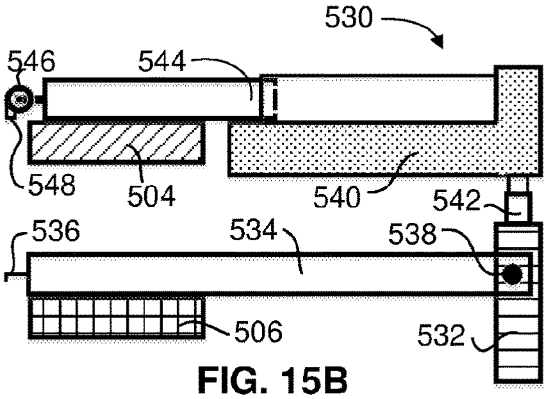
Figure 15C:
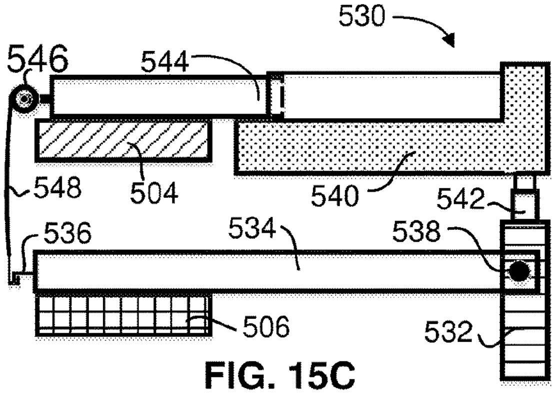
Figure 15D:
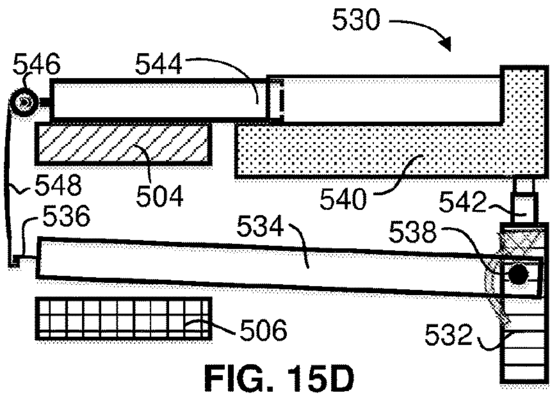

Embodiment 530 is a modification of embodiment 520 of FIGS. 14A to 14D, wherein jack 546, equipped with pull rope 548 which functionally substitutes the motorized tilting joint 526, and platform height adjustment mechanism 542 functionally substitutes hold support jack 529. Extracted beam 534 features a pull hook 536, which is installed at its distal side, and is pivotally mounted to platform 532 by tilting joint 538. Spar 544 is mounted to auxiliary platform 540, features winch 546, which is installed at its distal side, and is equipped with pull rope 548 spooled therein. Auxiliary platform 540 is mounted to platform 532 by platform height adjustment mechanism 542. In FIG. 15A, height adjustment mechanism 542 is expanded to hold spar 544, which is retracted, at a height slightly above shelf 504, and extracted beam 534 is disposed on target shelf 506, below shelf 504. Pull rope 548 is fully collected by winch 546. In FIG. 15B, spar 544 is extended and leans over shelf 504, after height adjustment mechanism 542 has retracted, with winch 546 projecting beyond the convex hull of shelves 504 and 506, and pull rope 548 is still fully collected by winch 546. In FIG. 15C, pull rope 548 is let out and is tied to pull hook 536. In FIG. 15D, the distal side of extracted beam 534 is lifted from target shelf 506 by activating winch 546 (by a winch motor—not shown), to pull in pull rope 548, which pulls the distal side of extracted beam 534, by hook 536, clockwise.

Reference is now made to FIGS. 16A, 16B, and 16C, which are a side view schematic illustrations of embodiment 550, having a deployable anchor in the form of retractably extendable spar 562, a deployable pallet carrying structure in the form of beam 556, a warm type platform height adjustment mechanism, featuring upright screw bolt 560 which is mounted on auxiliary platform 558, and platform 552 with threaded bore 554, constructed and operative in accordance with another embodiment of the present invention.

Extracted beam 556 is fixedly mounted to platform 552, which is mounted to auxiliary platform 558 by warm type platform height adjustment mechanism, featuring upright screw bolt 560 which is mounted on auxiliary platform 558. Upright 560 is screwed through threaded bore 554, and can be rotated by a screw motor (not shown), thereby raises or lowers platform 552 together with extracted beam 556. Spar 562 is mounted on auxiliary platform 558 located below extracted beam 556. In FIG. 16A, spar 562 is retracted and extracted beam 556 is disposed on target shelf 504, above shelf 506, wherein platform 552 is in its lowered positioning. In FIG. 16B, spar 562 is extended with its distal side disposed over the proximal side of shelf 506. In FIG. 16C, the screw motor was activated to rotate upright 560 through threaded bore 554 and thereby to push platform 552 and extracted beam 556 upwards, which lifts extracted beam 556 above shelf 504.

Reference is now made to FIGS. 17A, 17B, 17C, and 17D, which are side view schematic illustrations of embodiment 570, having a platform 572, a deployable pallet carrying structure in the form of beam 574, an auxiliary platform 578, a diamond type platform height adjustment mechanism 580, and a deployable anchor in the form of retractably extendable spar 582 equipped with hinged load support jack 586, which has jackscrew adaptor 588 at its tip, configured also as a beam distal side lift mechanism, constructed and operative in accordance with another embodiment of the present invention.

Figure 17A:
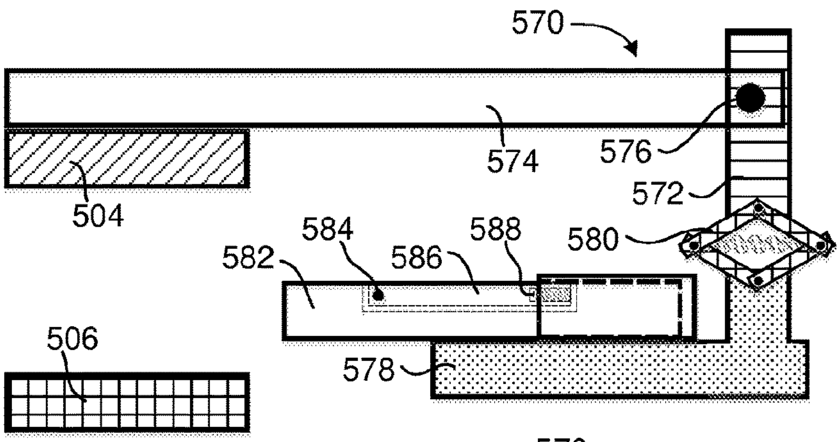
FIGS. 17A, 17B, 17C, and 17D, are side view schematic illustrations of an embodiment having a diamond type platform height adjustment mechanism, a deployable pallet carrying structure in the form of a beam, a deployable anchor in the form of a retractably extendable spar equipped with a hinged load support jack which has a jackscrew adaptor at its tip, constructed and operative in accordance with another embodiment of the present invention.
Figure 17B:
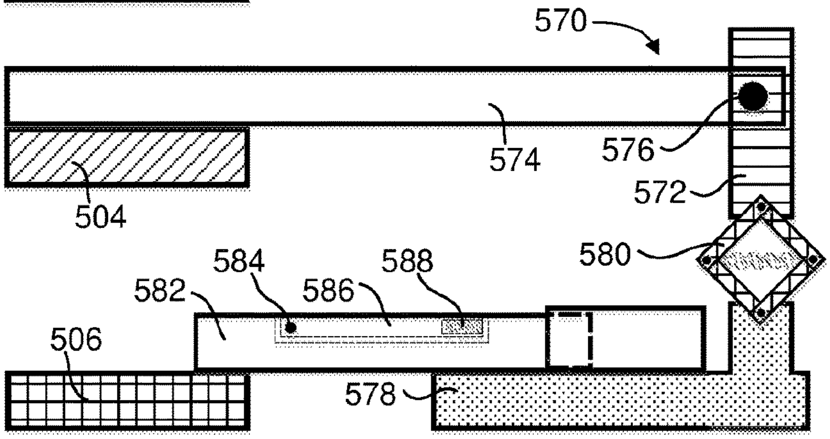
Figure 17C:
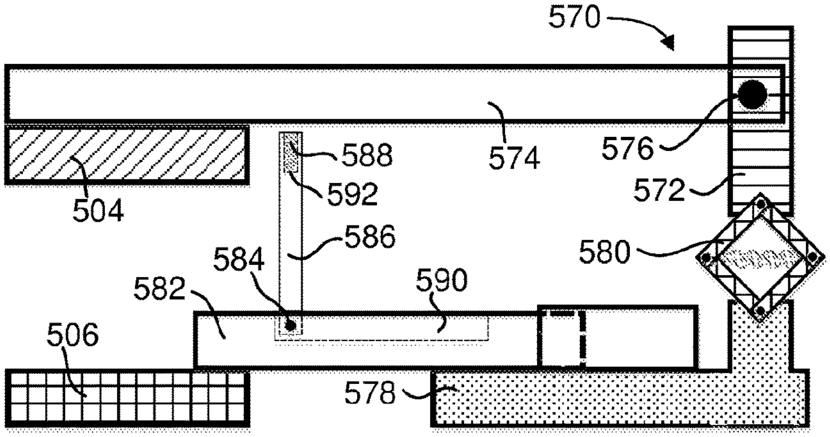
Figure 17D:
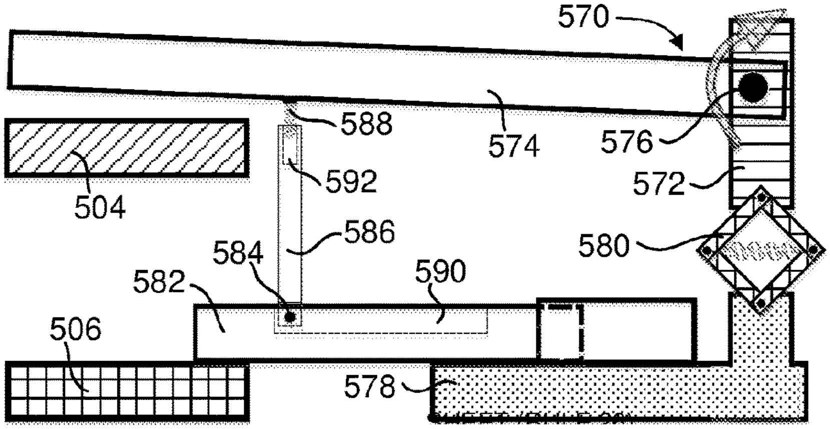

Extracted beam 574 is pivotally mounted to platform 572, by tilting joint 576. Spar 582 is mounted to auxiliary platform 578, and is equipped with load support jack 586 which has jackscrew adaptor 588 at its tip. When jackscrew adaptor 588 is not deployed, it is nested within adaptor cavity 592 inside load support jack 586. When load support jack 586 is not deployed, it is nested inside jack cavity 590 within auxiliary platform 578. Auxiliary platform 578 is mounted to platform 572 by diamond type platform height adjustment mechanism 580. In FIG. 17A, height adjustment mechanism 580 is retracted to hold spar 582, which is retracted, at a height slightly above shelf 506, and extracted beam 574 is disposed on target shelf 504, located above shelf 506. Jackscrew adaptor 588 is nested inside adaptor cavity 592 and load support jack 586 is nested inside jack cavity 590. In FIG. 17B, spar 582 is deployed and leans over shelf 506, after height adjustment mechanism 580 has extracted. Jackscrew adaptor 588 and load support jack 586 are still respectively nested inside adaptor cavity 592 and jack cavity 590. In FIG. 17C, load support jack 586 is hinged counter-clockwise, around jack axis 584 by hinge-motor (not shown), outside of jack cavity 590 to stand erect, supported at it lower end on spar 582 and with its upper end placed just below extracted beam 574. In FIG. 17D, jackscrew adaptor 588 is emerged from adaptor cavity 592 upwards, pushing extracted beam 574 at a point anterior to the proximate side of the convex hull of shelves 504 and 506, which pivots extracted beam 574 around tilting joint 576, clockwise, and consequently lifts the distal side of extracted beam 574 above shelf 504.

As noted above, the pallet shelfing apparatus may include a load support jack, configured to deploy between a load supporting base and the at least one selected pallet carrying structure of the at least one deployable pallet carrying structure, for vertically supporting said at least one selected pallet carrying structure, and the load supporting base may be the platform.

As noted above, the pallet shelfing apparatus may further include a pallet conveyor configured to carry the pallet about at least one of the at least one deployable pallet carrying structure at a path extending between a location above the selected shelf and a location above or below the platform, for facilitating movement of the pallet at the loading mode and the unloading mode, and the pallet conveyor may be a gravitational movement pallet conveyor, wherein a vertical pivoting of the at least one selected pallet carrying structure, with respect to the platform, is activated, at the loading mode and/or the unloading mode, for inducing gravitational slide of the pallet about the at least one selected pallet carrying structure, at a path extending between a location above the selected shelf and a location above or below the platform. In accordance with embodiments of the pallet shelfing apparatus, the vertical pivoting may be activated by the load support jack.

In accordance with embodiments of the pallet shelfing apparatus, the pallet conveyor may be an active pallet conveyor that includes a conveyor mobility element for moving the active pallet conveyor about the at least one deployable pallet carrying structure and the conveyor mobility element can be wheels, caterpillar tracks, and/or wheels for railway tracks. In accordance with embodiments of the pallet shelfing apparatus, the active pallet conveyor may be detachable from at least one deployable pallet carrying structure for detachably conveying the pallet to and from a remotely located shelf, and the active pallet conveyor further include mobility means for reaching the remotely located shelf. In accordance with embodiments of the pallet shelfing apparatus, the mobility means of the active pallet conveyor may include the conveyor mobility element.

As noted above, the at least one deployable pallet carrying structure may include a beam. In accordance with embodiments of the pallet apparatus, the pallet conveyor may include a conveyor belt, rolling elements set over the at least one beam, a foldable segmented beam, a foldable scissors beam, a foldable accordion beam, a foldable horizontal parallelogram beam, a foldable n-bar horizontal parallelogram beam, and the like.

Reference is now made to FIGS. 18A, 18B, 18C, and 18D, which are perspective view schematic illustrations of simplified exemplary pallet conveyors, constructed and operative in accordance with further embodiments of the present invention.

FIG. 18A is a perspective view schematic illustration of a pallet conveyor arrangement 800, which is a simplified version of a passive gravitational-movement pallet conveyor for a pallet shelfing apparatus. Conveyor arrangement 800 includes platform 802, a deployable pallet carrying structure in the form of extracted beam 804, beam mount 806, hinged load support jack 808, jack shaft 836, conveyor trolley 810 on which the pallet is carried, and beam rollers 820, disposed along the top face of extracted beam 804. Extracted beam 804 is a rectangular inverted U-shape bar with a downwardly facing conduit 822. Conveyor trolley 810, similarly features a downwardly facing rectangular inverted U-shape bar, but is wider than extracted beam 804, and is placed on and covering the top wall and some of the sidewalls of extracted beam 804. Conveyor trolley can freely slide over beam rollers 820. Beam mount 806 is fixedly mounted on the left side of platform 802, extracted beam 804 is mounted to the top of mount 806 by beam tilt joint 830. Jack nut 834 is mounted to mount 806 by nut tilt joint 832 at a medial location along mount 806. Hinged jack 808 is mounted to jack mount 838 by jack tilt joint 840, at a medial location of platform 802. Hinged Jack 808 is equipped, at its upper end, with jack wheel (not shown) which is inserted in conduit 822 of extracted beam 804 for sliding therein. One side of screw threaded jack shaft 836 is inserted into jack nut 834 and the other side is rotated by jack motor 844, mounted to a midsection of hinged jack 808 by motor tilt joint 842.

Jack motor 844 is operative to screw or unscrew jack shaft 836 into/from jack nut 834, for increasing or decreasing the distance between jack motor 844 and jack nut 834, per its rotation direction, which changes the angle between hinged jack 808 and platform 802, consequently raising the wheeled end of hinged jack 808, and thereby tilting extracted beam 804 with respect to platform 802, which may result in a gravitational slide of conveyor trolley 810. Accordingly, propelling, halting, speed, acceleration and direction of movement of trolley 810 are manipulated by controlled jack motor 844. In an alternative embodiment, some of rollers 820 are activated by a suitable motor, which actively move trolley 810 without requiring tilting beam 804 for the task of conveying trolley 810.

FIG. 18B is a perspective view schematic illustration of a pallet conveyor arrangement 850, which is a simplified version of an active pallet belt conveyor for a pallet shelfing apparatus. Conveyor arrangement 850 includes a deployable pallet carrying structure in the form of extracted beam 852 featuring static beam portion 854, dynamic beam portion 856, and two conveyor belts 858 and 860, which are installed on beam portions 854 and 856 respectively. Conveyor belts 858 and 860 are turned by drivers (not shown) in the direction towards static beam portion 854 whenever a pallet, placed on dynamic beam portion 856, is required to be conveyed to static beam portion 854, and vice versa.

FIG. 18C is a perspective view schematic illustration of a pallet conveyor arrangement 890, which is a simplified version of an active pallet conveyor for a pallet shelfing apparatus. Conveyor arrangement 890 includes a deployable pallet carrying structure in the form of extracted beam 892 featuring lateral beam steps 894 externally disposed along the bottom walls of beam 892. Conveyor trolley 896 over which a pallet is carried, featuring an inverted U-shaped bar, is equipped with lateral wheels 898, which serve as conveyor mobility element of conveyor trolley 896, and which are configured for carrying conveyor trolley 896 along beam 892. Wheels 898 are activated by a suitable drive (not shown) which is controlled to maneuver conveyor trolley 896 along beam 892. Conveyor arrangement 890, wherein wheels 898 are passively rolled, is a further alternative for conveyor trolley 810 and rollers 820 of conveyor arrangement 800 of FIG. 18A.

Conveyor trolley 896 is detachable from beam 892 and can detachably convey a pallet resting thereon to and from a remotely located shelf. Wheels 898 of conveyor trolley 896 may also serve as the mobility means of conveyor trolley 896, for reaching the remotely located shelf.

FIG. 18D is a perspective view schematic illustration of an active pallet conveyor arrangement 870, featuring a foldable segmented beam, resembling bicycle chain plate links which are vertically hinged in series. The links alternate between inner plates, featuring an upwardly protruding surface 872 which is leveled with the surfaces of the outer plates. Each inner plate is hinged at its ends to adjacent outer plates and vice versa. The outer plates feature a gap for containing the end portions of the inner plates when the beam is folded (the bottom configuration). The plates are horizontally positioned and are rotatable about the vertical hinges. The outer plates include robust flanges around the vertical hinges that can support the inner plates in steady horizontal posture without deviation when the beam is partially extended (upper configuration) or fully extended. Upwardly projecting bearing balls 872 are nested along the upper surface of the outer plates and the upper surface of protruding surfaces 872 of the inner plates, and are operative to passively roll in all directions. A pallet disposed on the segmented beam can be hitched by rod 876 and actively conveyed by the foldable beam, while bearing balls 872 are sliding below to enable the folding of the beam.

As noted above, the transporter may include a pallet lift for lifting the platform to a desired height. In accordance with embodiments of the pallet shelfing apparatus, the pallet lift may include a jackscrew lift mechanism, a telescopic lift mechanism, a crane configured to hoist the platform from above, a roped carriage for lowering and lifting the platform along a mast, a cantilevered roped elevator for holding and lifting the platform along a mast, a roped carriage elevator structure including a mast, a carriage and a counter balance, wherein the carriage runs along and within the mast, the counter balance is movable along the mast and roped to the carriage via an overhead pulley, and the like.

As noted above, the pallet shelfing apparatus may further include a pallet conveyor configured to carry the pallet about at least one of the at least one deployable pallet carrying structure at a path extending between a location above the selected shelf and a location above or below the platform, for facilitating movement of the pallet at the loading mode and the unloading mode. As noted above, the at least one deployable pallet carrying structure may include a beam. In accordance with embodiments of the pallet apparatus, the pallet conveyor may include a hanging trolley running under a beam.

An elevator type pallet lift for a pallet shelfing apparatus, can feature a typical elevator lift structure and mechanism. For example, such an elevator may feature side tower poles which are set on a locomotion chassis and a vertically movable platform (which supports at least one deployable pallet carrying structure). The platform is counter balanced by a counterweight and is lifted and lowered by a motor, wherein both the counterweight and the motor are connected to the platform. The platform is vertically movable between the tower poles, while the counterweight is vertically movable sideways of the platform and moves up or down in a direction opposed to that of the platform, without interference with the movement of the platform. The platform and the counterweight are typically hanging on the same chain which is pulleyed on top of the tower poles. The motor is typically connected to the platform by an endless chain and merely balances between the platform and the counterweight.

Figure 19B:
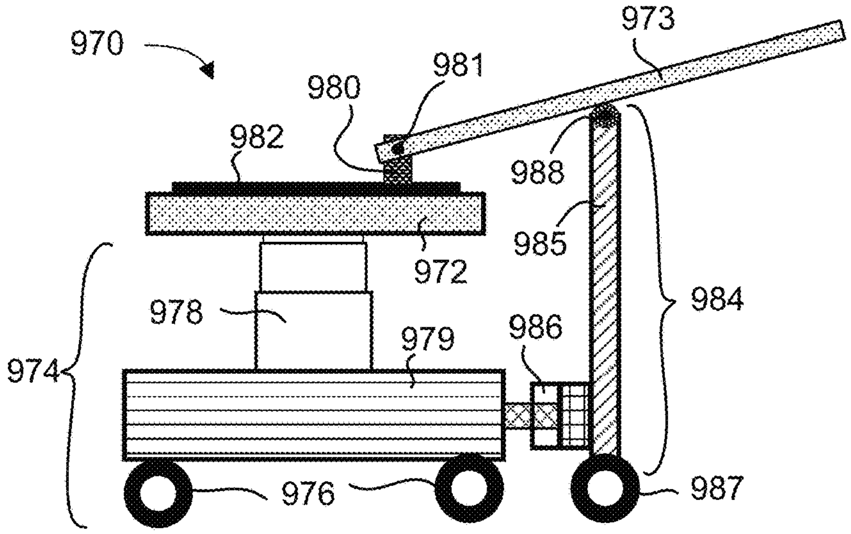
Figure 19C:
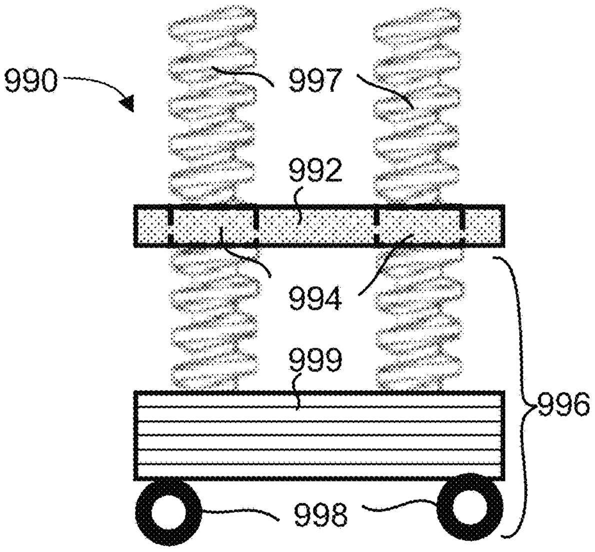

Reference is now made to FIGS. 19A, 19B, and 19C, which are simplified side view schematic illustrations of several types of transporters that include several mechanisms of pallet lifts, constructed and operative in accordance with an embodiment of the present invention.

FIG. 19A is a simplified side view schematic illustration of a crane transporter features a winch pallet lift, for a pallet shelfing apparatus, depicted 940. Crane transporter 940 features crane base 944 and crane transporter 946. Transporter 946 includes crane arm 948, crane shank 950 and pallet lift in the form of crane winch jack 952. Platform 942 is hanging by winch ropes 954, which are wound over crane winch jack 952, which is installed to crane shank 950. Crane shank 950 is mounted to crane arm 948 and can move along crane arm 948. Crane arm 948 is installed on a towering section of crane base 944 and can rotate radially about the towering section.

Platform 942 can be placed above any ground location due to the radial movement of crane arm 948 and the linear movement of crane shank 950 along arm 948. Crane winch jack 952 is operative to wind up or wind down winch ropes 954 for raising or lowering platform 942.

In accordance with embodiments of the pallet shelfing apparatus, the at least one deployable anchor is configured to change the elevation of at least one selected pallet carrying structure of the at least one deployable pallet carrying structure, during the loading mode and/or the unloading mode, after the at least one selected pallet carrying structure initially engages the pallet. As noted above, the at least one deployable pallet carrying structure may include a beam.

As noted above, the at least one deployable anchor temporarily stabilize the pallet shelfing apparatus against at least one hold. In accordance with embodiments of the pallet shelfing apparatus, the at least one hold may be located on the ground or the ceiling.

As noted above, the pallet shelfing apparatus may further include a mount for mounting at least one of selected pallet carrying structure of the at least one deployable pallet carrying structure to the platform and the at least one selected pallet carrying structure may include a beam. As noted above, the deployment of the beam for carrying, reaching and engaging the pallet may be done by maneuvering the mount.

FIG. 19B is a simplified side view schematic illustration of a transporter with a telescopic pallet lift, for a pallet shelfing apparatus, depicted 970. Embodiment 970 features platform 972, which is equipped with mount rail 982, transporter 974, at least one deployable pallet carrying structure in the form of extracted beam 973, deployable anchor 984, and mount 980. Transporter 974 features telescopic pallet lift 978, chassis 979 and ground locomotion represented by wheels 976. Deployable anchor 984 includes anchor locomotion 987, anchor piston jack 986, and anchor upright pole 985, which is equipped at its upper end with anchor roller 988.

Extracted beam 973 is hingedly mounted to mount 980, at horizontal hinge 981. Mount 980 can move, towards and away from the shelf structure, along mount rail 982 of platform 972. Platform 972 is mounted on pallet lift 978, which is installed on chassis 979, which is further carried by ground locomotion 976. Anchor upright pole 985, which engages the ground by anchor locomotion 987, is connected at its lower side to chassis 979, by piston jack 986. A midpoint of extracted beam 973 is rested on anchor roller 988 of anchor upright pole 985.

Transporter 974 is configured to position platform 972, by ground locomotion 976 and by pallet lift 978. The deployment of extracted beam 973 for engaging the pallet requires lifting its distal side. Several optional beam distal side lift mechanisms are provided in embodiment 970:

(a) Pallet lift 978 is lowered for lowering the proximal side of extracted beam 973, when extracted beam leans at some midpoint on anchor roller 988, and thereby the distal side of beam 973 is lifted.

(b) Mount 980 travels forward on mount rail 982, and thereby moves extracted beam 973 forward while the engagement point of extracted beam 973 with anchor roller 988 is rendered closer to the proximal side of extracted beam 973 and thereby the distal side of extracted beam 973 is lifted.

(c) Anchor piston jack 986 contracts rearwardly for pulling deployable anchor 984 and bringing back the engagement point of extracted beam 973 with anchor roller 988 and thereby the distal side of beam 973 is lifted.

It is noted that the at least one hold of deployable anchor 984 is the ground/floor, and deployable anchor 984 is configured to change the elevation of extracted beam 973 during the loading mode and the unloading mode, after extracted beam 973 initially engages the pallet.

FIG. 19C is a simplified side view schematic illustration of a transporter of a pallet shelfing apparatus with jackscrew lift mechanism for pallet lifting, depicted 990. Embodiment 990 features platform 992 and transporter 996. Transporter 996 includes pallet lift based on screw threaded pillars 997, chassis 999 and ground locomotion represented by wheels 998. Platform 992 includes meshing screw threaded holes 994 into which screw threaded pillars 997 are inserted. Pillars 997 are mounted on chassis 999, which is carried by ground locomotion 998, and the rotation of pillars 977 lifts or lowers platform 992. Transporter 996 is configured to position platform 992, by ground locomotion 998 and by pallet lift 997.

As noted above, the pallet shelfing apparatus may include a mount for mounting at least one of selected pallet carrying structure of the at least one deployable pallet carrying structure to the platform and the at least one selected pallet carrying structure may include a beam. In accordance with embodiments of the pallet shelfing apparatus, the mount is attached to some intermediate point of the beam.

As noted above, the at least one deployable anchor temporarily stabilize the pallet shelfing apparatus against at least one hold. In accordance with embodiments of the pallet shelfing apparatus, the volume confined by the convex hull of the shelf structure is disposed between the platform and at least one of the at least one hold, in the loading mode or in the unloading mode, at least before changing mode into the hibernate/transport mode;

In accordance with embodiments of the pallet shelfing apparatus, a selected deployable anchor of the at least one deployable anchor may feature an anchor base element and at least one anchor stabilizing element, wherein the anchor base element is physically detached from the pallet shelfing apparatus excluding the selected deployable anchor, when the deployable anchor is not deployed, and the anchor base element is engaged by the pallet shelfing apparatus excluding the selected deployable anchor by at least one of the at least one anchor stabilizing element, when the deployable anchor is deployed for stabilizing the pallet shelfing apparatus. In accordance with embodiments of the pallet shelfing apparatus, the anchor base element may be mobile. In accordance with embodiments of the pallet shelfing apparatus, at least one of the at least one anchor stabilizing element is attached, when the selected deployable anchor is not deployed, to the pallet shelfing apparatus excluding the selected deployable anchor or to the anchor base element.

In accordance with embodiments of the pallet shelfing apparatus, a selected hold of the at least one hold may feature at least one of: (a) located on the vertical upright columns of the shelf structure; (b) located below a shelf of another shelf structure, such that the pallet shelfing apparatus is disposed in between the shelf structure and the another shelf structure; (c) located on a surface of construction that is supported by any of the ground, the ceiling, a shelf of the shelf structure, and/or the holds mentioned in (a) and (b) above; (d) a lift provided by a dragging/repelling force on a magnetic portion of the at least one deployable anchor; and (e) a lift provided by a fluid stream that applies a repelling force on the at least one deployable anchor.

Figure 20:
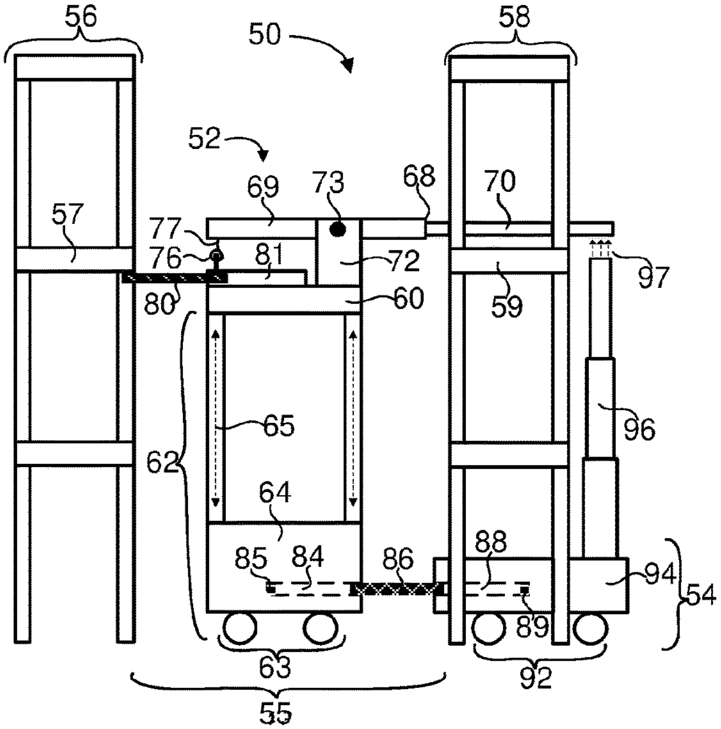
FIG. 20 is a side view schematic illustration of a pallet shelfing apparatus exemplifying several optional features of the at least one deployable anchor, constructed and operative in accordance with further embodiments of the present invention.

Reference is now made to FIG. 20, which is a side view schematic illustration of a further embodiment of a pallet shelfing apparatus, denoted 50, which exemplifies several optional features for the at least one deployable anchor, constructed and operative in accordance with the invention. Pallet shelfing apparatus 50 can move along aisle 55 separating two shelf rows, designated as “front” shelf structure 58 and “rear” shelf structure 56, so termed for demonstrating shelfing a pallet on target shelf 59, located within front shelf structure 58. Pallet shelfing apparatus 50 includes shelfing appliance 52, anchor base element 54, physically detached from shelfing appliance 52, and two types of anchor stabilize elements in the form of magnetic stave 86, and two telescopic jacks 96 (only the closer jack facing the viewer is seen in the side view), configured to emit strong air jets from their tips, in an upward direction. represented by arrows 97.

Shelfing appliance 52 includes platform 60, transporter 62, at least one deployable pallet carrying structure in the form of two retractably extendable beams 68 (only the closer beam facing the viewer is seen in the side view), rear deployable anchor in the form of retractably extendable spar 80 featuring spar housing 81, beams mount 72, an elongated appliance anchor cavity 84, and load support jack in the form of winch jack 76 equipped with winch pulling rope 77.

Transporter 62 includes transporter chassis 64, which is mobilized by ground locomotion 63, and elevator 65, which is mounted on transporter chassis 64. Platform 60 is mounted on elevator 65, which selectively lifts and lowers platform 60 to a height suiting the particular operational mode (i.e., transport, loading, unloading, or hibernate mode). Retractably extendable beams 68 include static arms 69 and dynamic arms 70. Dynamic arms 70 respectively retract into static arms 69 when beams 68 are not deployed and respectively extend from static arms 69, over target shelf 59, when beams 68 are deployed. Beams 68 are operational for carrying, reaching and engaging a pallet. Static arms 69 are tiltably mounted, at some medial location thereof, to beams mount 72, at hinge 73, and beams mount 72 is mounted on platform 60. Winch jack 76 is mounted on spar housing 81, which in turn is mounted on platform 60. Rope 77 is rolled about winch jack 76 at one end and is secured to the proximal side of static arms 69 at its other end. Winch jack 76 may pull or release rope 77, and by pulling rope 77 it pulls downwards the proximal side of beams 68, which in turn tilts beams 68 about hinge 73, and thus lifts the distal side of beams 68.

Anchor base element 54 includes anchor chassis 94, which is mobilized by anchor locomotion 92, and an elongated secondary anchor cavity 88.

Telescopic jacks 96 are mounted on anchor chassis 94. Telescopic jacks 96 are collapsed, when not deployed, below a height which allows anchor base element 54 to manoeuvre without interruption below the lower shelves of shelf structures 56 and 58. When beams 68 are fully deployed, (at the loading mode or the unloading mode), the distal sides of dynamic arms 70 are extended beyond the front of shelf structure 58, and telescopic jacks 96 may be uprightly extended (deployed) such that their tips are placed just below the distal sides of dynamic arms 70, respectively. Telescopic jacks 96 may support beams 68 either by further expanding to physically engage the distal sides of dynamic arms 70, or by emitting upwards strong air jets from their tips, to generate a repelling lifting force on the distal sides of dynamic arms 70, and thus stabilize pallet shelfing apparatus 50. It is noted that telescopic jacks 96 may also serve as a distal side lift mechanism for beams 68, by applying any of these alternative techniques.

Magnetic stave 86, when deployed, couples anchor base element 54 to shelfing appliance 52 for stabilizing pallet shelfing apparatus 50 during the loading mode and the unloading mode. Magnetic stave 86, when not deployed, is nested within one of cavities 84 and 88. Placement of magnetic stave 86 to deploy or retract to either one of cavities 84 and 88 is controlled by appliance anchor electro-magnet 85, placed at the inner part of cavity 84, and secondary anchor electro-magnet 89, placed at the inner part of cavity 88, by pushing and pulling magnetic stave 86 along aligned elongated cavities 84 and 88. Retractably extendable spar 80 provides an alternative for temporarily stabilizing pallet shelfing apparatus 50. Spar 80, when not deployed, is retracted and nested within spar housing 81, and when deployed, is extracted from spar housing 81 to lean against a hold located below support shelf 57, located at rear shelf structure 56.

While telescopic jacks 96 can be operational for both stabilizing pallet shelfing apparatus 50 and as distal side lift mechanism of beams 68, magnetic stave 86 and spar 80 can only serve to stabilize pallet shelfing apparatus 50. If any of these mechanisms are applied as a deployable anchor, winch jack 76 and its rope 77 can be used for a far side lift mechanism of beams 68.

As noted above, the at least one hold may be located on the vertical columns of a shelf structure, such as vertical columns 701 and 702 in shelf structure 700 of FIG. 7A and vertical columns 722 and 727 in shelf structure 720 of FIG. 7B.

Figure 21:
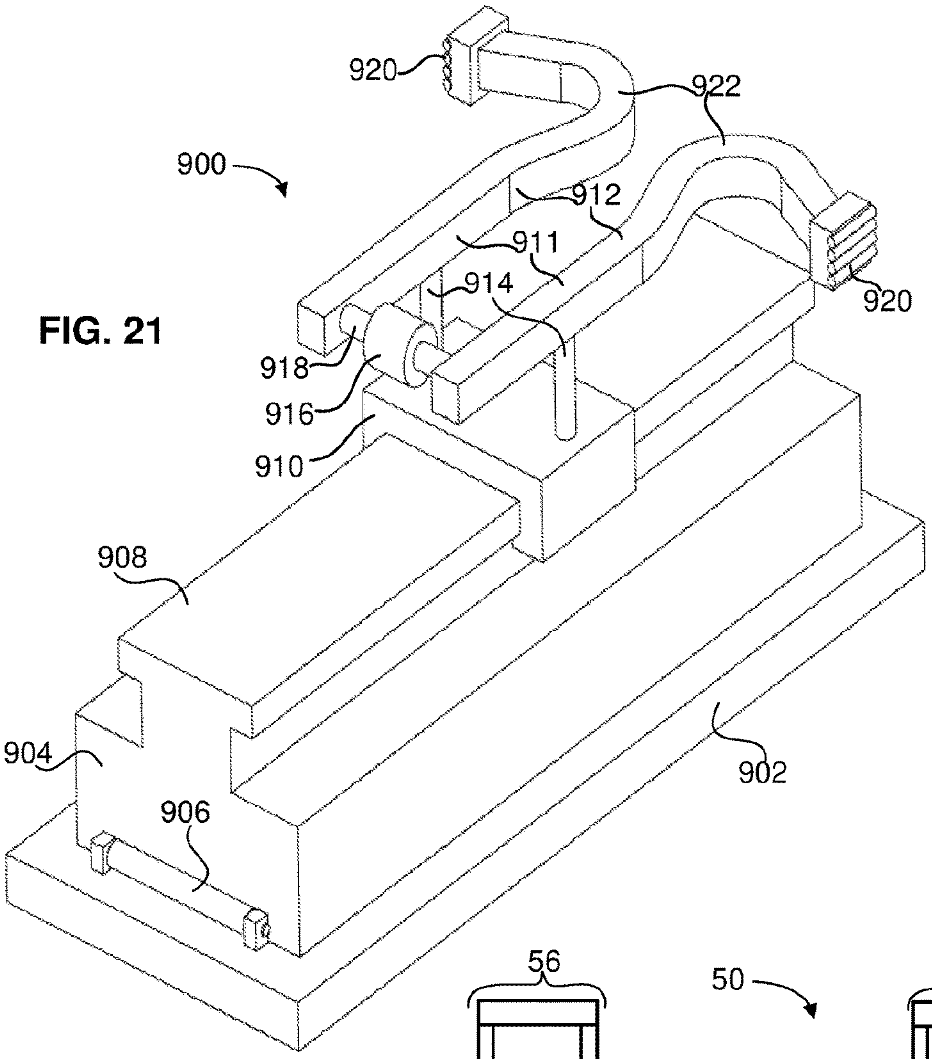
FIG. 21 is a perspective view schematic illustration exemplifying a deployable pallet carrying structure arrangement, featuring a spread mechanism and a friction-based anchor, constructed and operative in accordance with further embodiments of the present invention.

Reference is now made to FIG. 21 which is a perspective view schematic illustration that exemplifies a deployable pallet carrying structure arrangement, denoted 900, featuring a spread mechanism and friction-based anchor, constructed and operative in accordance with further embodiments of the present invention.

Deployable pallet carrying structure arrangement 900 includes platform 902, mount 904, which is proximally mounted to platform 902 by hinge 906, mount carriage 910 which is movable about mount 904 along mount rail 908, two deployable pallet carrying structures 912 which are mounted to carriage 910 by two uprights 914, two deployable anchors in the form of two motorized rollers 920 and a spread mechanism having spread piston 916 and spread shafts 918. Deployable pallet carrying structures 912 include two elongated members 911 which are substantially parallel to each other, wherein each member 911 is horizontally rotatable about a corresponding upright of uprights 914. Members 911 protrude rearwardly and are coupled near their rear end by one end of spread shafts 918, wherein the other end of spread shafts 918 enters spread piston 916, which is operational to control the spread between spread shafts 918 at the rear end of members 911. Deployable pallet carrying structures 912 extend forward from uprights 914 and feature arched sections 922 which are curled toward the sideways—backwards, and motorized rollers 920 are mounted at their tip.

For the loading mode and the unloading mode, a pallet shelfing apparatus, which deployable pallet carrying structure arrangement 900 forms part of, when loading/unloading a pallet from/to a shelf of a shelf structure, follow the following procedure:

(a) Spread piston 916 set members 911 of deployable pallet carrying structures 912 in parallel.
(b) Mount carriage 910 is driven forward until rollers 920 are placed beyond the convex hull of the shelf structure.
(c) Spread piston 916 set deployable pallet carrying structures 912 to position rollers 920 between the pallet and the upright columns of the shelf structure.
(d) Mount carriage 910 is driven backward until rollers 920 face the upright columns of the shelf structure.
(e) Spread piston 916 latch rollers 920 sideways onto the upright columns of the shelf structure.
(f) Motorized rollers 920 are activated to roll upwards, thereby lifting the deployable pallet carrying structures 912. Mount 904 can tilt at hinge 906 to enable such movement.

It is noted that in the context of arrangement 900, the at least one hold located on the upright columns of the shelf structure. It is further noted that rollers 920 also serve as deployable pallet carrying structure distal side lift mechanism.

As noted above, the transporter may include ground locomotion. In accordance with embodiments of the pallet shelfing apparatus, the ground locomotion may include wheels for ground engagement, continuous caterpillar tracks, or wheels for railway tracks.

Figure 22A:
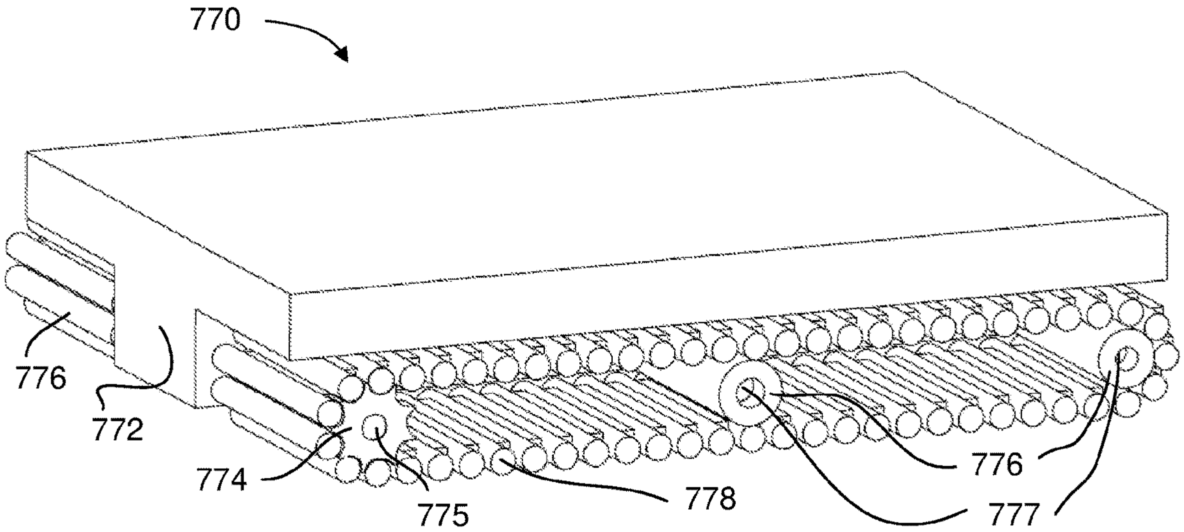
FIGS. 22A and 22B, are perspective view schematic illustrations of exemplary ground locomotion of the transporter, constructed and operative in accordance with further embodiments of the present invention.
Figure 22B:
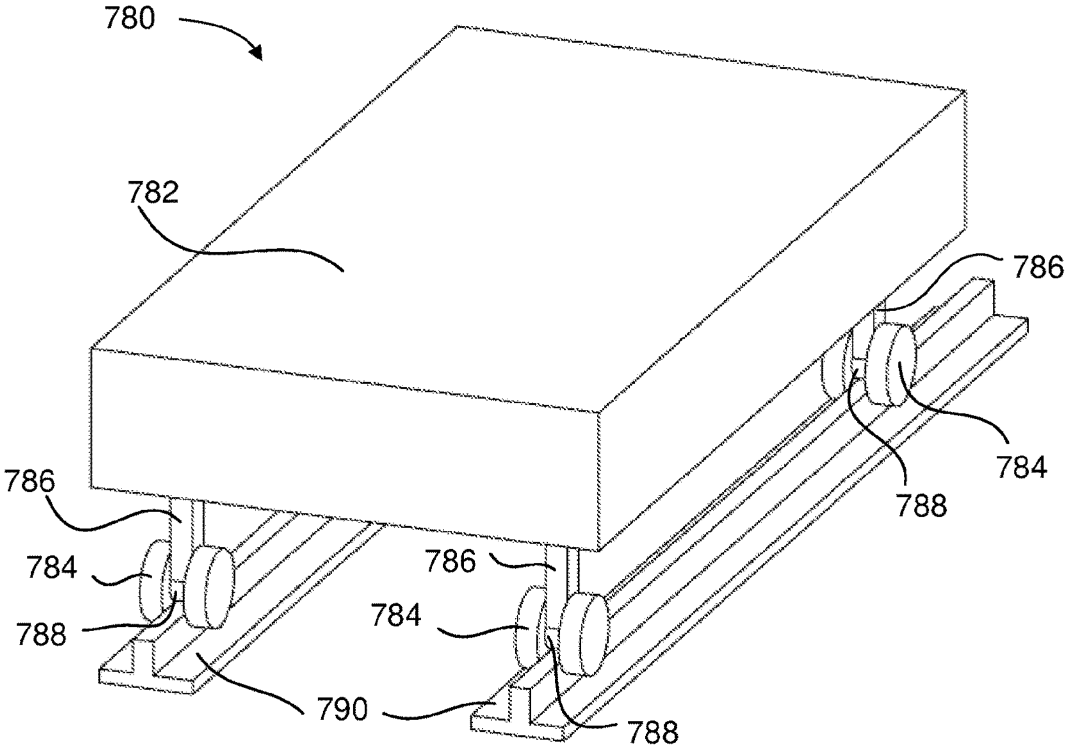

Reference is now made to FIGS. 22A and 22B, which are perspective view schematic illustrations of exemplary ground locomotion of the transporter, constructed and operative in accordance with further embodiments of the present invention.

FIG. 22A is a perspective view schematic illustration of ground locomotion 770, incorporating chassis 772, two endless caterpillar tracks 778, two drive sprockets 774 and four wheels 776. Drive sprockets 774 are disposed at the front left and right corners of chassis 772, two of wheels 776 are disposed at the rear left and right corners of chassis 772 and two of wheels 776 are disposed at the center left and right of chassis 772. Drive sprockets 774 and wheels 776 are mounted on axles 775 and 777, respectively. Drive sprockets 774 are driven by motor(s) (not shown). Separate left and right motors (or a single motor with differential power conveyance) are coupled to sprockets 774 (not shown), and activate them in a similar or opposed direction, at a similar or different speed. For advancing ground locomotion 770 in a straight direction at a given speed, sprockets 774 are driven at the same speed and direction. Steering of ground locomotion 770 can be achieved by driving sprockets 774 at different speeds. For example, in order for ground locomotion 770 to steer to the right, left sprocket of drive sprockets 774 is driven at a speed higher than that of right sprocket of drive sprockets 774. Spinning ground locomotion 770 in place can be achieved by driving sprockets 774 at the same speed in opposed directions.

FIG. 22B is a perspective view schematic illustration of ground locomotion 780, incorporating chassis 782, rail track wheels 784 and wheel mounts 786. Wheel mounts 786 are fixedly mounted to the bottom corners of chassis 782. Each wheel 784 has a middle groove for setting on rail tracks featuring two parallel rail tracks 790.

At least one of wheels 784 is driven by a motor (not shown), at selected speed and direction. If more than one wheel of track wheels 784 is driven, all driven track wheels must be synchronized for proper operation. The ground position of ground locomotion 780 is dictated by the placement of rail tracks 790.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A pallet shelfing apparatus for shelf racking of a pallet in a shelf structure featuring at least one shelf, wherein the apparatus is configured to operate in a loading mode, an unloading mode and a hibernate/transport mode, the pallet shelfing apparatus comprising:

a mobile platform positionable into a loading position for loading of the pallet from at least one selected shelf of said at least one shelf, and positionable into an unloading position for unloading of the pallet to said at least one selected shelf;

a transporter for transporting and positioning said platform;

at least one retractably extendable deployable pallet carrying structure mounted to said platform at least when in said hibernate/transport mode is deployed when in at least one of said loading mode and said unloading mode, and is configured for carrying, reaching and engaging the pallet;

a height adjustment module configured to adjust the height of said platform; and at least one deployable anchor for temporarily stabilizing said pallet shelfing apparatus during either said loading mode or said unloading mode, wherein:

said at least one deployable anchor is mounted to said platform or to said pallet carrying structure, said at least one deployable anchor is configured to anchor, when deployed, on top of at least one hold and support said pallet shelfing apparatus, and at least one of said at least one deployable anchor is configured to change elevation of at least one selected pallet carrying structure of said at least one pallet carrying structure, during at least one of said loading mode and said unloading mode, after said at least one selected pallet carrying structure initially engages the pallet, and/or said at least one hold features at least one of:

i. at least one of said at least one hold located off ground and off ceiling;

ii. at least one of said at least one hold located inside a volume confined by the convex hull of said shelf structure; or iii. at least one of said at least one hold located outside said volume, wherein said volume is disposed between said platform and said at least one of said at least one hold, while in said loading mode or in said unloading mode.

2. The pallet shelfing apparatus of claim 1, further comprising a mount for mounting at least one selected pallet carrying structure of said at least one deployable pallet carrying structure to said platform, wherein said mount comprises at least one of:

a vertical tilt joint for enabling vertical pivoting of said at least one selected pallet carrying structure with respect to said platform; and a mount height adjustment mechanism for enabling adjustment of the vertical position of said at least one selected pallet carrying structure with respect to said platform.

3. The pallet shelfing apparatus of claim 2, wherein said at least one selected pallet carrying structure is mounted by said mount to said platform, and wherein horizontal movement of said mount is constricted, respective to said platform, towards and away from said shelf structure.

4. The pallet shelfing apparatus of claim 1, further comprising an auxiliary platform, wherein said height adjustment module comprises a platform height adjustment mechanism for adjusting the relative vertical position between said auxiliary platform and said platform.

5. The pallet shelfing apparatus of claim 1, wherein said at least one deployable anchor comprises a carry jack attached to at least one selected pallet carrying structure of said at least one deployable pallet carrying structure, wherein said carry jack is configured to deploy for engaging said at least one hold which serves as a supporting base for vertical expansion of said carry jack, when said at least one selected pallet carrying structure is deployed.

6. The pallet shelfing apparatus of claim 1, wherein said at least one deployable anchor is deployed by movement of at least one movement selected from the group consisting of:

movement of said at least one deployable anchor;

movement of said transporter;

movement of said at least one deployable pallet carrying structure;

movement of a vertical tilt joint, included in a mount for mounting at least one selected pallet carrying structure of said at least one deployable pallet carrying structure to said platform, for enabling vertical pivoting of at least one selected pallet carrying structure with respect to said platform;

movement of a mount height adjustment mechanism, included in a mount for mounting at least one selected pallet carrying structure of said at least one deployable pallet carrying structure to said platform, for enabling adjustment of the vertical position of at least one selected pallet carrying structure with respect to said platform; and movement of a platform height adjustment mechanism for adjusting the relative vertical position between an auxiliary platform and said platform.

7. The pallet shelfing apparatus of claim 1, further comprising a load support jack, configured to deploy between a load supporting base and at least one selected pallet carrying structure of said at least one deployable pallet carrying structure, for vertically supporting said at least one selected pallet carrying structure.

8. The pallet shelfing apparatus of claim 1, wherein at least one of:

a carry jack of said at least one deployable anchor, attached to at least one selected pallet carrying structure of said at least one deployable pallet carrying structure, wherein said carry jack is configured to deploy for engaging said at least one hold which serves as a supporting base for vertical expansion of said carry jack, when said at least one selected pallet carrying structure is deployed; and a load support jack configured to deploy between a load supporting base and said at least one selected pallet carrying structure, for vertically supporting said at least one selected pallet carrying structure, is further configured to vertically lifting and lowering said at least one selected pallet carrying structure.

9. The pallet shelfing apparatus of claim 1, wherein said at least one deployable anchor comprises an anchor base element and at least one anchor stabilizing element, wherein said anchor base element is physically detached from said pallet shelfing apparatus excluding said at least one deployable anchor, when said deployable anchor is not deployed, and said anchor base element is engaged by said pallet shelfing apparatus excluding said at least one deployable anchor by at least one of said at least one anchor stabilizing element, when said deployable anchor is deployed for stabilizing said pallet shelfing apparatus.

10. The pallet shelfing apparatus of claim 1, further comprising a pallet carrying structure lift mechanism for exerting a vertical movement of at least one of:

an extended side of said at least one deployable pallet carrying structure; and proximal side of said at least one deployable pallet carrying structure.

11. The pallet shelling apparatus of claim 1, further comprising a pallet conveyor configured to carry the pallet about at least one of said at least one deployable pallet carrying structure at a path extending between a location above said selected shelf and a location above or below said platform, for facilitating movement of the pallet at said loading mode and said unloading mode.

12. The pallet shelfing apparatus of claim 11, wherein said pallet conveyor is an active pallet conveyor comprising a conveyor mobility element for moving said active pallet conveyor about said at least one deployable pallet carrying structure.

13. The pallet shelfing apparatus of claim 1, wherein at least one of said at least one deployable anchor is further configured to support at least one of said at least one deployable pallet carrying structure against at least one of said at least one hold when said at least one of said at least one deployable anchor is deployed during either said loading mode or said unloading mode.

14. The pallet shelfing apparatus of claim 1, wherein said transporter comprises said height adjustment module.

15. The pallet shelfing apparatus of claim 14, wherein said height adjustment module comprises a lift for lifting said platform to a desired height.

16. The pallet shelfing apparatus of claim 1, wherein said transporter is a ground transporter.

17. The pallet shelfing apparatus of claim 16, wherein said ground transporter is disposed below said platform during loading or unloading.

18. The pallet shelfing apparatus of claim 1, wherein said at least one deployable anchor is retractably extendable.

* * * * *